US009787343B2

(12) United States Patent
Flores Cuadrado et al.

(10) Patent No.: US 9,787,343 B2
(45) Date of Patent: Oct. 10, 2017

(54) METHOD AND SYSTEM FOR DYNAMIC MANAGING OF SUBSCRIBER DEVICES IN MOBILE NETWORKS

(71) Applicant: Telefonica, S.A., Madrid (ES)

(72) Inventors: Ana Isabel Flores Cuadrado, Madrid (ES); Maria Antonia Lopez Ajenjo, Madrid (ES); Ana Sobrino Jular, Madrid (ES)

(73) Assignee: Telefonica, S.A., Madrid (ES)

( * ) Notice: Subject to any disclaimer, the term of this patent is extended or adjusted under 35 U.S.C. 154(b) by 0 days.

(21) Appl. No.: 14/974,208

(22) Filed: Dec. 18, 2015

(65) Prior Publication Data
US 2016/0183081 A1 Jun. 23, 2016

(30) Foreign Application Priority Data

Dec. 19, 2014 (EP) .................................... 14382542

(51) Int. Cl.
*H04W 8/24* (2009.01)
*H04B 1/3816* (2015.01)
(Continued)

(52) U.S. Cl.
CPC .......... *H04B 1/3816* (2013.01); *H04W 8/205* (2013.01); *H04M 15/50* (2013.01);
(Continued)

(58) Field of Classification Search
CPC ..... H04W 12/06; H04W 48/18; H04W 88/06; H04W 4/001; H04W 8/12; H04W 8/205;
(Continued)

(56) References Cited

U.S. PATENT DOCUMENTS

2008/0064393 A1* 3/2008 Oommen ............... H04W 48/18
455/432.1
2009/0007275 A1* 1/2009 Gehrmann ............ G06F 21/445
726/27
(Continued)

FOREIGN PATENT DOCUMENTS

WO 2013025806 A1 2/2013

OTHER PUBLICATIONS

GSM Association, GSMA SAS Standard for Subscription Manager Roles, Version 1.0, Oct. 13, 2014, Official Document SGP.07, 31 pages.

*Primary Examiner* — Bobbak Safaipour
(74) *Attorney, Agent, or Firm* — Hayes Soloway PC

(57) ABSTRACT

A system and method for managing subscriber mobile devices comprising:
a home network (400) of a first mobile network operator (MNO1), in which data associated with at least one physical SIM of a subscriber device with an embedded SIM card (eUICC) is obtained, and
a destination network (300) of a second mobile network operator (MNO2) which the device travels to, obtaining static data and dynamic data associated with at least one virtual SIM (503, 603) of the device.
The dynamic data comprise a subscriber authentication key (Ki) and is obtained from a SIM provider platform (500, 600) on which the destination network (300) relies. The static data comprise IMSI/MSISDN identities and is stored in a pool (202) of the destination network (300).
For a given virtual SIM, it is checked whether there is an association in a mapping table (106) of the first mobile network operator (MNO1) between the static data from the pool (202) and the physical SIM data from the home network (400).

13 Claims, 34 Drawing Sheets

(51) Int. Cl.
*H04W 8/20* (2009.01)
*H04M 15/00* (2006.01)
*H04W 4/26* (2009.01)
*H04W 8/26* (2009.01)
*H04W 12/04* (2009.01)
*H04W 8/12* (2009.01)
*H04W 4/00* (2009.01)

(52) U.S. Cl.
CPC .............. *H04W 4/005* (2013.01); *H04W 4/26* (2013.01); *H04W 8/12* (2013.01); *H04W 8/26* (2013.01); *H04W 12/04* (2013.01)

(58) Field of Classification Search
CPC ..... H04W 8/24; H04W 60/005; H04W 60/06; G06F 21/445; G06F 21/64; H04M 3/42246; H04M 7/1205; H04M 15/50; H04M 15/7556; H04M 15/8038; H04M 15/8083; H04L 63/0428; H04L 63/0853
See application file for complete search history.

(56) References Cited

U.S. PATENT DOCUMENTS

| | | | |
|---|---|---|---|
| 2009/0215449 A1* | 8/2009 | Avner | H04W 8/06 455/433 |
| 2011/0117965 A1* | 5/2011 | Gong | H04W 48/18 455/558 |
| 2012/0108295 A1* | 5/2012 | Schell | H04W 4/001 455/558 |
| 2012/0276872 A1* | 11/2012 | Knauth | H04L 63/18 455/411 |
| 2012/0282924 A1 | 11/2012 | Tagg et al. | |
| 2014/0242951 A1 | 8/2014 | Mohammed et al. | |
| 2015/0094071 A1* | 4/2015 | Hang | H04W 76/028 455/450 |
| 2015/0281957 A1* | 10/2015 | Hartel | H04M 1/675 455/411 |
| 2015/0319603 A1* | 11/2015 | Faller | H04W 8/00 455/432.1 |
| 2016/0183081 A1* | 6/2016 | Flores Cuadrado | H04B 1/3816 455/558 |

* cited by examiner

METHOD AND SYSTEM FOR DYNAMIC MANAGING OF SUBSCRIBER DEVICES IN MOBILE NETWORKS

FIELD OF THE INVENTION

The present invention has its application within the telecommunication sector, especially, relates to the management of subscriber devices comprising Subscriber Identity Modules (SIMs) or Universal Integrated Circuit Cards (UICCs), subscribers whose credentials can belong to one or more home networks as well as their Mobile network operators (MNOs), and can switch while roaming between multiple visited mobile networks.

BACKGROUND OF THE INVENTION

One of the mayor problems of M2M (Machine to Machine) devices (e.g. cars, signs, meters, vending machines) is that when they are being manufactured, they are often empowered with SIMs (Subscriber Identity Module) or UICC (Universal Integrated Circuit Card) whose credentials belong to MNOs (Mobile network operator) of the countries where they have been built or with whom their manufacturers have agreements and they do not have to match to the MNO of the countries where they are going to be marketed. Besides, during the manufacturing process, the devices are normally sealed therefore replacing SIMs afterwards is extremely difficult. When devices are finally activated by an end customer, the SIM cards uses the wrong credentials to connect to the network of a different operator in Roaming making that the cost per use will be quite higher than expected. And besides it might have regulatory issues, since the legislation of some countries does not allow M2M devices to connect in Roaming permanently.

People with a mobile device (or with M2M devices such as e-books) when they travel abroad can experience the same problem. When these travellers try to use the device with a SIM of an operator without service in the destination country, they must register to the network in Roaming mode, and pay for it quite a cost higher than the local tariffs.

One of the problems that we want to solve with this invention is how to avoid the roaming charges without having to change the SIM than the device are using. One solution to this problem is known as IMSI (International Mobile Subscriber Identity) SWAP. The IMSI SWAP process allows to change remotely, via OTA (over to air programming), the MNO's credentials (IMSI, MSISDN (Mobile Station Integrated Services Digital Network), etc.), and the authentication Key into a roaming SIM, and enabling the SIM is registered to the net as if it were a local subscription [as described in "Flexible Over-the-Air Personalization of M2M SIMs" by Telefonica and Giesecke & Devrient Team up on, Press Release, Nov. 14, 2011]. However, the solution for the SWAP in "Flexible Over-the-Air Personalization of M2M SIMs" by Telefonica and Giesecke & Devrient (G&D) does not consider the option to change the MNO credentials that are not in possession of another SIM provider different from G&D, or when management platform connectivity used by the MNO in destination is different from the MNO Jasper Wireless.

On the other hand, the growth in the number of M2M devices in the coming years is expected to be exponential and in the M2M market, and an efficient use of the allocation of resources MSISDN/IMSI must be made so that they can be used for SWAP. It should be avoided that multiple IMSIs or MSISDN will be provisioned in SIMs or systems to be used just in case, due to this prevents they could be used for other purposes in the meantime.

And actually, in the M2M world (especially in the automotive sector), the tendency is try to reach global connectivity solutions, where a certain vendor hires the connectivity in a region to a MNO globally regardless of where the device is going to be marketed. The MNO who wins the contract must reach agreements with other MNOs to provide connectivity in those countries where he doesn't have scope. Since the solution must be global, the SIM empowered into devices must be always manufactured by the same SIMs' provider and with a predefined MNO credentials as they will always be manufactured in a single place. However, the credentials of the SIM must be changed in the destination so that any Roaming expenses will not be charged.

The problem to reach a global solution (in both M2M and mobile devices) is that each MNO manages connectivity and the network resources differently (including the management and efficient allocation of IMSI and MSISDNs) and each MNO uses its own platform (with its own repositories), and they trust on different SIM providers. To provide a global connectivity solution, the MNO platforms must be integrated to enable credentials swapping and to monitor the SIM usage and its consumption and to invoice the customer after the swapping. Moreover, since the authentication keys used by the SIM to register in the net, are an important part of the data sent to the SIM during the SWAP, to provide a global solution, the platform that sends data to the SIM during the SWAP, must get not only the new IMSI but also the MNO credentials from the SIM provider on whom the MNO relies and sends all of them to the SIM safely.

There are few options available to try to reduce the Roaming surcharges in M2M devices or travellers. But none of them resolve the problem of how offer a global connectivity solution:

One option for a user when he travels abroad is to purchase a plurality of additional pre-pay SIMs, one for each territory, which the user visits. The user is able to replace the original SIM with an appropriate SIM for the territory being visited. In this way, users can make and receive calls or use data services without incurring Roaming surcharges. This option is not valid for M2M devices (UICC in M2M devices is not easily accessible or replaceable, since many M2M devices are remotely located, often hermetically sealed). And for users this solution has many disadvantages (users must purchase and carry a plurality of different SIM cards. Besides they must ensure that there is sufficient credit in each SIM card. Finally when the Subscriber swaps SIM his/her mobile number changes this means they are no longer reachable on his/her normally used number).

Another attempts in the prior art to address the problem of Roaming charges is the Multi-IMSI SIMs that offer the capability of being pre-programmed with a plurality of mobile subscriber data sets (which each comprise an IMSI and other network-related data). These SIMS have processing capability and an algorithm to present the correct set of data to the phone based on the location of that phone. This allows the phone to present as a 'local' subscriber to the network in question. Many fixed format Dual and Multiple IMSI SIM systems have been sold by companies such as VeriSign and Gemalto. In such systems, a piece of software runs in the SIM or on the handset or a separate electronic module and makes decisions as to which IMSI to use given the location and available networks. Such systems (sometimes called SmartSIMs) are however typically relatively inflexible to changes in network availability over time (for example a SIM is usually preprogrammed with fixed set of IMSIs, new SIMs need to be issued if additional IMSIs become available—likewise for deletion—). Other problem is SIM does not have enough knowledge of the network geography and current commercial status to choose the best network or IMSI to use. Finally, in this solution, IMSIs can not be reused, eg, if Users never used one or more IMSIs from the prefixed set, this IMSI would never be available to be used by other one, and since range of IMSIS very limited this situation could cause problems due to IMSIs misusing.

An improved system has been disclosed in WO 2013/041849 A1, which discloses an IMSI Broker adapted to providing the SIM of a mobile handset with new identities as required, wherein each identity comprises an IMSI. The IMSI broker acts as a central server which changes the new identity used by the subscriber based on its current location. The change is made when a notification is received informing that the current location of the subscriber has changed. The new identity is retrieved from a predefined list of IMSIs stored in the pool. The most suitable item from the list is chosen according to a set of predefined rules, such as the user preferences, their location or their cost. The IMSI pool contains a set of IMSIs from different MNOs that operates in different countries. The new identity and rules for choosing the best IMSI is communicated to the device using OTA commands. The SIM might also have a preloaded list of IMSIs. The SIM can choose to use a certain IMSI from the list of pre-charged IMSIs by triggering of a rule. The mobile device also has a pre-set number of identities within the SIM. In this case, to choose a new identity, it will be selected from the set of ones that are pre-loaded into SIM. The election will depend on parameters such as the terminal type, and other own terminal parameters (such as the operating system, IMEI (International Mobile Equipment Identity), etc.), besides of SIM location. If a new identity that suits the specific characteristics of the terminal cannot be chosen, then the IMSI Broker will select the new identity from a database or pool following a set of rules or criteria. Then the new identity is sent to the SIM via OTA. The new identity will always choose between the one that provide the better user conditions. Although the described IMSI Broker solves the problem of avoiding the roaming cost, enabling to change the IMSI used by the SIM from another one that belongs to the MNO where the SIM is located, it does not allow the provision of a global connectivity solution, since the system disclosed in WO 2013/041849 A1 suffers from a series of problems such as:

a) Although the described IMSI Broker solves the problem of having IMSIs from different available for SWAP with the use of IMSIs list or a pool, WO 2013/041849 A1 does not teach when an IMSI is replaced, or whether the IMSI is returned to the pool immediately to be reused or whether it remains blocked and can no longer be used. Neither WO 2013/041849 A1 describes how control the time of the returning to the pool for the billing purposes. In the case that the SIM does not keep using the IMSI after the change of identity, and the IMSI is not returned to the pool, it will remain locked out and may not be used by another SIM, so that resources will be underused. If the IMSI is returned to the pool or the list immediately, it could be reused almost again immediately, which may cause faults in the billing to a customer and between MNOs (what a MNO has to pay another MNO in exchange by the usage of its resources network). For example, if the SIM uses the IMSIx and when it not keeps using it, it is returned to the pool. After a while, the IMSIx is assigned to SIM2. When the time of the billing comes, as charges for the use of a SIM that MNO get from their systems are retrieved with a certain delay (in the next months), it could happen that the consumptions made by the SIM1 would be billed to the SIM2.

b) Moreover, WO 2013/041849 A1 does not disclose how the pool is managed and how the MNOs load the IMSI on it, and how long the IMSIs remain on the pool. Having a list of IMSIs fixed for each MNO in a centralized pool is misusing of the IMSIs. The MNO belonging the IMSI should leave them blocked in the central pool to allow SWAP and they could not use them for other uses, such as allocate them to physical SIMs. That can cause that the IMSI will remain in the pool for a long time without being used for the SWAP either. This same problem happens if there is a set of IMSIs preloaded on the SIM. The most efficient method would be if there were an IMSI pool for each MNO and the pool were managed by themself by decided if they wanted to add a IMSI to the pool so that it would be available for the SWAP or to remove from the a pool so that it could be allocated to physical SIMs depending on the circumstances. This decision could be take basis on the SWAP forecasting expected.

c) Finally, WO 2013/041849 A1 does not consider that some of the most important data that SIM needs to be registered in a network successfully is the authentication key of the MNO (Subscriber Authentication Key, Ki). The key Ki must be sent in the SIM during the SWAP, besides the IMSI. Actually, the authentication keys are not provided to single platform, but they are distributed between different SIM providers. Therefore to make possible to change the credentials in a SIM, the platform that sends the data to the SIM for SWAP, must obtain information on the new IMSI plus it must obtain the data of the MNO credentials from the corresponding SIM provider as well. The problem of how to obtain and exchange credentials between SIM providers and the SIM is a complex problem since it requires that the exchange will be performed in highly secure manner.

The problem of how to exchange credentials for the SWAP between SIM providers and SIM can be solved by the GSMA architecture, shown in FIG. 1. The GSMA (Global System for Mobile Association) vision is the capability to remotely provision mobile operator credentials onto a SIM. The GSMA architecture is a common, secure, interoperable architecture that enable remote over the air provisioning/re-provisioning of network operator credentials and management of the new SIM, whilst retaining the existing security levels provided by the traditional SIM. But this architecture is more focused on that aspect, than in others needed to provide a global connectivity solution, such as the ones to allow to control when the interchange of credentials is needed and between which actors, or other such as to allow to manage IMSIs used for SWAP efficiently, or how makes the billing or how to get the consumption of SIMs after SWAP.

On the other hand, the work on M2M applications has given rise to the possibility of having a UICC that is embedded in a communication device in such a way that the UICC is not easily accessible or replaceable (many M2M devices are remotely located, often hermetically sealed, their after sale location is not known during production). The ability to change network subscriptions on such devices becomes problematic, thus necessitating new methods for securely and remotely provisioning access credentials on these Embedded UICCs (eUICC) and managing subscription changes from one MNO to another.

Therefore, current solutions allow the reduction of Roaming surcharges in M2M or mobile devices, but there is a need in the state of the art for a method and system to provide global connectivity to M2M devices or mobile devices manufactured by the same vendor and sold in different countries, regardless of the country where the device is going to be marketed or used, an that allow the end user to be billed according to local rates regardless of the user's place of residence and whether the MNO operates on such place or not.

SUMMARY OF THE INVENTION

The present invention solves the aforementioned problems and overcomes previously explained state-of-art work limitations by disclosing a method and system which provides an architecture for:
  a) integrating different MNOs platforms to allow the change of credentials associated with a MNO that a SIM is using to be registered to the net, in order to prevent the end user from paying roaming;
  b) obtaining MNO credentials (to use in the destination) from the corresponding SIM card and sending all data needed to the SIM in a safe and secure mode;
  c) getting the information to send the SIM for the SWAP from different platforms (such as the IMSIs to use in the destination);
  d) allowing the reversing of the previous change of credentials, and even the reutilization of previous credentials enabling them for other usages after a while (e.g., if the IMSI initially used by the SIM is released and so is no longer going to be used by the same SIM after the SWAP); also controlling that IMSIs dedicated initially to SWAP in the destination, may be used for other purposes, during the time they are not needed for the SWAP;
  e) controlling the usage, consumption and billing of SIMs once change has been made and checking that the billing is carried out correctly, in the case of a credentials change is to be reverted or when multiple credentials changes happen;
  f) monitoring the change of credentials is carried out according to the end user location and the commercial agreement signed by the MNOs, selecting the most beneficial for both the vendor and for the end user.

The present invention has its application to the integration between multiple and different types of telecommunication network, including MNO (Mobile Network Operator), MVNE (Mobile Virtual Network Enabler) which provides services to MNOs, and MVNO (Mobile Virtual Network Operator). The MVNO is a wireless communications services provider that does not own the wireless network infrastructure over which the MVNO provides services to its customers and so the MNVO enters into a business agreement with a MNO to obtain bulk access to network services at wholesale rates, then sets retail prices independently, and may employ the services of a MVNE or use its own customer service, billing support systems, marketing and sales personnel.

In the context of the invention, it is assumed that the MNO/MVNO/MVNE that won the vendor's contract to provide SIM to the user device or mobile terminal, has come to an agreement with other MVNO/MVNE/MNOs to provide connectivity in countries where the first MNO/MVNO/MVNE has not scope. Each MNO/MVNO/MVNE manages the connectivity and the network resources using their own platforms (including the allocation of IMSI and MSISDNs to SIMs, the billing, consumption monitoring, which services are allowed in each card, etc.), and they trust on their own SIM providers to give them the authentication keys that should be included in each SIM to let the SIM use the network services.

This invention can be applied to both (travellers) subscribers with a mobile terminal as well as ones using M2M devices (e.g., cars, e-books, billboards, meters, etc.) when they travel abroad.

In the context of the invention, the following terminology that is used in the GSM standard, is also used for describing the proposed method and system:
  'Roaming' refers to extending the connectivity of a service to a location that is different from a home location. When a mobile communications device, such as a mobile telephone or a M2M device, travels outside of their home operator coverage area—'territory'—the device can still access services using Roaming mechanisms/services. When a mobile phone or M2M device attempts to connect to a network, which is not the home/local network, the roamed-to network communicates with the home network in order to verify whether the mobile phone is authorised to use the roamed-to network. The roamed-to network operator can identify from the IMSI number stored in the SIM card that the user is not subscribed to the roamed to network, and as such, will contact the user's home network to verify whether the user is authorised. This communication is possible because there are reciprocal agreements between many of the available network operators.
  GSM authentication is performed using a SIM inserted into the mobile communications device. This manages the connection to the network and contains the network subscriber keys. There are two types of authentication—home authentication and Roaming authentication. Home authentication is straightforward and simply requires the exchange of a key with the home network to prove the subscribed user's identity. In the case where the communications device is connected to a foreign network this process is more complex and is referred to as Roaming.
  The HLR (Home Location Register) is a central database that contains details of each mobile phone subscriber that is authorized to use a particular network. For every user registered in a particular cellular telecommunications network, there is a record held in that network's HLR. The HLR stores details of every Subscriber Identity Module (SIM) card issued by the mobile phone operator (i.e. MNO, MVNO or MVNE).
  The Authentication Centre (AUC) is a unit associated with an HLR and it provides one or more authentication triplets for an authentication process when a MS (Mobile Station), that can be a mobile device or M2M device, tries to register into the network. The triplet consists of: User authentication request (RAND, 128 bit random number); User authentication response (RES, 32 bit number); and a session key Kc (64 bit number). The MS uses a ciphering key Ki together with Kc for air interface ciphering. The triplet parameters are thus generated with the key Ki known in the MS on a SIM why AUC needs an IMSI as input to generate the triplets.

The UICC (Universal Integrated Circuit Card) is the smart card used in mobile terminals in GSM and UMTS networks. The UICC ensures the integrity and security of all kinds of personal data, and it typically holds a few hundred kilobytes. With the advent of more services, the storage space will need to be larger. In a GSM network, the UICC contains a SIM application and in a UMTS network it is the USIM application.

The SIM (Subscriber Identity Module) is a smart card with subscriber data and data processing capabilities. It's a plastic card with embedded electronic circuitry, which is inserted into the mobile pone or a M2M device. Each SIM is internally identified by its ICC-ID (Integrated Circuit Card ID). ICC-IDs are store internally in the SIM card but they are also printed in the plastic during the process of personalization. Each SIM has a unique identifier called an International Mobile Subscriber Identity (IMSI), which is a primary key to each HLR record. IMSIs are used in any mobile network that interconnects with other networks, including CDMA and EVDO networks as well as GSM networks. The IMSI consist of a set of digits (Mobile Country Code (MCC), Mobile Network Code (MNC) and Mobile Station Identification Number (MSIN) within the network's customer base), that determine who is the owner of the SIM and if the SIM is using the net in Roaming or with local subscriptions. SIMs also comprise one or more MSISDNs, which are the telephone numbers used by mobile phones or M2M devices to make and receive calls, SMS or data packages. Each MSISDN is also a primary key to the HLR record. In summary, there is a relationship between the HLR, MSISDN, IMSI, ICCID and the SIM. The SIM is the physical device, which contains a record of the IMSI; The SIM is identified by the ICCID. The MSISDN is the unique number identifying the mobile phone. The IMSI is the unique identifier of the user subscribing to the network, and the HLR is the system that maps MSISDNs to IMSIs and vice versa. The MSISDN and IMSI identifiers are static data which are provided by the IMSI platforms, being static parts of a subscription. The IMSI/MSISDN pair is associated with only one logical HLR, and with a given SIM provider's embedded SIM card (eUICC). The IMSI SWAP process changes the MSISDN/IMSI pair which is associated with the embedded SIM card.

The Embedded Universal Integrated Circuit Card (eUICC) is an embedded SIM, embedded in a communication device in such a way that the UICC is not easily accessible or replaceable.

Over-the-air programming (OTA) refers to various methods of distributing data, new software updates, configuration settings, and even updating encryption keys to devices like cell phones, or M2M devices based on communications between mobile operator and the SIM located on the devices.

A first aspect of the present invention refers to a method for managing subscriber devices in mobile networks, which comprises the following steps:
in a home network of a first mobile network operator, obtaining data associated with at least one physical SIM of a subscriber device, which comprises an embedded SIM card, subscribed in the home network;
in a destination network of a second mobile network operator, to which the subscriber device travels, obtaining data, comprising static data and dynamic data, associated with at least one virtual SIM of the device;
obtaining the dynamic data from a SIM provider platform on which the destination network relies, the dynamic data comprising a subscriber authentication key;
storing the static data in at least a pool of the destination network, the static data comprising IMSI and MSISDN identities;
for a selected virtual SIM, checking in a mapping table of the first mobile network operator whether there is an association between the static data for the selected virtual SIM and the data of the physical SIM obtained in the home network.

In a preferred embodiment, when a request for an IMSI swap is sent from the home network to the destination network, in case that there is no data association with the physical SIM in the mapping table, the present invention allows to obtain the static data of the selected virtual SIM from the pool of the destination network and associate in the mapping table the data of the selected virtual SIM, the obtained static data and the dynamic data obtained from the SIM provider, with the data of the physical SIM. In addition, the method further comprises:
removing the static data of the selected virtual SIM from the pool of the destination network;
loading the static data and dynamic data of the selected virtual SIM in the embedded SIM card;
disabling the data of the physical SIM in the embedded SIM card while enabling the static data and dynamic data of the selected virtual SIM.

These enabled static and dynamic data of the selected virtual SIM, along with the data of the physical SIM, are then used to launch an IMSI swap.

In a posible embodiment of the invention, the association between data of the physical SIM with the (static and dynamic) data of the selected virtual SIM can remain stored in the mapping table during a quarantine time, configurable by the first mobile network operator.

In a second aspect of the present invention, a system for the management of subscriber devices in mobile networks is disclosed. The system comprises an origin network and a destination network, and comprises means for implementing the method described before.

The method in accordance with the above described aspects of the invention has a number of advantages with respect to prior art, which can be summarized as follows:
Although existing solutions enabling to SWAP credentials in a SIM and to use them as they were local credentials, some main problems for allowing global connectivity are not sorted out. On the contrary, the present invention provides global connectivity to M2M or mobile devices by defining how to get dynamic data which comprise the authentication keys that SIM has to use in order to register to the network from a different SIM provider (and also how the authentication keys are sent to the SIM during SWAP securely). Dynamic data are provided by a SIM provider and can be interchanged between the SIM provider and another different one so that the provider's SIM card can get registered to the network from another SIM provider.
In addition, the present invention teaches how to make an efficient use of IMSIs, so that they cannot be blocked only for the SWAP.
Also, the present invention allows global connectivity by providing a system architecture in charge of controlling the invoices generation, even after the SWAP takes place (or when the SWAP is reversed).

In addition to interoperability, security aspects are taking into account in the present invention to integrate platforms from different MNOs and SIM providers and to exchange information and orders with the objective to allow the SWAP of the SIM credentials and to allow the origin MNO to be able to monitor the use and consumption of SIMs once the change has been made. Thus, the integration between different stakeholders is done using a secure environment where only the valid data and orders provided by an authorized authority are interchanged.

Besides, the present invention proposes a method to SWAP the credentials and other data in the SIM that can be performed independently of the card type, and regardless of MNO platform or the SIM provider on whom the MNO relies.

These and other advantages will be apparent in the light of the detailed description of the invention.

DESCRIPTION OF THE DRAWINGS

For the purpose of aiding the understanding of the characteristics of the invention, according to a preferred practical embodiment thereof and in order to complement this description, the following Figures are attached as an integral part thereof, having an illustrative and non-limiting character.

PREFERRED EMBODIMENT OF THE INVENTION

The matters defined in this detailed description are provided to assist in a comprehensive understanding of the invention. Accordingly, those of ordinary skill in the art will recognize that variation changes and modifications of the embodiments described herein can be made without departing from the scope and spirit of the invention. Also, description of well-known functions and elements are omitted for clarity and conciseness.

Of course, the embodiments of the invention can be implemented in a variety of architectural platforms, operating and server systems, devices, systems, or applications. Any particular architectural layout or implementation presented herein is provided for purposes of illustration and comprehension only and is not intended to limit aspects of the invention.

Figure 1:
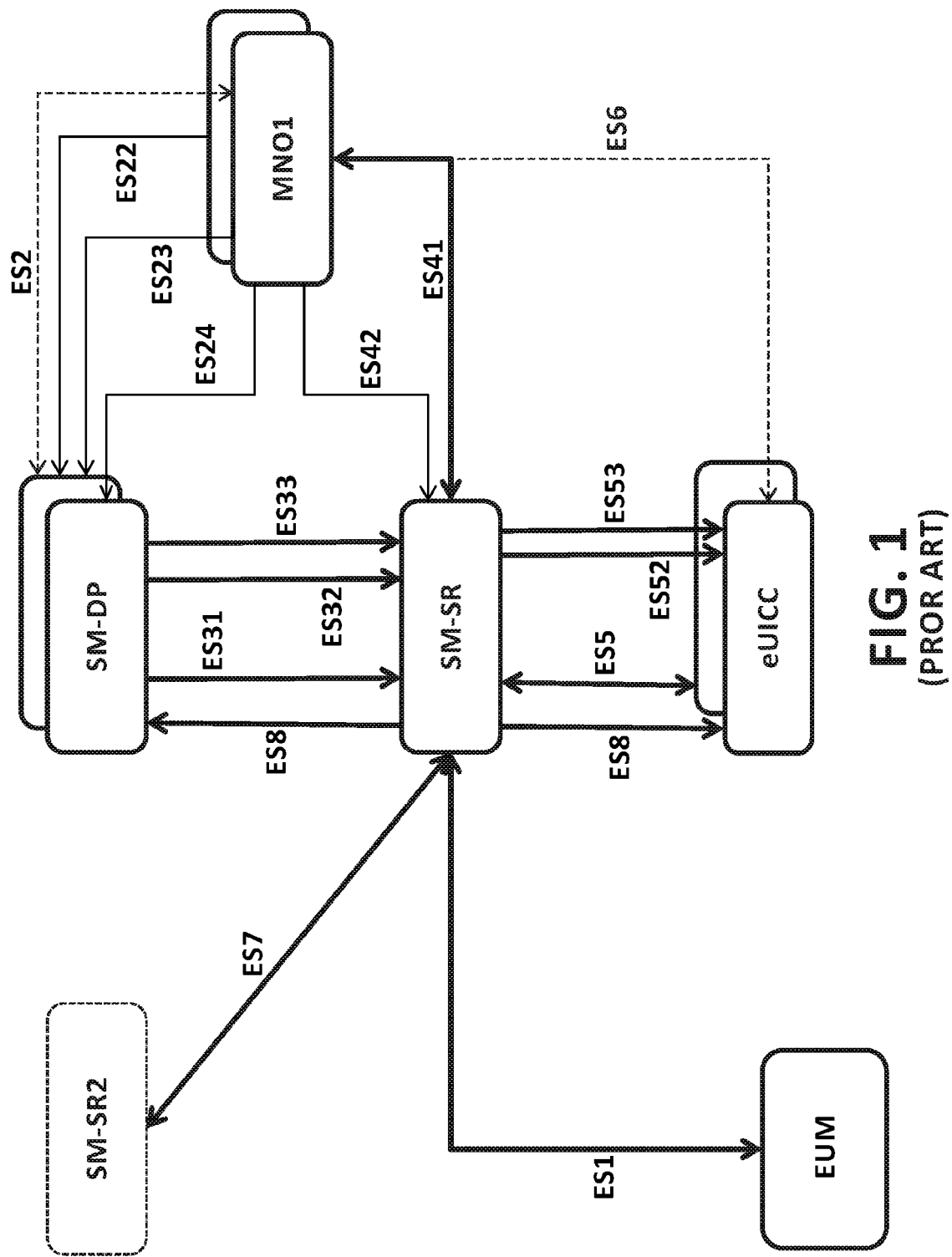
FIG. 1 shows a block diagram of GSMA system architecture as known in prior art.

FIG. 1 presents the GSMA system architecture, which is a standard subscription management architecture, wherein each Mobile Network Operator (MNO) may develop its solutions for the remote personalisation of their SIMs based on the standard. This prior-art solution comprises a remotely provisioning SIM, between two operators who can have implemented fundamentally different technical approaches to personalise their SIMs but based on the standard. The GSMA architecture for the remotely provisioned SIM has three main actors:

The Subscription Manager (SM), which is responsible for the secure processes via which a MNO is able to personalize an embedded SIM or eUICC over the air. The SM generates the SIM profiles in real-time, manages and executes mobile operator policy, and secures routing of profiles to the embedded SIM.

The Mobile Network Operator (MNO), using the SM to manage profiles.

The SIM embedded card, which is an embedded SIM or embedded UICC (eUICC), functionally identical to a traditional SIM card, but the embedded SIM/UICC may have a 'provisioning profile' associated at manufacture with secret keys, which allows the associated subscription manager to manage 'operational profiles' on the card.

In order to facilitate a secure and easy method of selecting and installing different mobile operator credentials, the Subscription Manager (SM) includes two key network elements, which need to be certified to guarantee the secure encryption and transportation of operator credentials:

Subscription Manager Data Preparation (SM-DP): Entity which operators use to securely encrypt their operator credentials ready for over the air installation within the SIM. The SM-DP securely package to be provisioned on the eUICC. The SM-DP manages the installation of these profiles onto the eUICC.

Subscription Manager Secure Routing (SM-SR): Entity, which securely delivers the encrypted operator credentials to the SIM and then, once the credentials are installed, remotely manages the SIM thereafter (enable, disable and delete the credentials as necessary during the product lifetime). The SM-SR ensures the secure transport of both eUICC platform and eUICC profile management commands in order to load, enable, disable and delete profiles on the eUICC.

In order to support eUICCs' remote provisioning, the steps followed in the GSMA's architecture shown in FIG. 1 are:

1) Profile Ordering (ES2): This process covers the different aspect of exchanging the subscription details between a first Mobile Network Operator (MNO1) and the Subscription Manager Data Preparation (SM-DP). The MNO1 provides an order to SM-DP. The order contains production data such as the MNO Profile specification, a quantity and a Start-IMSI, an IMSI range or a list of IMSIs. Then, the SM-DP starts production and creates the Profile along with Profile-specific data based on the MNO1 specification, combining the profile with specific data, including credentials and keys (which are created in secure environment). The SM-DP addresses the procedures which ensure a created Profile (from a generic Profile) that can only be installed on a specific embedded card (eUICC).

2) Registration (ES1) at a Subscription Manager Secure Routing (SM-SR): This is a prerequisite for remote management. In this step, the eUICC Manufacturer (EUM) sends a request to a selected SM-SR to register a newly manufactured embedded card (eUICC).

3) Use a SIM: In order for the device to be used for communication services, the eUICC must be loaded with at least one Operational Profile (the MNO profile used by defect and assigned during the SIM manufacturing).

4) When the SIM has a Profile enabled, the MNO1 can use it (ES6) via an interface between the eUICC and the MNO1.

5) Profile Download and Installation: To download and install a new profile to the given eUICC, the MNO1 sends a Profile Download request to the SM-DP (ES22). The request must include the relevant information to allow the identification of the SM-SR and eUICC. The MNO1 may also ask the SM-DP to enable the Profile once it is downloaded and installed. SM-DP asks the SM-SR (ES31) to establish a secure transport channel between the eUICC and SM-SR. This secure transport channel is for protection of Profile management commands not the Profile itself. The SM-DP initiates the Profile download and install to the eUICC using a secure channel between the SM-DP and the eUICC (ES8), and within the established secure transport channel between the SM-SR and eUICC (ES5).

6) Profile Enabling: Once a new profile has been downloaded in a given eUICC, it is possible to switch between two profiles. To do that, the new profile must be enabled, via SM-SR or via SM-DP, and the old one should be disabled. If the request is via SM-SR (ES41), the request is issued directly by the MNO to the SM-SR associated with the target eUICC. After that, SM-SR checks if both the currently Enabled Profile and the target Profile permit the Profile switch to take place and SM-SR issues a Profile Enabling request (ES52) to the eUICC. In the profile enabling via SM-DP (ES23), the request is issued by the MNO to the SM-DP, which forwards it to the SM-SR (ES32) associated with the target eUICC. In this way, the MNO does not have to be linked to the SM-SR and relies on the SM-DP to make the connection.

7) Profile Disabling: This step allows the Enabled Profile to be disabled and a Provisioning Profile to be enabled. Prior to switching a profile or enabling it, another one must be disabled. Besides, prior to deleting a profile, it must be disabled. Profile Disabling can be performed via SM-SR (ES42) or via SM-DP (ES24). If the request is via SM-SR (ES42), the request is issued directly by the MNO to the SM-SR associated with the target eUICC. After that SM-SR checks if Enabled Profile permits the Profile to be disabled and checks if the Provisioning Profile allows it to be enabled. Then the SM-SR issues a Profile disabling request to the eUICC (ES53). In the profile disabling via SM-DP (ES24), the request is issued by the MNO to the SM-DP, which forwards it to the SM-SR (ES33).

8) Profile Deletion: The MNO decides that is not going to use Profile anymore and decides to permanently delete a Profile on a eUICC. A Profile only can be deleted by its MNO. Profile deletion, like profile disabling, can be requested via SM-SR or the SM-DP. If the request is via SM-SR, the request is issued directly by the MNO to the SM-SR associated with the target eUICC. If the target Profile is enabled, the SM-SR starts the Profile Disabling procedure and sends the request to the eUICC. In the profile disabling via SM-DP, the request is issued by the MNO to the SM-DP2, which forwards it to the SM-SR.

9) SM-SR Change (ES7): In this step, someone decides to change the SM-SR where a eUICC is register from the current—first—SM-SR to a second SM-SR (SM-SR2). Prior to the procedure being executed, the MNOs with installed profiles on the concerned eUICC may request to be informed on the change by the current SM-SR. During this process a new-shared key set is established between the second SM-SR (SM-SR2) and the SIM via the secure channel (ES8) provided by the first SM-SR. After that, the second SM-SR (SM-SR2) can address the profiles in the SIM directly.

It is within this context, that various embodiments of the invention are now presented with reference to the FIGS. 2-34.

Figure 2:
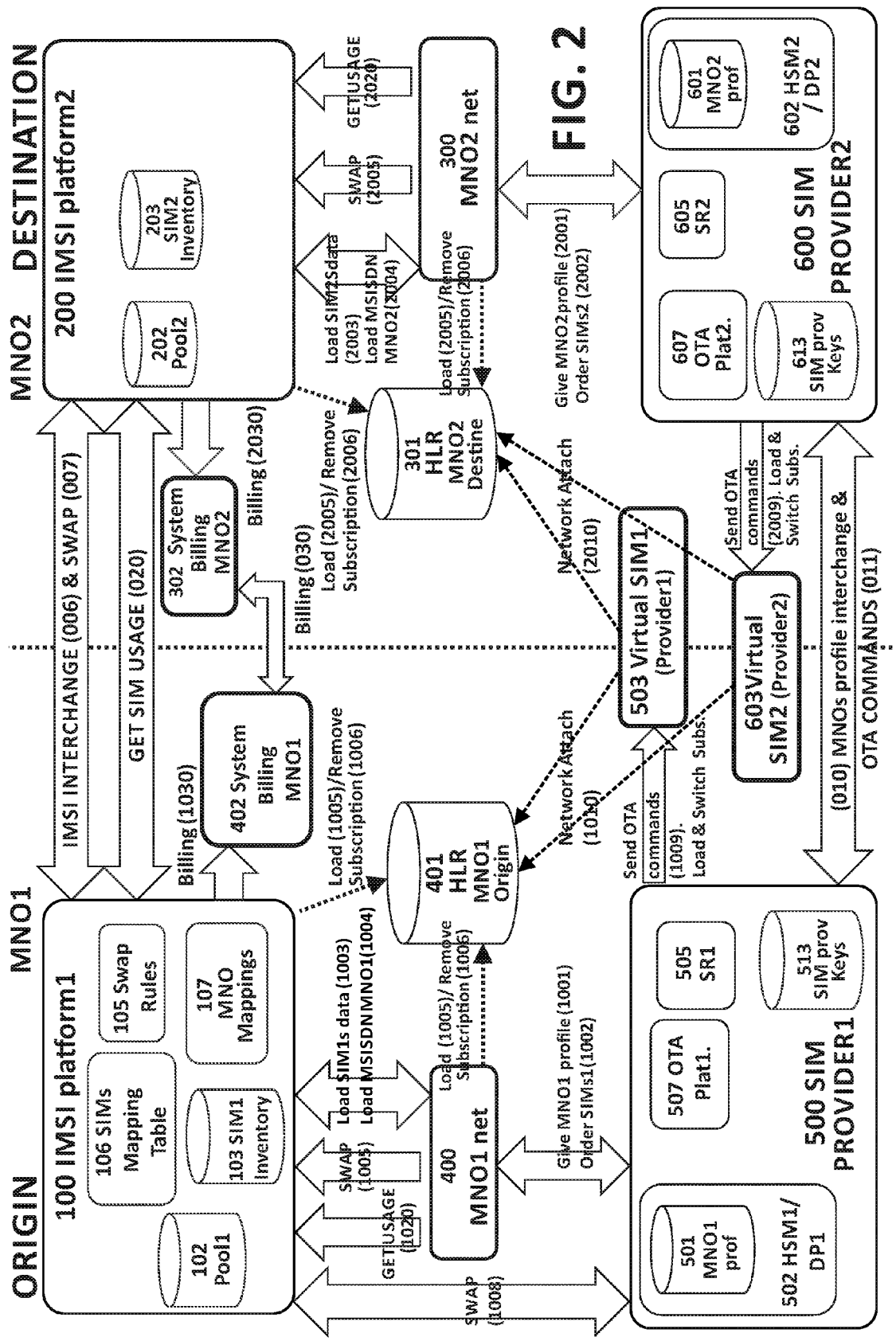
FIG. 2 shows a block diagram of system architecture for dynamic managing of subscriber devices between mobile networks, according to a preferred embodiment of the invention.

FIG. 2 depicts the overall architecture for the integration between two telecommunication systems in different cellular networks: on the left, the origin or home network (400) of the first Mobile Network Operator (MNO1) is shown; on the right, the destination network (300) of the second Mobile Network Operator (MNO2) is represented. The home network (400) is where the M2M device or the mobile phone of a traveller is initially set up. Therefore, MNO1's credentials are initially pre-loaded in the SIM card. The destination network (300) is where the M2M device or the mobile phone of the traveller is going to be moved. MNO2's credentials will be dynamically provisioned in the SIM when it reaches the destination. After changing the credentials, SIM should be registered on the destination as if it were a SIM using local credentials and avoiding the charges by roaming.

Although integration might take place between multiple and different types of telecommunication network, including two or more MNOs, MVNOs and MVNEs, in FIG. 2 there are only represented two MNOs (MNO1, MNO2) for simplicity. The home network (400) of MNO1 comprehends a Home Location Register or HLR (401), a billing module (402), a platform to manage IMSIs (100), a physical SIM or a Virtual SIM (503) manufactured by a first SIM provider (SIMprovider1) and the platform of the first SIM provider (500).

The destination network (300) of MNO2 comprehends a Home Location Register or HLR (301), a billing module (302), a platform to manage IMSIs (200), a physical SIM or a Virtual SIM (603) manufactured by a second SIM provider (SIMprovider2) and the platform of the second SIM provider (600).

The HLR (401,301) is a central database containing the details of each mobile phone subscriber who is authorized to use its MNO network: MNO1 and MNO2 respectively.

A physical SIM is a plastic card with embedded electronic circuitry, which is inserted into the mobile phone or the M2M device. Each SIM has a unique identifier called an IMSI, which is a primary key to each HLR record. SIMs also comprise one or more MSISDNs, which are the telephone numbers used by mobile phones or M2M devices to make and receive calls, SMS or transmit and receive data packages. Each MSISDN is also a primary key to the HLR record.

SIM cards are normally ordered (1002, 2002) to specific manufacturers or card suppliers by the MNOs. When SIMs are shipped to MNO's clients, they usually contain a default IMSI and credentials of the MNO who ordered their manufacturing and which are used to connect to its cellular network (1010, 2010).

SIM credentials contain an IMSI and a unique key Ki which is an individual subscriber authentication key generated from its IMSI. The subscriber authentication key Ki is dynamic data, generated on demand and based on the IMSI. The IMSI and key are stored in the physical SIM (1005, 2005) and loaded on the HLR (401, 301). Ki key is used to authenticate whether an IMSI is allowed to use the MNO's net resources. Since the data needed to generate the Ki keys are very sensitive, not all SIM providers have access to the data needed to generate them, due to the fact that these dynamic data were only provided to the SIM providers (1001, 2001) whom the MNOs signed an agreement.

A Virtual SIM (503, 603) is a special type of SIM that contains specialized software that allows the dynamic change of IMSI and credentials used by the SIM to register to the network, avoiding roaming charges and enabling to register to the net as if it were a local subscription. This process is known as SWAP and needs to be carried out by a SIM provider platform (500,600) that sends messages or orders to the Virtual SIM software to execute specific commands.

Both SIM provider platforms (500, 600) comprises: a Secure Routing module or SR (505, 605), a Data Preparation or DP module (502, 602), an OTA platform (507, 607), and two repositories: one of the repositories (501,601), including in the Data Preparation module, which stores the data for the generation of MNO's credentials and Ki keys; the other repository (513, 613) is used to store the keys to cipher the communication interchanged between SIM provider platforms (500,600).

The information that SIM providers platforms (500,600) and the Virtual SIM exchange is really sensitive, since it may include a new IMSI and Ki key authorizing the destination network registration (1010, 2010). Therefore, it is vital to cipher all the information exchanged by the Virtual SIM and the SIM provider platforms (500,600). The module in charged of encrypting information is the SR (505, 605) and the module in charged of generating the information to be transmitted to the Virtual SIM card by the Secure Routing is the DP (502, 602). Each communication between SR and DP must also be encrypted.

For the communication between SR and the Virtual SIM some commands are sent using the OTA platform (507, 607). The OTA commands (1009, 2009) that SR sends to the Virtual SIM include the orders to load and delete the MNO subscriptions into the SIM, and to switch the active subscription.

As mentioned above, MNOs only cease their sensitive data only to certain SIM providers with whom they have signed a contract. So it may happen that the first SIM provider's platform (500) in charge of launching the SWAP on a first SIM or SIM1 (503) is not be the same SIM provider in which MNO2's network (300) trusts on, and which has provided its credentials. Therefore, SIM provider1 does not have all the dynamic data needed to generate MNO2 credentials in the destination network (300). In this case, it is needed that the information will interchange cyphered MNOs profiles (010) between the platforms of SIM provider1 (500) and SIM provider2 (600). This information is cyphered using the key stored in the key repository (503, 603), where the data required to codify the information exchanged between SIM providers is stored. It may happen that the SIM1 provider platform (500), having the infrastructure to make the SWAP, needs to send commands to load and change subscriptions (603) in SIMs, such as a second Virtual SIM or Virtual SIM2, which have not been registered in the SIM provider1 platform (500) and are registered in the platform of SIM2 provider (600). In this case, the SIM1 provider platform (500) normally sends the OTA commands to change subscriptions (011) via the SIM2 provider (600), and the platform of the SIM2 card provider (600) is the one in charge of sending the corresponding commands to the Virtual SIM2 (603).

SIM providers can locate the SIMs to apply the SWAP for by its MSISDN, and not by its IMSI. But since the range of MSISDN available is limited, the relationship between the IMSI and the MSISDN is managed dynamically and only by the IMSIs platform (100,200). Therefore, during the SWAP process, the IMSIs platform (100) must tell to the SIM provider1 platform (400) about the SIM over what perform the SWAP, by identifying it with its MSISDN and IMSI, and the IMSI/MSISDN that the SIM is going to use after SWAP (1008). Some functions performed by IMSIs platform (100, 200) are: to choose which IMSI/MSISDN are going to be used in the destination network, to maintain a relationship between the IMSI/MSISDN in the origin and destination networks, to bill the customer properly, to charge the IMSI into the IMSIs platforms (100, 200) for the SWAP. But IMSIs platforms (100, 200) are also responsible for managing the consumption of SIMs in the origin and destination networks (400, 300) respectively, and for billing the consumption, for controlling the SIM state in which SIM is, to let pass certain type traffic or not, etc. And above all, one of the most important functions by IMSIs platforms (100, 200) is the MSISDNs management and the allocation of the MSISDN to the SIM that are going to use them. In M2M world where the number of devices is high, the MSISDN allocation to SIMs must be managed efficiently because of the fact that the MSISDN range available is much less than the number of existing M2M devices. In those situations, IMSIs platforms should be able to reassign the association of the MSISDN/IMSI to another SIM when the previously one will no longer used anymore. The MSISDN/IMSI pair is static data as is stored in a pool (102, 202) of the IMSIs platform.

The IMSIs platform of the MNO2 network or IMSI2 platform (200) is in charge of managing the IMSIs of MNO2 network (300), while the IMSIs platform of the MNO1 network or IMSI1 platform (100) is in charge of managing the IMSIs of MNO1 network (400). It is assumed that IMSIs2 platform (200) does not have the necessary infrastructure to launch the SWAP, and therefore it only has a pool of MSISDN2/IMSIs2 (202) and a SIM2 repository (203). By other hand, IMSIs1 platform (100) has the entire necessary infrastructure to launch the SWAP. It has also a pool of MSISDNs1/IMSIs1 (102), a SIM1 repository (103), a table of mappings between MNOs (107), and a table of mappings between data that SIMs used in the origin net and destination net (106) and a module to control under what circumstances should the SWAP be launched (105).

When a MNO orders to a SIM provider the manufacturing of some SIMs, it provides some parameters (1002, 2002) such as the IMSI, etc. When SIMs are manufactured and shipped to the MNO, the SIM provider generates a file with the association between the IMSI and the IDICC (International Circuit Card Identifier) assigned by the manufacturer. This file is loaded (1003, 2003) by the MNO1 and the MNO2 networks (400,300) in each IMSIs platform (100, 200), and stored in the SIM Inventory (103, 203) of each of the IMSIs platforms (100,200) respectively. Before being able to use the SIMs, a MSISDN has to be allocated (1004, 2004) to a SIM and loaded in the HLR (1005, 2005). The relationship between MSISDN, IMSI and the identification number of the SIM card or IDICC is set up by the IMSI platform (100, 200), and stored in the SIM inventory (103, 203). MNO1 and MNO2 networks (400,300) can have a forecast of set of IMSIs/MSISDN not allocated to any SIM to load on the IMSI platform and to store in their respective pools, pooh (102) of MNO1 and pool2 (202) of MNO2 respectively. MSISDN/IMSI not associated to any SIM may be used in the future to the target IMSIs platform, which can choose a MSISDN/IMSI during the SWAP, but can also be chosen to be assigned to physical SIMs that do not have this information yet.

When MNO1 request a SWAP (1005), the IMSI1 platform (100) launches a request to IMSI2 platform (200), to ask for a new IMSI/MSISDN not used (006). The IMSI2 platform (200) gets an IMSI/MSISN available from its pool2 (202) and removes it from the pool2 (202) so that it cannot be used again. In the event that the SWAP were launched by MNO2 (300) and by the IMSIs2 platform (200), the IMSIs1 platform (100) would choose an IMSI/MSISDN available from its pooh (102). When IMSI1 platform (100) receives the selected IMSIs/MISISDN, stores the relationship between the SIM data in the network of MNO1 (400), here referred to as IMSI1/MSISDN1, and in the destination network of MNO2 (300), here referred to as IMSI2/MSISDN2, in the mapping table (106) of the IMSIs1 platform (100). Then the IMSIs1 platform (100) launches the SWAP request (1008) to the SIM provider1 platform (500) in order to send the information to the Virtual SIM of provider1 or Virtual SIM1 (503) by OTA commands (1009).

If SWAP is successful, the IMSIs1 platform (100) is informed by the SIM1 provider platform (500) about the success of the operation, and the IMSIs1 platform also reports (007) to the IMSI2 platform, (200) so that it begins to monitor the Virtual SIM consumption (503) in the MNO2 network (300).

But the SWAP cannot be launched against any MNO. Before being able to launch a SWAP, a contract between MNO1 and MNO2 must have been signed and they have reached an agreement on how the MNO1's customer's consumption in the MNO2 network (300) is going to be billed, and how much the MNO1 will pay to MNO2 for the use of the service. In the MNO mappings table (107), the MNO1 stores the list of countries that with the MNO1 has signed an agreement with some MNO2, and the list of MNO2 whom with it has been signed. Moreover, MNO1 (400) can configured under what circumstances the SWAP will be launched and under what agreement in the SWAP Rules Table (105). The SWAP can be launched manually (1005), or automatically when one of the conditions of rule set in SWAP Rules table (105) is accomplished. This table is used to configure whether the SWAP will be launched, for example when the SIM registers in the network of a given MNO, if the destination is known, or when some period of time has come to an end, if it is known that it will take some time to the SIM to reach the destination, or if the SWAP is launched when the SIM register in the net of a MNO and not to another, when the SIM arrives at a certain country.

Besides, the relationship between the data of the SIM used in the origin network (400) and in the destination network (300) is stored for billing purposes in the mapping table (106). This data association is also used in case of a request of SWAP-back, when the SIM returns to the origin country. In a requested of SWAP back, the credentials of the Virtual SIM are going to change again, so that the Virtual SIM (503) can register into the MNO1 network with its old credentials and IMSI1. The relationship between the IMSI1 and IMSI2 remains in the mapping table (106) during a certain time, called quarantine time. During this time, after a SWAP back, if there is a SWAP request to change the credentials of the Virtual SIM (503) to the credentials of MNO2 (300), it is also not needed to request a new IMSI2/MSISDN2 to the IMSIs2 platform (200), but the relationship of the mapping table (106) can be reused.

The quarantine time is a pre-set time, during which the IMSIs from both home and destination networks (400, 300) are locked and cannot be reused for other purposes. During the quarantine, although, for example a SWAP back has been made on the Virtual SIM1 (503) with the IMSI1, and the IMSI2 has not being used by none SIM to connect to the MNO2 network, the IMSI2 is blocked, since during the quarantine time the IMSI2 platform (200) and the Billing system of MNO2 (302) may collect any IMSI2 consumption from previous months, that must be associated with IMSI1 currently used by the Virtual SIM1 card.

After the quarantine period, the relationship between the IMSIs is deleted from the mapping table (106). In case that, there had been a SWAP back request, the IMSI2 is returned to pool2 (202), and removed from HLR2 (301) (2006) and it can be reused again for the IMSIs2 platform (200). If there had not been a SWAP-back request, and the quarantine time is exceeded, it is assumed that there will not be a SWAP back anymore and Virtual SIM1 (503) will remain indefinitely in the operator's network MNO2, so the IMSI1 may be reused in the IMSIs1 platform (100), and it will be returned to pool1 (102) and it will removed (1006) from HLR1 (401). In this case, if a SWAP back is requested after the quarantine time expired, the request is treated as a new SWAP request, and the IMSI from the MNO1 network (400) associated after SWAP will not necessarily be the same that the SIM initially had in this origin network (400).

By other hand, if the MNO2 wanted to launch a SWAP or SWAP back request (2005), IMSI2 (200) platform could not do it directly, since it does not owns the necessary infrastructure, but it should redirect the request (007) to the IMSIs1 platform (100) which is in charge of orchestrating the request.

Finally, if during the SWAP, the MNO2 destination network (300) or the MNO1 home network (400) wants to see of the usage of the services done by the SIM in others MNO's network, depending on whether the SIM is in SWAP or not, a request is redirected to its own IMSIs platform (1020, 2020) to get the consumption data of their own platform, or the request (020) is redirected to the other IMSIs platform from others MNOs where the SIM is currently registered.

Similar flow is followed for the billing, if during SWAP, the Billing system of MNO1 (402) or Billing system of MNO2 (302) wants to get the billing of a SIM, a request is redirected to the IMSIs platform (1020, 2020) that gets the bill for the SIM (1030, 2030) during the period when the SIM is not for SWAP and/or it the request (030) is redirected to the billing system of a MNO where SIM is currently registered, in order to get the data of the billing from its own IMSIs platform or from an external system such as the MSC (Mobile switching centre), the SMSC (Short Message Service Centre), etc.

Figure 3:
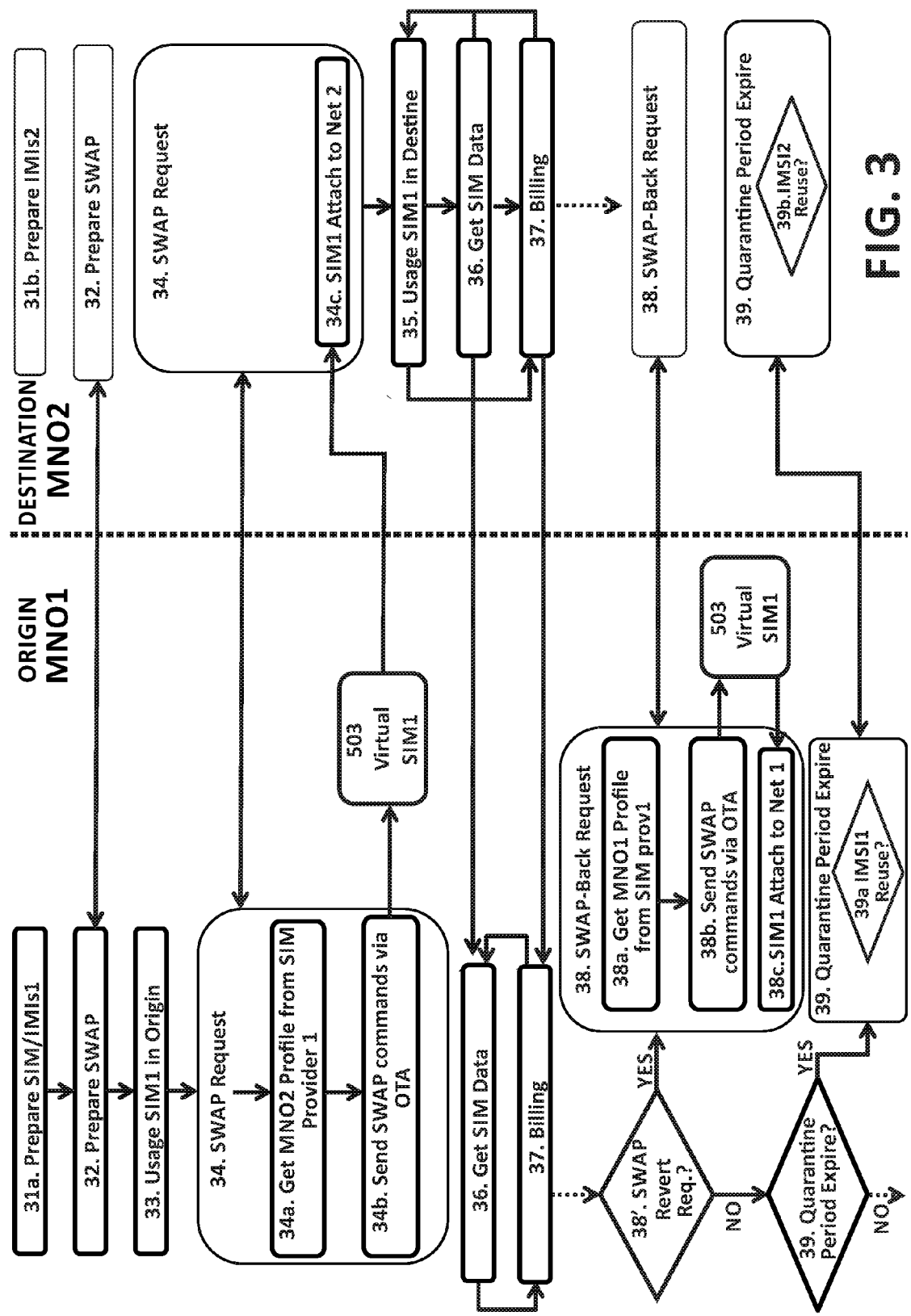
FIG. 3 shows a message diagram of communication flow between the mobile networks of the previous system, according to a preferred embodiment of the invention.

FIG. 3 details the main steps of the overall case process for managing the subscriber devices between MNO1 and MNO2, following the same nomenclature of FIG. 2 and assuming that MNO1 home network (400) performs the SWAP request through the IMSIs1 platform (100) and the SIM provider1 platform (500). The SWAP is done on the Virtual SIM1 (503), and MNO2 destination network (300) trusts on the SIM provider1; therefore, its platform, the SIM provider1 platform (500), already has the credentials of MNO2 and so data interchange between SIM provider1 platform (500) and SIM provider2 platform (600) is not required. The left side of FIG. 3 shows the steps followed during the IMSI SWAP process by the platforms of the MNO1 in the origin network (400) and on the right side FIG. 3 shows the steps followed by the platforms of the MNO2 in the destination network (300). These overall process steps are:

Initial Step (31a, 31b): The data initially assigned to the Virtual SIM1 (503) and that allow the SIM to be used in the MNO1 origin network (400) are loaded (31a) on IMSIs1 platform (100). In parallel, in MNO2 destination network (300) some IMSIs/MSISDNs not associated to any SIM in the MNO2 network are loaded (31b) into the IMSIs2 platform (200). These IMSIs/MSISDNs will be assigned to the SIM during SWAP so that this SIM can connect to the MNO2 network (300). These steps (31a, 31b) for preparing IMSI1 and IMSI2 respectively in IMSIs1 platform (100) of MNO1 and IMSIs2 platform (200) of MNO2 are further described in FIGS. 4 and 5 respectively.

SWAP preparing Step (32): The parameters needed to launch the SWAP are configured on the IMSIs1 platform (100), for example, under what circumstances the SWAP will be performed and which MNO can involve. These settings must be notified and accepted by MNO2 destination, so the IMSIs2 platform (200) can be informed about it to set an agreement. This SWAP preparing Step (32) is described in further detail in FIG. 6 and involves simultaneously both IMSIs platforms (100, 200).

Step (33) of usage of SIM1 in the home network (400) of MNO1: Before the SWAP1, Virtual SIM1 (503) can be used normally in MNO1 network (400). This process is not detailed further in depth as not being relevant for the present description of the invention.

SWAP request Step (34): The traveller or the M2M device containing a SIM1 travels to the MNO2 network (300). SIM registers into the MNO2 destination network (300). A SWAP operation is launched manually by home network (400) or automatically by the IMSIs1 platform (100) of MNO1 when SWAP Rules module (105) is triggered. IMSIs1 platform (100) starts a dialogue (34) with the IMSIs2 platform (200) to get the IMSIs/MSISDN that SIM will use in the destination network (300). It also starts a dialogue (34a) with the SIM1 provider platform (500) to get MNO2 profile and (34b) to launch the SWAP by OTA commands. SWAP request Step (34) is described in more detail in FIG. 7 and involves simultaneously both IMSIs platforms (100, 200). To be capable of performing the SWAP, besides of getting the IMSIs and MSISDN that SIM will use in the MNO2 net (300), the MNO2 credentials must also obtained. In this case, SIM provider1 platform (500) can get the data from its own platform, explained in more detail in FIG. 8. Then all the information, MNO2 credentials, MSISDN2, and IMSI2, is sent using OTA commands to the Virtual SIM1 (503), as further described in FIG. 9, through the SIM provider1 platform (500). After that, the Virtual SIM1 can be registered and successfully attached (34c) to the MNO2 network (300).

Step (35) of usage of SIM1 in the destination network (300) of MNO2: After the SWAP, the Virtual SIM1 (503) can be used in the MNO2 destination network (300) without being charged by roaming. This process is not detailed further in depth as not being relevant for the present description of the invention.

Getting SIM data Step (36): During the time the traveller or the M2M device is in the MNO2 destination network (300), the traveller or the M2M device owner can have access to their consumption data, further described in detail in FIG. 10. This involves a set of interactions between the IMSIs1 platform (100) and the IMSIs2 platform (200) to get the consumption data of SIM1 in the destination network (300) and in the origin network (400), and to calculate the real consumption of the device before, during and after the SWAP, and to show the data to the user.

Billing Step (37): During the time the traveller or the M2M device is in the MNO2 network (300), the traveller or the M2M device owner can have access to their invoices, further described in detail in FIG. 11. This involves a set of interactions between the IMSIs1 platform (100), the IMSIs2 platform (200) and the Billing system of MNO1 (402) and Billing system of MNO2 (302) to get the billing data of the SIM1 both in the destination network (300) and in the origin network (400), in order to calculate the actual cost of the device before, during and after the SWAP, and to show the data to the user.

SWAP-Back request Step (38): In a certain time, the traveller or the M2M device containing a SIM1 comes back and it register into the MNO1 network (400). An operation to reverse the SWAP is launched manually by MNO1 (400) or automatically by the IMSIs1 platform (100) when a SWAP Rule (105) is triggered. IMSIs1 platform (100) starts a dialogue with the IMSIs2 platform (200) and with the SIM1 provider platform (500) to launch the SWAP-back, or to reverse the SWAP (38'). This process is described in more detail in FIG. 12 and involves simultaneously both IMSIs platforms (100, 200). To be capable of performing the SWAP-back, besides of getting the IMSIs and MSISDN that SIM will use in the MNO1 net (400), the MNO1 credentials must also obtained (38a). In this case SIM provider1 platform can get the data from its own platform, explained in more detail in FIG. 8. Then, all the information, MNO1 credentials, MSISDN1, and IMSI1, is sent using OTA commands (38b) to the Virtual SIM1 (503), as also described in FIG. 9, through the SIM provider1 platform (500). After that, the Virtual SIM1 can be registered and attached to the MNO1 network (400) successfully (38c).

Checking quarantine period Step (39): When the quarantine period has elapsed, the IMSIs1 platform (100) lets the IMSIs2 platform (200) know about it, as described in detail in FIG. 13. If there has not been a request to reverse the SWAP, the SWAP is considered permanent, and the Virtual SIM1 (503) is assumed to remain indefinitely on the MNO2 network (300), so the MSISDN1/IMIS1 of the SIM is not going to be used in the home network (400) anymore, and MSISDN1/IMIS1 can be returned to the pool of MNO1, pooh (102), in order to be re-used (39a). By other hand, when the quarantine time expires, if there has been a request for SWAP back, any more consumption of SIM1 in MNO2 network (300) will not arrive, and therefore the MSISDN2/IMIS2 of SIM used on the destination network (300) can be returned to the pool of MNO2, pool2 (202), in order to be reused (39b). When the quarantine period expires, if there is a request for SWAP or for SWAP back, it will not be possible to recover the same relation between IMSI1/IMSI2 initially used, so a new sequence of SWAP has to start.

Figure 4:
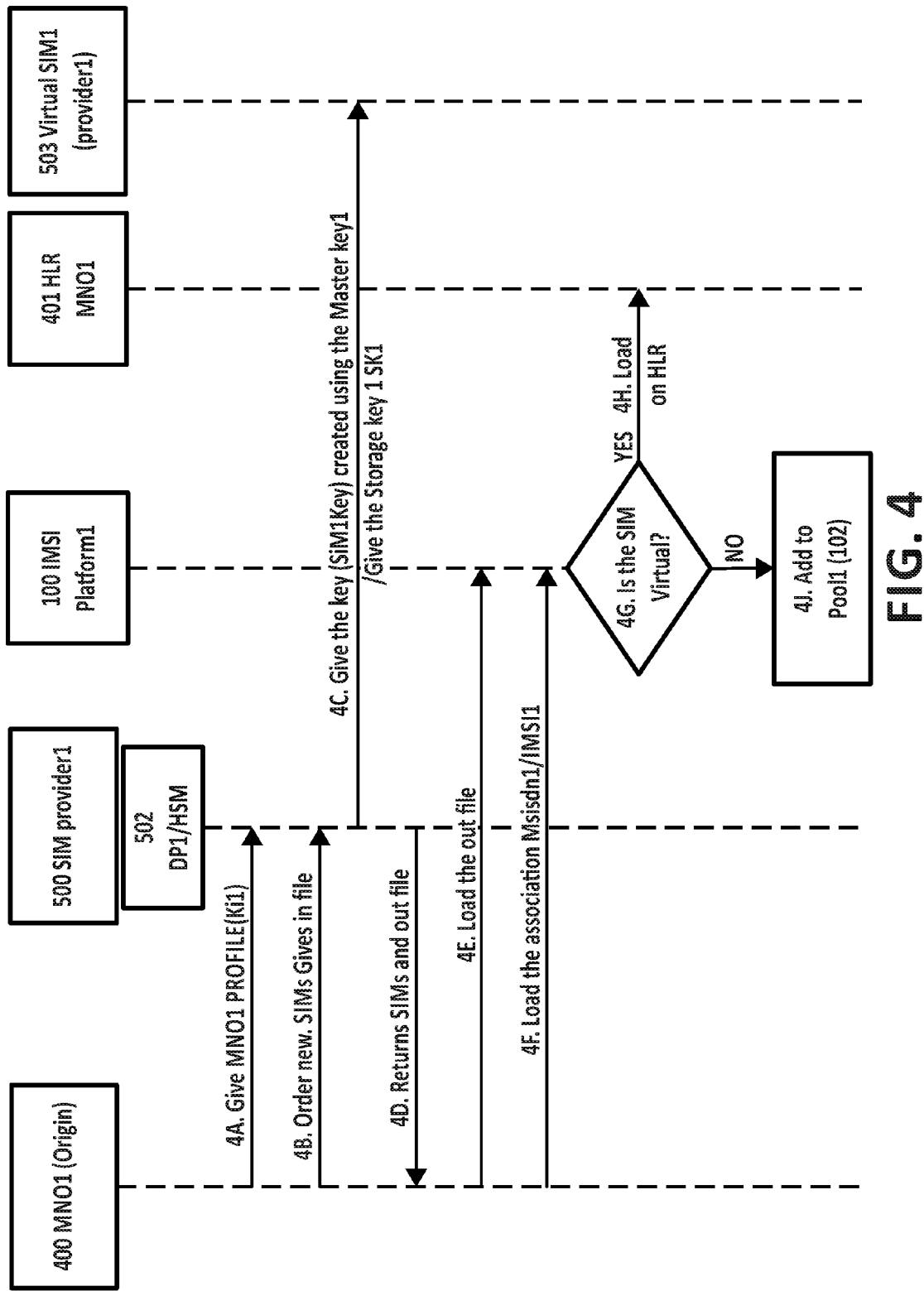
FIG. 4 shows a message diagram of communication flow for preparing data of a physical SIM in the mobile origin network of the system depicted in FIG. 2, according to a preferred embodiment of the invention.

The steps so that Virtual SIM1 (503) can be used in MNO1 network (400) are described in FIG. 4. Before the process can start a contract must be signed between MNO1 (400) and SIM provider1 (500) to manufacture SIMs. At that time, MNO1 provides (4A) the necessary data for Ki keys generation and MNO1 profile to SIM provider1 (500). Ki Keys allow SIMs to authenticate and be authorized to use MNO1's net (400). These data are usually stored on a module of the SIM provider1 platform (500) called Data Preparation1 (502). After a while, MNO1 gives (4B) SIM provider1 (500) an order to manufacture some SIMs with certain characteristics and a specific range of IMSIs. During the manufacturing process (4C), the subscription data, IMSI, KI, etc., which allow SIM to attach to MNO1's net (300), are stored into the SIM. Two cipher keys, the storage key1 or SK1 and the SIMKey1, are stored in the SIM, as well. SK1 is a key used to cipher all the data interchanged between the modules SP1 and DP1 of SIM provider1 platform (500). This storage key is unique generated for each MNO. There is another one, MasterKey1, which is a key of SIM provider1 (500) used to generate the SIMKey1. SIMkey1 is a personalized key for each SIM and is generated from some of data that unequivocally identified a SIM, like IMSI. SIMKey1 is used to cipher all communication between the Virtual SIM1 (503) and SIM provider1 platform (500). Using this key, SIM can verify that all the data and orders are effectively sent by the SIM provider1 (500), which is the one that manufactured it.

Unlike static data (IMSI/MSIDN) that cannot be interchanged from a SIM provider to another different one, but stored in the pool of the SIM provider in the home network, the keys SK, SIMKey and Masterkey are dynamic data as they are interchanged between SIM providers (instead of being stored in a pool). Unlike the subscriber authentication key Ki, which is generated on demand, the Storage Key, SK, and the Masterkey are respectively generated for a MNO and a SIM provider independently of the SIM card. SIMkey and Ki depend on the IMSI.

Once SIMs are manufactured, SIM provider1 returns a file (4D) containing the relationship between IDICC and IMSI, among other things, to MNO1 (400). This file is uploaded (4E) to the IMSIs1 platform (100) by MNO1 (400) and data is stored on the SIM Inventory1 (103). Before SIMs can be used, they must be provisioned with a MSISDN. For this purpose, MNO uploads a file with the association between MSISDNs1 and IMSIs1 (4F) to the IMSIs1 platform (100). Associations between MSISDNs1 and IMSIs1 are also stored in the SIM inventory1 (103). Then, IMSIs1 platform (100) checks (4G) whether the data corresponds to physical SIMs or not. It makes the checking due to the fact the process to provide IMSI/MSISDN for the SWAP to the platform is quite similar as the one discussed in FIG. 5. If data corresponds to physical SIMs, IMSIs1 platform loads (4H) the SIM data (Ki Keys and IMSI/MSISDN) on the MNO1's HLR (401). From that moment on, Virtual SIM1 card will be authorized to use the MNO1's network. If IMSIs1/MSISDNs1 data does not correspond (4J) to any physical SIMs, they are stored in the pooh (102) so that they can be used during the SWAP.

Figure 5:
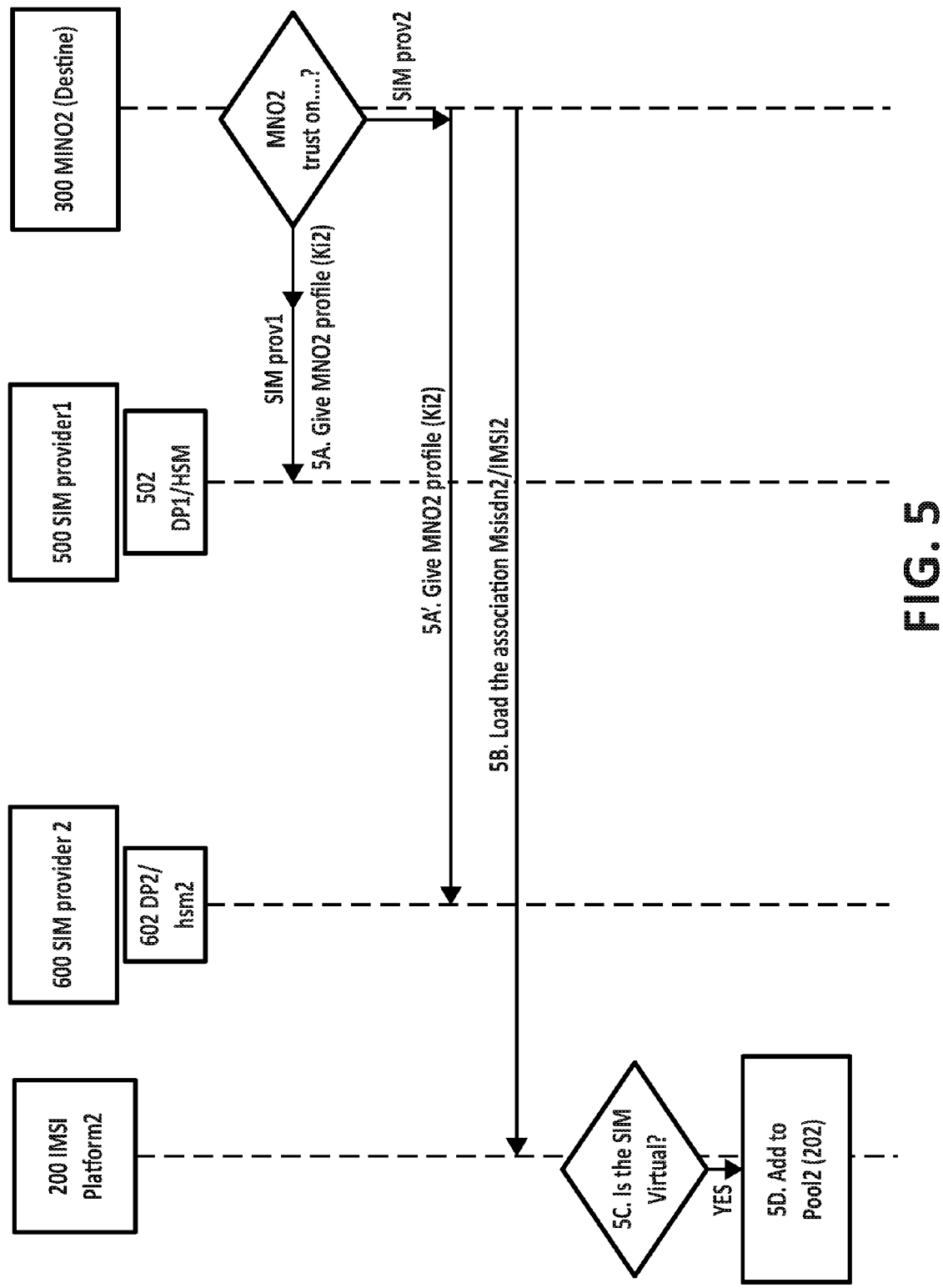
FIG. 5 shows a message diagram of communication flow for preparing data of a virtual SIM in the mobile destination network of the system depicted in FIG. 2, according to a preferred embodiment of the invention.

FIG. 5 describes the needed steps to upload the IMSI2/MSISDN2 in the IMSIs2 platform (200). The IMSI2/MSISDN2 are going to be used by the Virtual SIM1 (503) to attach to MNO2 network (300), the destination net, once the SWAP has been carried out. Before the process can start, a contract must be signed between the MNO2 and a SIMs provider to manufacture SIMs. The process begins when MNO2 net (300) provides the necessary data for the keys Ki generation and the MNO2 profile to a SIM provider. Ki Keys let SIMs authenticate and be authorized to use MNO2 network (300). If MNO2 (300) has signed a contract with SIMs provider1 (500), MNO2 gives the MNO2 data (5A) to SIMs provider1 (500), otherwise. If MNO2 (300) has signed a contract with SIMs provider2 (600), MNO2 gives the data (5A') to SIM provider2 (600). In the general case, it is assumed that the contract has been signed between MNO2 (300) and SIM provider1 (500), and then flow 5A is followed. In other cases, such as the ones shown in FIGS. 14 and 19, the contract will be signed with the SIMs provider2 (600), therefore flow 5A' is the valid one. When some time has gone on, and MNO2 and other MNOs have signed an agreement for the SIM SWAP, MNO2 netowork (300) uploads a file (5B) with the association between IMSIs2 and MSISDNs2 to IMSIs2 platform (200). IMSIs2 platform (200) realizes data does not correspond to physical SIMs (5C), since their data have not been stored on SIM Inventory2 (203) yet, and therefore, IMSIs2 platform (200) stored the data (5D) in pool2 (202) so that they can be used during the SWAP.

Figure 6:
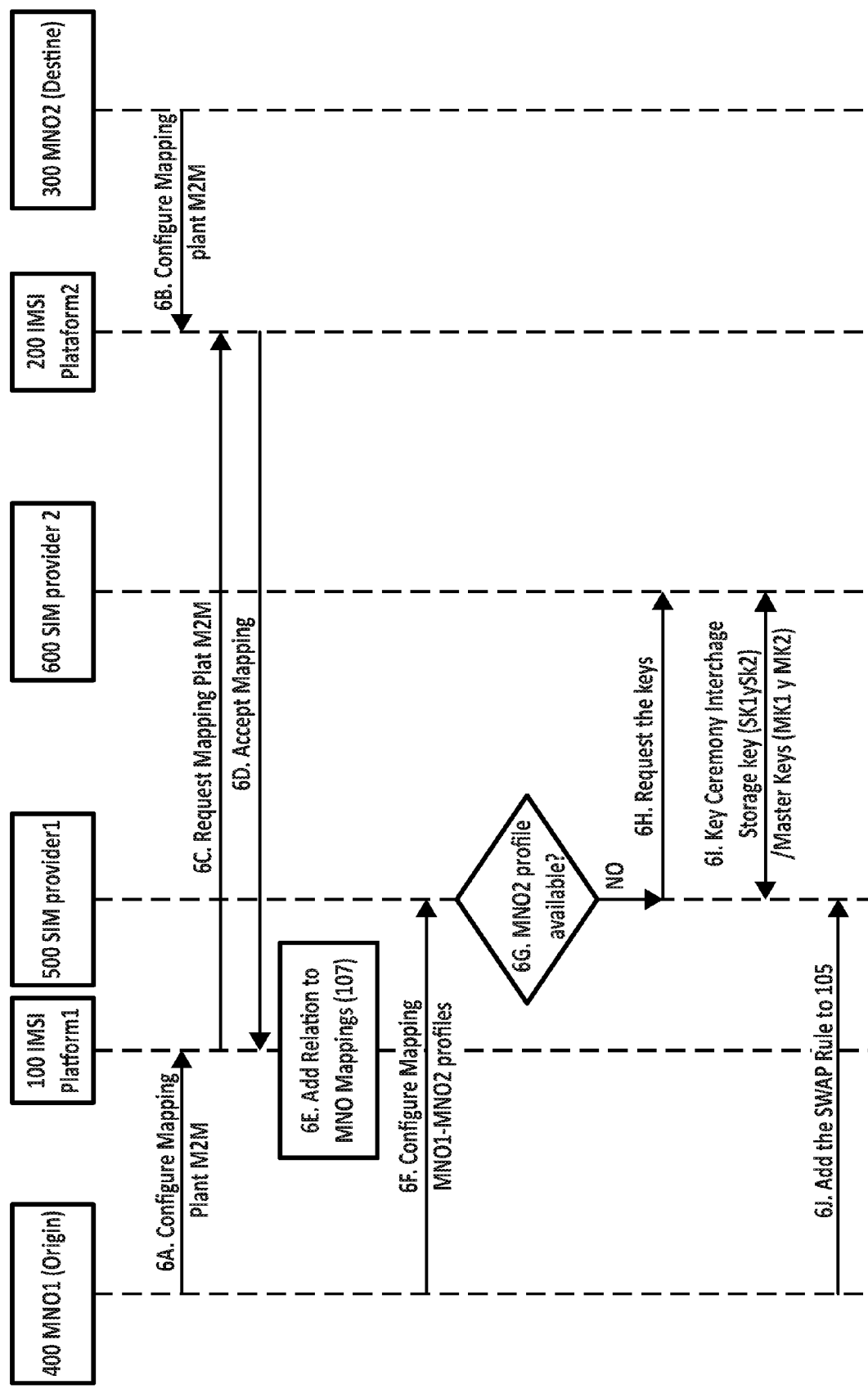
FIG. 6 shows a message diagram of communication flow for preparing IMSI swap between the mobile origin network and the mobile destination network of the system depicted in FIG. 2, according to a preferred embodiment of the invention.

FIG. 6 depicts the necessary steps to launch a SWAP between the IMSI1s platform (100) of MNO1 origin network (400) and the IMSI2s platform (200) of MNO2 destination network (300). Once MNO1 and MNO2 have signed an agreement to allow the SWA, both MNO1 and MNO2 have to set under what circumstances the SWAP can be launched (6A, 6B) in their respective IMSI1s platform (100) and IMSI2s platform (200). For instance, MNO1 and MNO2 can configure that the tariff to be applied, which services SIMs are be able to access (voice, SMS and/or data packages), etc. SIMs usually have access to the same services in the source or home network (400) and destination network (300), but the tariff is usually different. The tariff will depend on the agreements reached by MNO1 and MNO2 to bill the customer and on the service cost between MNO1 and MNO2. After finishing the individual settings in each IMSI platform, the IMSIs1 platform (100) throws a request (6C) for the mapping to IMSI2 platform (200) which must be accepted (6D) by this IMSIs2 platform (200). With the flow 6C, IMSIs1 platform (100) is authenticating itself, and some credentials and encryption keys, to cipher the communications between platforms, can be sent so that IMSIs2 platform (200) can recognize and validate this mapping. This way, IMSIs2 platform (200) only accepts the requests from IMSI1s platform (100) which are authenticated in a certain way. In flow 6D, IMSIs2 platform (200) also authenticates itself with its reply so that IMSI1 platform (100) can recognize the answers from the IMSIs2 platform (200). When IMSIs1 platform (100) receives a confirmation positive (6D) for the mapping, IMSIs1 platform (100) stores a relationship into the MNO mappings table (107) (6E). This relationship is going to serve to the IMSIs platform (100, 200) to know which platform sends requests to, depending on which MNO is the destination network. By other hand, MNO1 also configures into to the SIM provider1 platform (500) which agreements between MNOs have been made for the SWAP (6F). SIM provider1 platform (500) checks if it is the SIMs provider of the MNO2 and thus it already has the data to generate the credentials or the profile of MNO2 (6G). In case that SIM provider1 platform (500) has no data for MNO2 profile or credentials generations, it makes a contact to the SIM provider that owns these data, in this example, the SIM provider2 (600), and makes a request to it to their keys to exchange information securely (6H). Both platforms of SIM providers, SIM provider1 (500) and SIM provider2 (600), exchange the keys (6I) to encrypt information and to exchange it safely. None of MNO credentials information and Ki keys are interchanged, since this information is personalized for each SIM and depends on the SIM parameters. In Flow 6I, the platforms of SIM providers exchange the key of Storage of platform1, SK1, and the key of Storage of platforma2, SK2. SK1 is used to encrypt all information exchanged between the DP1 (502) and SR1 (505) and SK2 is used to encrypt all information exchanged between the DP2 (602) and SR2 (605). In the flow 6I, the platforms of SIM providers, SIM provider1 (500) and SIM provider2 (600), also exchange the key MasterKey1, MK1 of platform1, and Masterkey2, MK2 of platform2. Masterkey1 is used to generate the SIMKey1 and Master Key used to generate SIMKey2. The SIMKey key is generated individually for each SIM by using the Master key from its IMSI, and is used to encrypt all information exchanged between the SIM and the SR1 (505), by SimKey1 key, and to encrypt all information exchanged between the SIM and SR2 (605), by SimKey2 key. Flows H and I are not needed in the general case, shown in FIG. 3, where the SIM1 provider (500) has both profiles of the two operators, MNO1 (400) and MNO2 (300), but they are necessary in some cases, such as the use cases shown in FIGS. 14 and 19. Finally, if the SWAP is going to be launched automatically, the MNO of the home network (400) configures in the IMSIs1 platform (100) under what circumstances the SWAP will take place. For example, it can configure if the rule for the SWAP is triggered when the SIM attaches to the net to certain country and not another, or when a certain period of time expires, etc.

Figure 7:
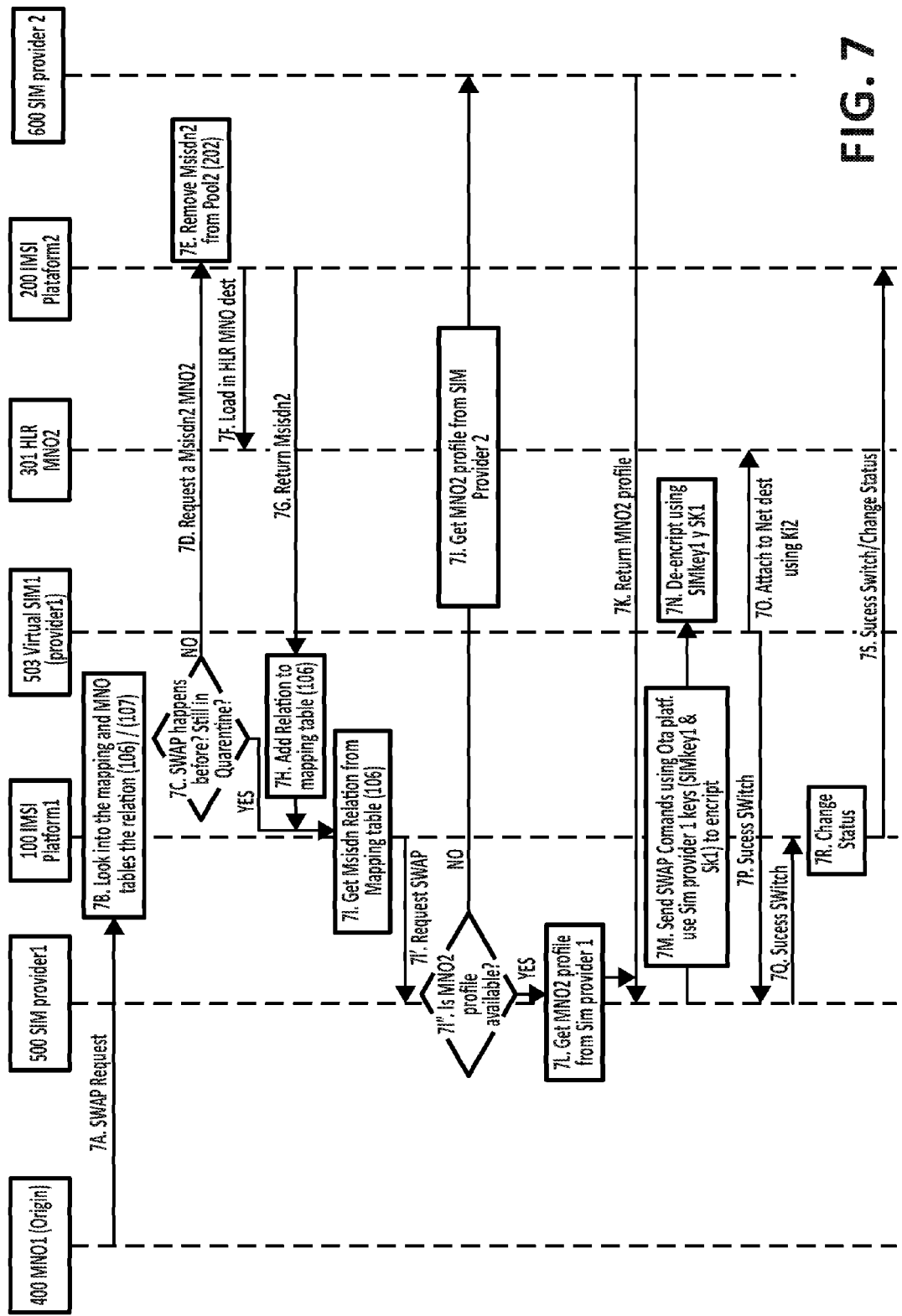
FIG. 7 shows a message diagram of communication flow for IMSI swap request between the mobile origin network and the mobile destination network of the system depicted in FIG. 2, according to a preferred embodiment of the invention.
Figure 12:
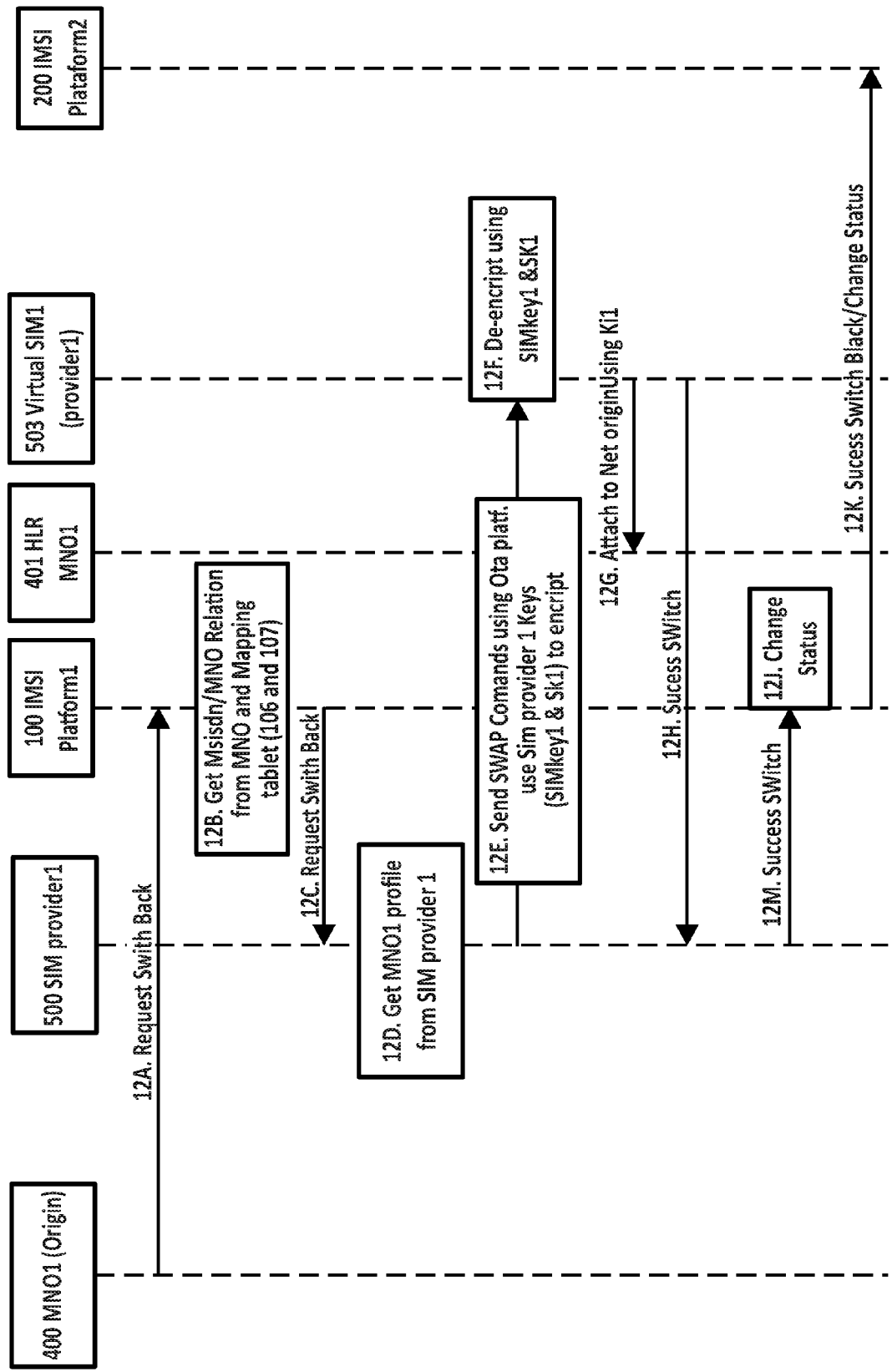
FIG. 12 shows a message diagram of communication flow for IMSI SWAP-back request between the mobile networks of the system depicted in FIG. 2, according to a preferred embodiment of the invention.

FIG. 7 depicts the steps to request a SWAP on the Virtual SIM1 (503). To perform a SWAP, the profile of the MNO which the SIM is located at must be loaded on the SIM. A SWAP process can not be carried out if there have been a previous and successful SWAP request and it has not been performed the corresponding SWAP-Back operation, as shown in FIG. 12. Launching two SWAP requests consecutively is possible, with a SWAP back in the middle, though. This case is explained in the case of multiple destinations, shown in FIG. 25. SWAP process can be triggered manually or automatically by the IMSIs1 platform (100). It is launched automatically, when one of the SWAP Rules (105) is satisfied and when, by example, the SIM is registered in a country or MNO that matches an entry in this table, or when the period time defined in one of the rule has come to an end. The SWAP request begins when the MNO1 (400) launches a SWAP request to the IMSI1s platform (100). The IMSIs1 platform (100) checks whether a previous SWAP request with the same parameters was made or not, and if so, it tries to recover the data of the IMSI2/MSISDN2 that the SIM used before from the mapping table (106) (7A). It also uses this same table and MNO mapping table (107) to find out in which MNO's network the SIM is, and how to send requests to its IMSIs platform (7B). In the event that there had not been a previous SWAP request with the same parameters (7C), or if there had been, but the data had been deleted because the quarantine period had expired, the data of IMSI2/MSISDN2 are not in the mapping table (106). In this case, the IMSIs1 platform (100) launches a request (7D) to the IMSI2 platform (200) to get them. IMSIs2 platform (200) searches a MSISDN2/IMSI2 available and not associated with any SIM yet into its pool2 (202). It returns them (7G) to the IMSIs1 platform (100), but before of returning them, it removes them from the pool2 (202) so they can no longer be used (7E). Then, it loads them (7F) on its HLR2 (301) so that MSISDN2/IMSI2 can be authorized to use the MNO2 network (300) when SWAP happens. When the IMSI1 platform (100) receives the IMSI2/MSISDN2, it stores this relationship in the mapping table (106) to be available for billing and to be able to be reused in the SWAP/SWAP-Back. All the communication between IMSI1 and IMSI2 platforms (100, 200) is properly encrypted according to the parameters exchanged for both platforms, as shown in FIG. 6, and retrieved from the table of MNO mappings (107). Encryption of this information is needed so that both platforms can recognize and validate that requests come from authorized source for it. When the IMSIs1 platform (100) already has the IMSI2/MSISDN2 data, it looks for them (7I) in the mapping table (106). Then it sends a request to the SIM provider1 platform (500) to send OTA commands to the Virtual SIM1 to make the SWAP (7I'). And It sends to it the IMSI1/MSISDN1 currently used by the SIM to be able to locate it, and the data of the new IMSI2/MSISND2 to be loaded on the SIM, as parameters. To be capable of performing the SWAP, SIM provider1 platform (500) must also obtain other information about the MNO whose subscription wants to load. In this case, the MNO2 subscription wants to be activated. SIM provider1 platform (500) must check whether it has this information or not (7I"). If SIM provider1 platform (500) is also the provider for MNO2, it can get the data from its own platform (7L), as explained in more detail in FIG. 8. If SIM1 provider platform is not SIM provider for MNO2, the data must be gotten from the SIM provider2 platform (600), which returns the data (7J). The process (7J) to get the MNO2 profile from the SIM provider2 (600) is a complex process that requires the exchange of information between both platforms of SIM providers and which is explained in more detail in FIGS. 15-18. After getting the data, MNO2 profile and MSISDN2/IMSIs2, SIM provider1 (500) sends the OTA commands to the Virtual SIM1 (503) using an encrypted channel through platform OTA1 (7M). When the Virtual SIM1 (503) receives the data and the data are downloaded on the Virtual SIM1 (503), data are deciphered, and loaded on it and the data of the new subscription is activated (7N). Then the SIM is restarted and it register on the MNO2 network (300) using the new subscription. The HLR (301) of MNO2 successfully verifies the SIM registration (7O). Steps 7M, 7N, and 7O are explained more fully in FIG. 9. If the registration on the MNO2 network (300) was successful (7O), Virtual SIM1 (503) informs about the success of the operation (7P) to the SIMs provider platform from which it received the SWAP request. In this case, the SIM informs to SIM provider1 platform (500) which, in turn, informs about the success of the operation (7Q) to the IMSI1s platform (100) from which it received the SWAP request. At that time, the IMSIs1 platform (100) changes the SIM status (7R) and deactivates it to not allow the SIM consumption and stops its billing. It also reports the success of the operation (7S) to IMSIs2 platform (200) so that it can carry out the appropriate actions, such as changing the SIM status or activates it to allow the SIM consumption and to start its billing.

Figure 8:
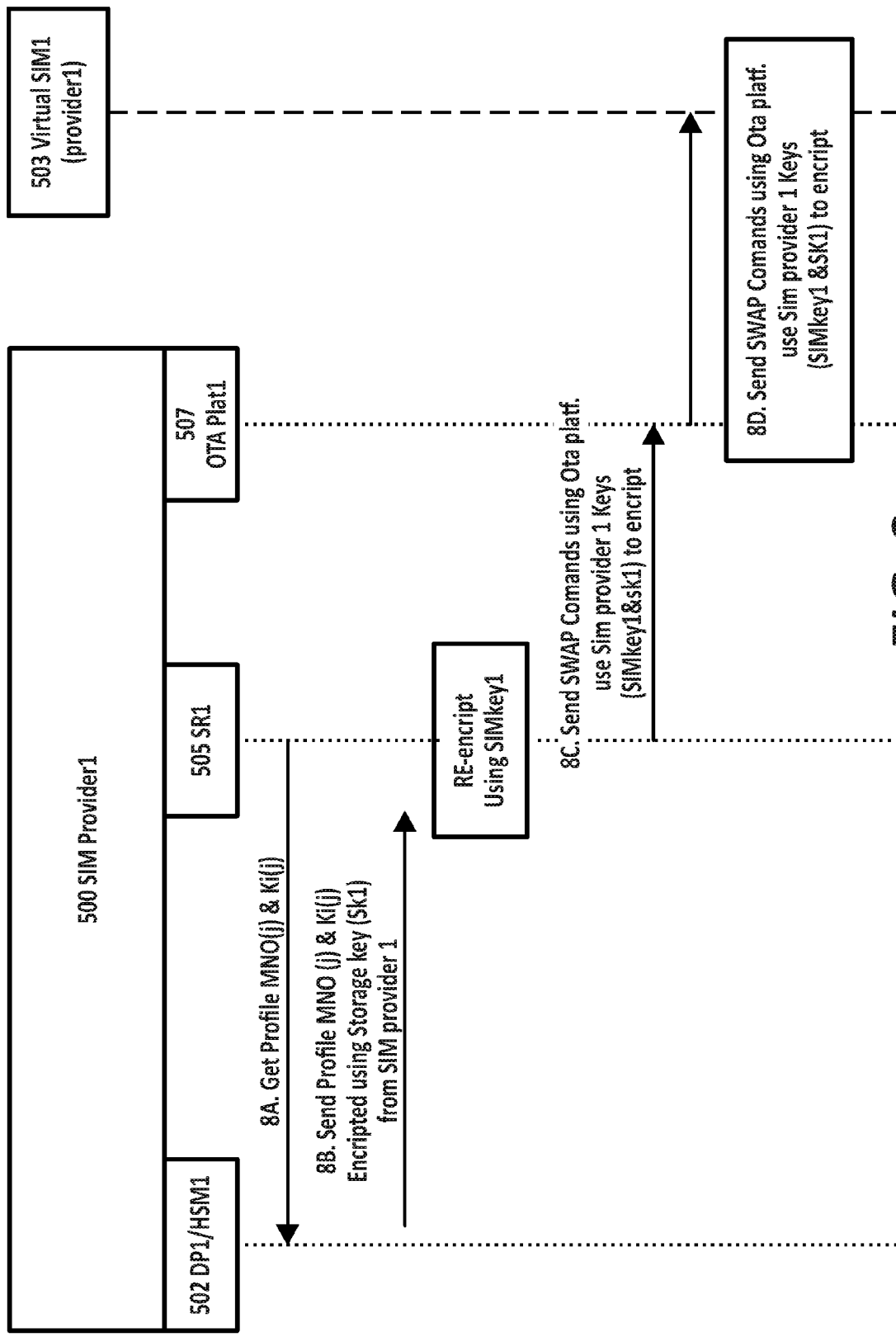
FIG. 8 shows a message diagram of communication flow for getting the mobile network operator's profile from the SIM provider of the mobile origin network in the system depicted in FIG. 2, according to a preferred embodiment of the invention.

FIG. 8 shows the process steps described to get the data of the MNO profile, whose subscription is going to change, to send them to the Virtual SIM1 (503) for the SWAP or the SWAP-back. In this case the profile data, which may be the one from the MNO2 network (300) in the SWAP case, or the one from the MNO1 network (400) in the case of the SWAP-back request, is obtained for the SIM Provider1 platform (500). Some of the steps described in FIG. 8 are a part of FIGS. 7 and 12 respectively. The process begins when the SR1 (505) module makes a request to DP1 module (502) of the SIM provider1 platform to get the MNO profile whose subscription is going to change (8A). The DP1 searches for it in its own MNO profile repository (501). After obtaining this information, it is sent to the SR1 (505) encrypted (8B) with the storage key SK1 used to make safe the communication between the SR and the DP. The SR1 sets an encrypted communication channel (8C) with the Virtual SIM1 (503) using the key SIMkey1 and the new subscription information is sent as parameters (8D) of the OTA commands generated using the OTA1 platform (507). Flows 8C and 8D are explained in more detail in FIG. 9.

Figure 9:
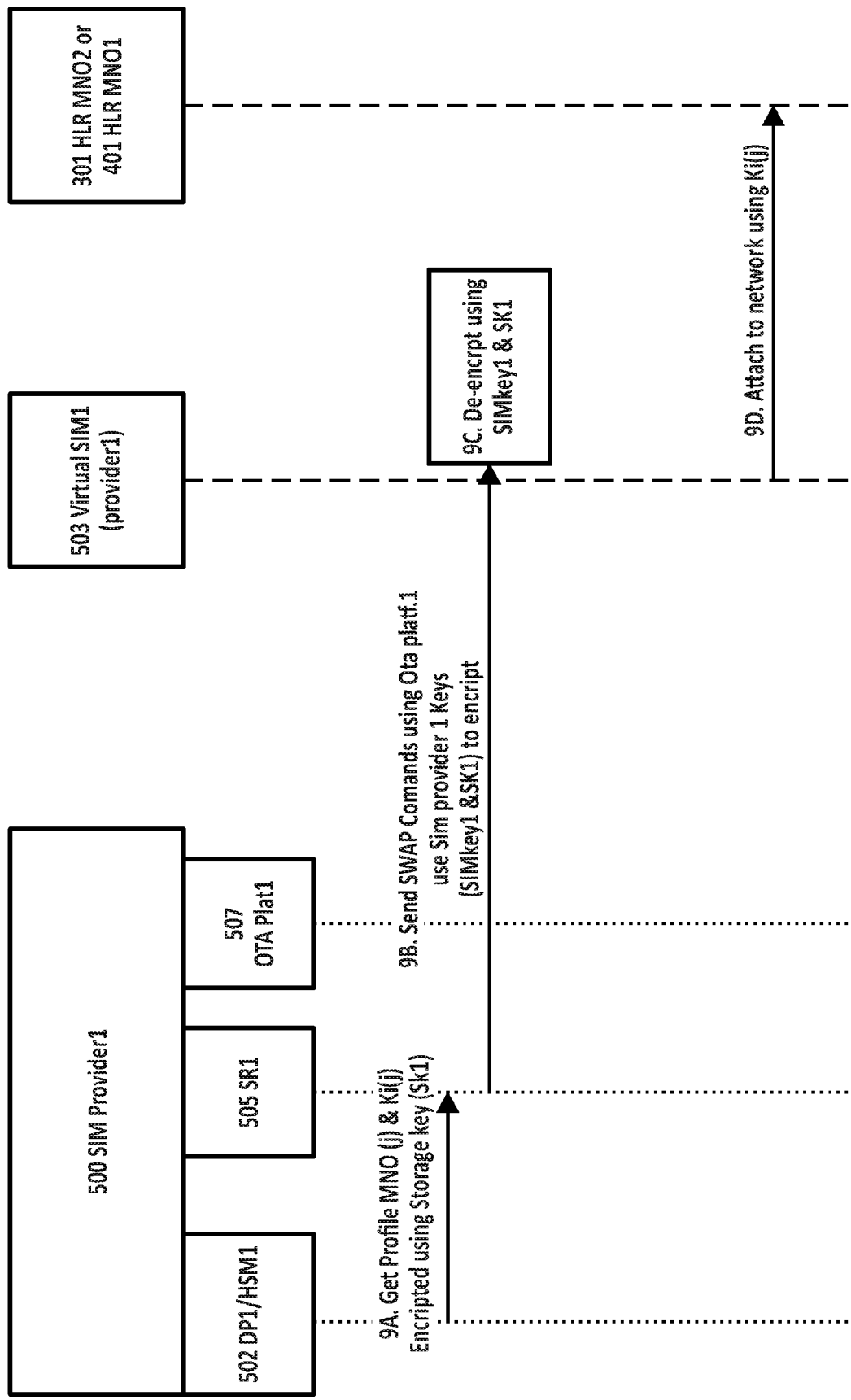
FIG. 9 shows a message diagram of communication flow for sending SWAP commands in the system depicted in FIG. 2, according to a preferred embodiment of the invention.

FIG. 9 describes the process steps to send OTA commands to the Virtual SIM for the SWAP, or SWAP-back. Some of the steps also form part of FIGS. 7 and 12. The process begins when the DP1 module (502) of SIM Provider1 gets the MNO profile whose subscription is going to change (9A), which it may be the MNO2 profile in case of a SWAP request, or the MNO1 profile in the case of SWAP-back. Depending on the case, these data may be retrieved from their own repository (501) of MNO profiles, as explained in FIG. 8, or it may be retrieved from another SIM provider platform, as explained in FIGS. 15-18. After obtaining the MNO profile, it is sent to the SR1 (505) encrypted with the SK1 Storage key so that the communication between the SR and the DP can be safe. The SR1 (505) sets up an encrypted communication channel with the Virtual SIM1 (503) using the SIMkey1.

Then, it sends this information as parameters of OTA commands (9B) generated by the OTA1 platform (507). SIMKey1 is a key generated from the Masterkey1 key, which is a key platform generated by the SIM provider and individualized to each MNO. This key is generated individually for each card and it usually depends on its IMSI. Both keys, the Storage key1 and the Masterkey1, are provided to the Virtual SIM1 (503) during its manufacturing process. So, when the SIM receives the encrypted information is able to decipher it (9C) and it verifies that the commands to change the SWAP actually come from an authorized source to do it. Once the card holds the commands, it loads the data from the new subscription and activates as primary subscription. Then, the SIM resets itself and tries to register into the network indicated using the data of the new subscription, which may be from the MNO2 in the case of a SWAP request or from the MNO1 in the case of SWAP-back request. This record is usually validated, by the corresponding HLR1 (401) of MNO1 in a back SWAP request and by the HLR2 (301) of MNO2 in a SWAP request. The corresponding HLR checks whether the IMSI with which the SIM is connecting valid one or not and whether the Ki used for the registered (9D) is correct. These two data are included in the data sent to the SIM during the SWAP. Before sending the data through the SIM provider platform, the IMSIs platform also loads them into the HLR, so the process of registration and validation is normally successful.

Figure 10:
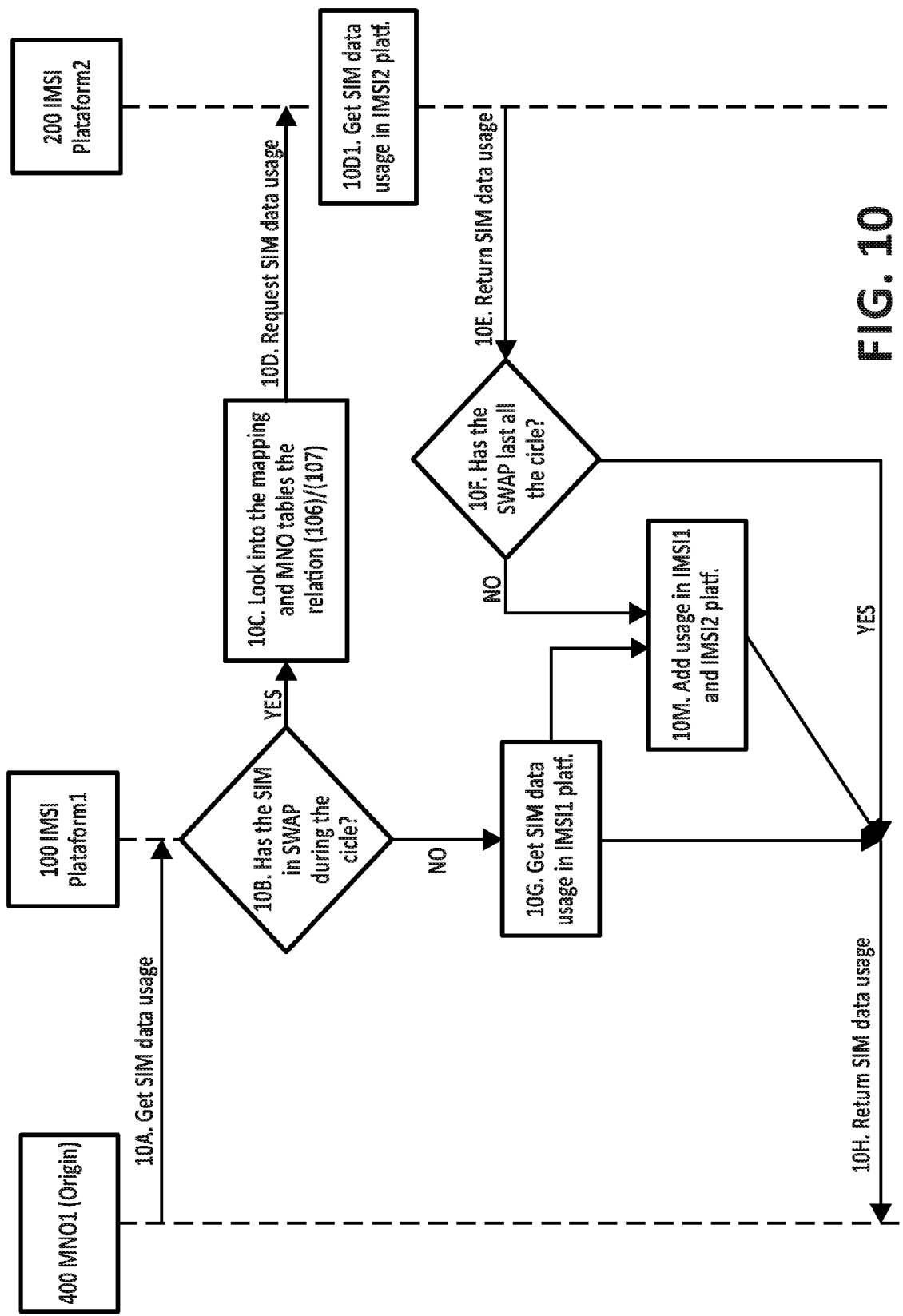
FIG. 10 shows a message diagram of communication flow for getting SIM usage data during a billing cycle in the system depicted in FIG. 2, according to a preferred embodiment of the invention.

When MNO1 (400) wants to get the usage of Virtual SIM1 (503) during a given billing cycle, which may be the current cycle or not, the process shown in FIG. 10 is followed. MNO1 network (400) asks to IMSIs1 platform (100) the SIM consumption (10A). IMSIs1 platform (100) checks whether SIM has been in SWAP or not during the cycle (10B). If SIM has not been in SWAP, the SIM consumption during this cycle is only the one performed (10G) on the IMSIs1 platform, which is returned (10H) to MNO1 network (400), If the SIM was in SWAP or is currently in SWAP, IMSIs1 platform (100) looks for the IMSIs relationship into the mapping table (106) to know which IMSI/SIM is using in the destination network (300), and in which network it registered (10C). It also looks for how to send request to the MNO destination platform MNO (10C) into the MNO mappings table (107). IMSIs1 platform (100) makes a request (10D) to IMSIs2 platform (200) that gets the SIM consumption (10D1) during this SWAP cycle, and returns it (10E) to the IMSIs1 platform (100). The IMSIs1 platform (100) also checks whether SWAP lasted or not the whole cycle (10F). If the SWAP lasted the whole cycle, the SIM consumption is only the one made in IMSIs2 platform (200), which is returned (10H) to MNO1 network (400). If SWAP has not lasted the whole cycle (10F) IMSIs1 platform (100) adds the SIM's consumption in the IMSIs2 platform (200) plus its consumption (10M) in IMSIs1 platform and returns the result (10H) to the MNO1 (400).

Figure 11:
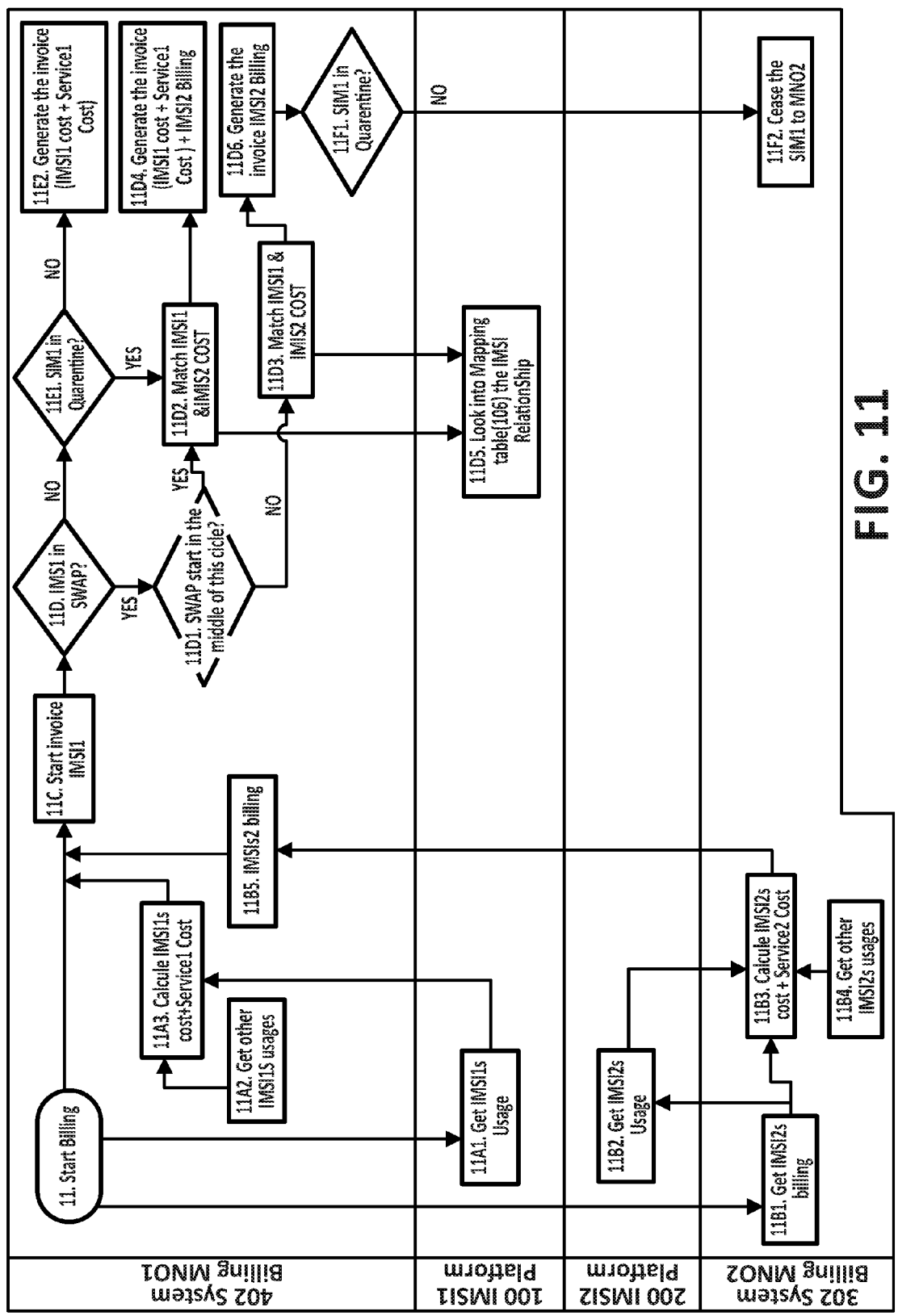
FIG. 11 shows a message diagram of communication flow for billing in the system depicted in FIG. 2, according to a preferred embodiment of the invention.

FIG. 11 shows the steps followed when the MNO1 billing system (402) wants to invoice a Virtual SIM1 (503) during a given billing cycle, which may be the current cycle or not. In first place, when a billing cycle starts (11), the MNO1 billing system (402) asks for the consumption (11A1) of its own SIMs, those ones that own an IMSI1, to the IMSIs1 platform (100). It also gets the unbilled consumption by the IMSIs1 platform (100) from external systems (11A2) such as the SMS consumption, or the voice calls consumption from the SMSC, Short Message Service Centre, or/and the MSC, mobile switching center. Then, it calculates the cost per usage of SIMs with IMSIs1 and the cost per service (11C3) using the both info (11A3). On the second place, MNO1 billing system (402) asks for the cost (11B1) of some IMSIs2 to MNO2 billing system (302). MNO1 billing system (402) knows which the relationship between IMSIs is by looking for it into the mapping table (106), and therefore he is easily able to know which IMSIs2 are/was or have been used during the SWAP matches by the SIM with a specific IMSIs1. MNO2 billing system (302) makes a request to the IMSIs2 platform (200) to get the IMSIs2 consumption (11B2). It also gets (11B4) the unbilled consumption by IMSIs2 platform (200) from other external systems. Then it uses both data to calculate (11 B3) the cost per SIM usage and cost per service with IMSIs2. The MNO1 billing system (402) starts the billing (11C). If the SIM is no longer in SWAP (11D), or it has been in SWAP and the quarantine period has expired (11E1), the SIM cost (11E2) is only the one made in the MNO1 network (400), since due to the quarantine period has expired, all the costs that SIM would have made in the MNO2 network (300) have already been invoiced. If the SIM is no longer in SWAP (11D), or it has been in SWAP and the quarantine period has expired (11E1), the SIM cost is cost (11D4) of the consumptions that it have made in the MNO1 network (400) plus the consumption which were made in the MNO2 network (300) and it have not been billed yet. To know which consumption in the MNO2 net has been made, the MNO1 billing system (402) makes the matching (11D2) between IMSIs2 (200) and IMSIs1 (100) platforms, by searching (11D5) into the mapping table (106) of the IMSIs1 platform (100). If the SIM is in SWAP (11D), and SWAP has started in the middle of the billing cycle (11D1), the SIM cost is cost (11D4) of the consumptions that it have made in the MNO1 network (400) plus the consumption which were made in the MNO2 network (300). To know which consumptions in the MNO2 net (300) has been made, the MNO1 billing system (402) makes the matching (11D2) between IMSIs2 (200) and IMSIs1 (100) platforms, by searching (11D5) into the mapping table (106) of the IMSIs1 platform (100). If the SIM is in SWAP (11D), and SWAP has not started in the middle of the billing cycle (11D1), it means that the SIM only has been used in the MNO2 net (300), so its costs is only cost (11D6) of the consumption that it have made in the MNO2 network (300). To know which consumptions in the MNO2 net (300) has been made, the MNO1 billing system (402) makes the the matching (11D3) between IMSIs2 (200) and IMSIs1 (100) platforms, by searching (11 D5) into the mapping table (106) of the IMSIs1 platform (100). Finally it checks whether the quarantine period has expired or not (11F1). If it has expired, then the SWAP is permanent and SIM is transferred (11F2) to MNO2 net (300), from that time being, the Billing MNO2 system (302) starts to invoice it to the final client.

FIG. 12 depicts the steps or the process to reverse a SWAP or SWAP-Back on the Virtual SIM1 (503). To perform a SWAP-back, the original profile of the MNO that the SIM used to have must be loaded again on the SIM. A SWAP-back cannot be carried out if the quarantine period has expired or if there has not been a previous and successful SWAP request. SWAP-Back process can be triggered manually or automatically by the IMSIs1 platform (100). It is launched automatically, when one of the SWAP Rules, configured in the SWAP Rules (105) table, is satisfied and when, for example, the SIM is registered in a country or MNO that matches an entry in this table, or when the period time defined in one of the rule has come to an end. The SWAP-Back request begins when the MNO1 (400) launches a SWAP-back request (12A) to the IMSI1s platform (100). The platform checks whether a previous SWAP request was made or not. And if so, it tries to recover the data of the IMSI1/MSISDN1 (12B) that the SIM initially used from the mapping table (106). IMSI1s platform (100) also uses this same table and MNO mapping table (107) to find out in which MNO network the SIM is, and how to send requests to its IMSIs platform (12B). IMSI1s platform (100) also sends a request to the SIM provider1 platform (500) to send OTA commands to the Virtual SIM1 to reverse the SWAP (12C). And IMSI1s platform (100) sends to SIM provider1 platform (500) the IMSI2/MSISDN2 currently used by the SIM to locate it, and the data of the new IMSI1/MSISND1 to be loaded on the SIM, as parameters. To be capable of performing the SWAP, SIM provider1 platform (500) must also obtain other information about the MNO whose subscription wants to load. In this case, the MNO1 subscription wants to be activated, so it can be retrieved from its own platform (12D), explained in more detail in FIG. 8. After getting the data, MNO1 profile and MSISDN1/IMSIs1, SIM provider1 platform (500) sends the OTA commands to the Virtual SIM1 (503) using an encrypted channel through platform OTA1 (12E). When the data are downloaded on the SIM1 (503), they are deciphered, and loaded on it and the data of the new subscription is activated (12F). Then the SIM is restarted and registered on the MNO1 network (400) using the new subscription. The HLR of MNO1 (401) successfully verifies the SIM registration (12G). Processes 12E, 12F, and 12G are explained more fully in FIG. 9. If the registration on the MNO1 network (400) was successful (12G), Virtual SIM1 (503) informs about the success of the operation to the SIMs provider platform, from which it received the SWAP request (12H). In this case, the SIM informs to SIM provider1 platform (500). The SIM provider1 platform (500) informs about the success of the operation to the IMSIs1 platform (100), from which it received the SWAP reverse request (12M). At that time, the IMSIs1 platform (100) changes the SIM status and activates it to allow the SIM consumption and starts its billing (12J). It also reports the success of the operation (12K) to IMSIs2 platform (200) so that it can carry out the appropriate actions, such as changing the SIM status or deactivates it to not allow the SIM consumption and to stop its billing.

Figure 13:
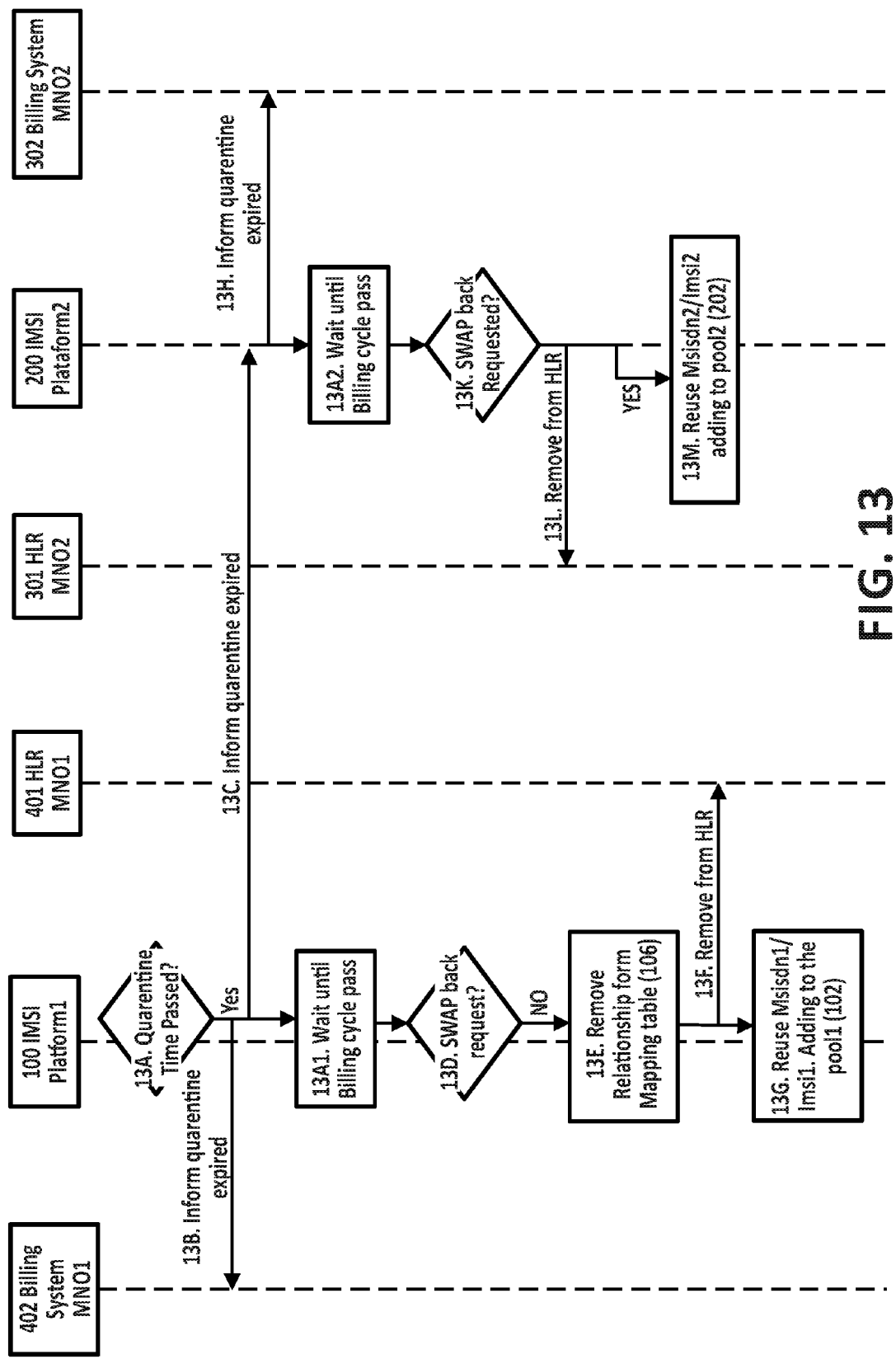
FIG. 13 shows a message diagram of communication flow between the mobile networks of the system depicted in FIG. 2 when a quarantine period expires, according to a preferred embodiment of the invention.

FIG. 13 depicts the sequence of steps triggered when the quarantine period expires. When IMSIs1 platform (100) realizes that the quarantine period has expired for a SIM (13A), it informs about it to the platform corresponding to the network where the SIM is or it has been in SWAP, in this case IMSIs1 platform (100) informs (13C) to the IMSIs2 platform (200). IMSIs1 platform (100) knows in which network and platform the SIM is/was recovering the info from the mapping table (106) and the MNO mapping table (107). IMSIs1 platform (100) also reports (13B) to the Billing system of MNO1 (402). The IMSIs1 platform (100) waits for the billing cycle (13A1) after the quarantine finishes before starting any quarantine related process, to avoid that any consumption performed on the source network was not be invoiced properly. When the billing cycle after the quarantine time ends, the IMSIs1 platform (100) also checks (13D) if there has been a request to reverse the SWAP or SWAP-back, or if the SIM is still in SWAP. If the SIM is still in SWAP and the SWAP has not been back, the SWAP is made permanent and the Virtual SIM1 (503) remains indefinitely on the MNO2 network (300) and transferred to MNO2. Then IMSIs1 platform (100) removes (13E) the relationship between IMSI2 and IMSI1 from the mapping table (106). As the SIM belongs to MNO2 from the time being, and since the MSIDN1/IMIS1 are not going to be used by the SIM1 in the home network (400) anymore, they are returned (13G) to the pooh (102), in order to be re-used as explained in the corresponding step (39a) of FIG. 3, and unloaded (13F) from the MNO1 HLR (401), so that the MSIDN1/IMIS1 can be re-used as shown in FIG. 9. Moreover, when the IMSIs2 platform (200) receives the notification of quarantine time expiration (13C), it informs (13H) the MNO2 Billing system (302), so that it can take it into account when it invoices the SIM. IMSIs2 platform (200) waits for the billing cycle after the quarantine finishes before starting any quarantine related process, to avoid that any consumption performed on the destination network (300) was not be invoiced properly (13A2). When the billing cycle after the quarantine time expiration ends, the IMSIs2 platform (200) also checks (13K) if there has been a request to reverse the SWAP, or SWAP-back. If there has been a Swap-back request, the IMSIs2 platform (200) knows that no more consumptions of the SIM1 in the MNO2 net are going to arrive, and therefore the MSIDN2/IMIS2 are not going to be used by the SIM1 in destination network (300) anymore, so they are returned (13M) to the pool2 (202), in order to be re-used as explained in the corresponding step (39b) of FIG. 3, and unloaded (13L) from the MNO2 HLR (301) so that they might be re-used as shown in FIG. 9. When the quarantine period expires, if there is a request for SWAP or SWAP back, the relation between IMSI1/IMSI2 initially used cannot be recovered, so a new SWAP sequence should be started.

Figure 14:
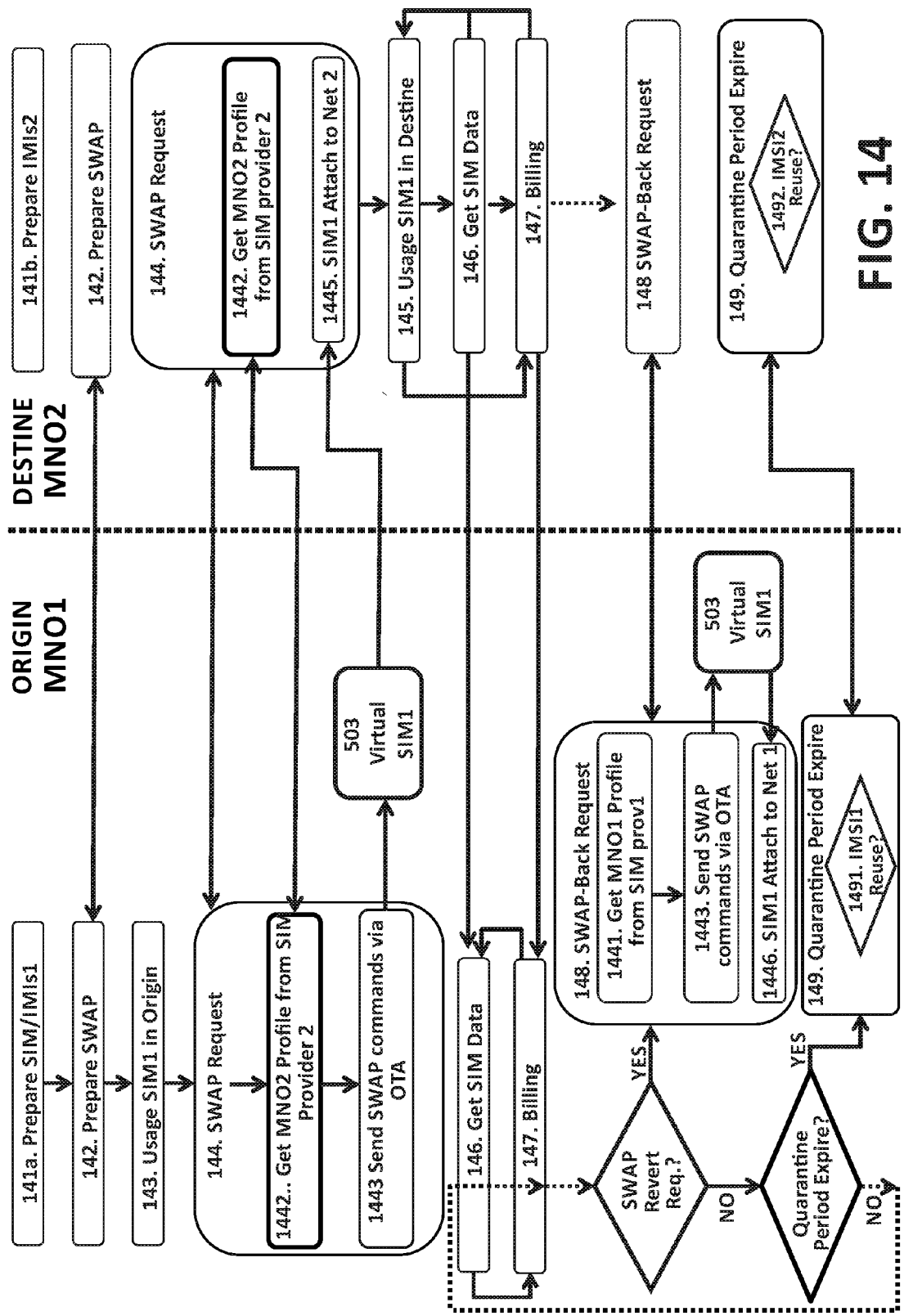
FIG. 14 shows a block diagram of system architecture for dynamic managing of subscriber devices between mobile networks in a possible network scenario of application, in which the operator of the mobile destination network trusts only on its SIM provider, according to a possible use case of the invention.

FIG. 14 details the main steps of a variant of the general case process described before and shown in FIG. 3. In this case, it is assumed that MNO1 network (400) performs the SWAP request through the IMSIs1 platform (100) and the SIM provider1 platform (500). The SWAP is done on the Virtual SIM1 (503). The difference with the general case of FIG. 3 is that, in the use case of FIG. 14, MNO2 network (300) does not trust on the same SIM provider than the MNO1 network (400). MNO2 network (300) trusts on the SIM provider2 (600), therefore its platform, the SIM provider2 platform (600) already has the credentials of MNO2. The steps of FIG. 14 are very similar to the ones showed in the general case of FIG. 3: The left side of FIG. 14 shows the steps followed during the SWAP process by the platforms of the MNO1 origin network (400), and on the right side of FIG. 14, the steps followed by the platforms of the MNO2 destination network (300) are illustrated. All the steps of FIG. 14 are:

Initial Step (141*a*, 141*b*): The initial data, IMSI, MSISDN . . . , provisioned on the Virtual SIM1 (503) are loaded on the IMSIs1 platform (100), as shown in FIG. 4. In parallel, the data, IMSIs/MSISDNs, which the SIM has to use for registration to the MNO2 network (300) are loaded on the IMSIs2 platform (200), as shown in FIG. 5. These data are to be used during the SWAP.

SWAP preparing Step (142): The parameters needed to launch the SWAP are configured on the IMSIs1 platform (100) and the platform IMSIs2 (200) is informed about it, as described in FIG. 6.

Step (143) of using SIM1 in the home network (400): Before the SWAP, Virtual SIM1 (503) can be used normally in MNO1 network (400).

SWAP request Step (144): When the Virtual SIM1 (503) registers into the MNO2 destination network (300), a SWAP operation is launched by the IMSIs1 platform (100), as described in FIG. 7. IMSIs1 platform (100) starts a dialogue with the IMSIs2 platform (200) to obtain the IMSI2 and MSISDN2 that SIM is going to use in the MNO2 network (300) after the SWAP. IMSIs1 platform (100) also starts a dialogue with the SIM1 provider platform (500) so that the SIM provider1 platform (500) gets (1442) the MNO2 credentials from the SIM provider2 platform (600), and to send all the information using OTA commands (1443) to the Virtual SIM1 (503). After that, the Virtual SIM1 can be registered to the MNO2 network successfully (1445).

Step (145) of using SIM1 in the destination network (300): After the SWAP, the Virtual SIM1 (503) can be used in the MNO2 network (300) without being charged by roaming.

Getting SIM data Step (146): During the time SIM is registered in the MNO2 network (300), it is possible to have access to their consumption data, as described in detail in FIG. 10.

Billing Step (147): During the time the traveller or the M2M device is in the MNO2 network (300), the traveller or the M2M device owner can have access to their invoices, as described in FIG. 11.

SWAP-Back request Step (148): In a certain time, the traveller or the M2M device containing a SIM1 comes back and it register into the MNO1 network (400). An operation to reverse the SWAP is launched manually by MNO1 (400) or automatically by the IMSIs1 platform (100). To be capable of performing the SWAP-back, the MNO2 credentials must be obtained (1441) from the SIM1 provider platform (500), as explained in FIG. 8. Then, all the needed information is sent using OTA commands (1443) to the Virtual SIM1 (503), as also described in FIG. 9. After that, the Virtual SIM1 can be registered and attached to the MNO1 network (400) successfully (1446).

Checking quarantine period Step (149): When the quarantine period has elapsed, the IMSIs1 platform (100) lets the IMSIs2 platform (200) know about it, as described in FIG. 13, and it is decided whether IMSI1/IMSI2 are going to be reused again or not (1491, 1492).

The difference between the general case, show in FIG. 3, and this case of FIG. 14 is in how the MNO2 credentials are obtained in the step for getting the MNO2 credentials (1442). In this case, as MNO2 only trust on the SIM provider2, MNO2 network (300) only gives his credentials to the SIM provider2 platform (600). The SIM provider1 platform (500) does not have all the necessary data for the SWAP, especially the MNO2 credentials, when the SIM provider1 platform (500) is going to send the OTA commands to the SIM. Therefore, the SIM provider1 platform (500) must obtain the needed data from the SIM provider2 platform (600). The process described in the step (1442) to exchange of credentials between the SIM provider platforms can be implemented in different options as presented in FIGS. 15, 16, 17 and 18. These implementation alternatives represent the different types of relationships between the SR and DP module of the SIM provider platforms. The alternatives are modelled also in accordance with the GSMA standard architecture shown in FIG. 1.

Figure 15:
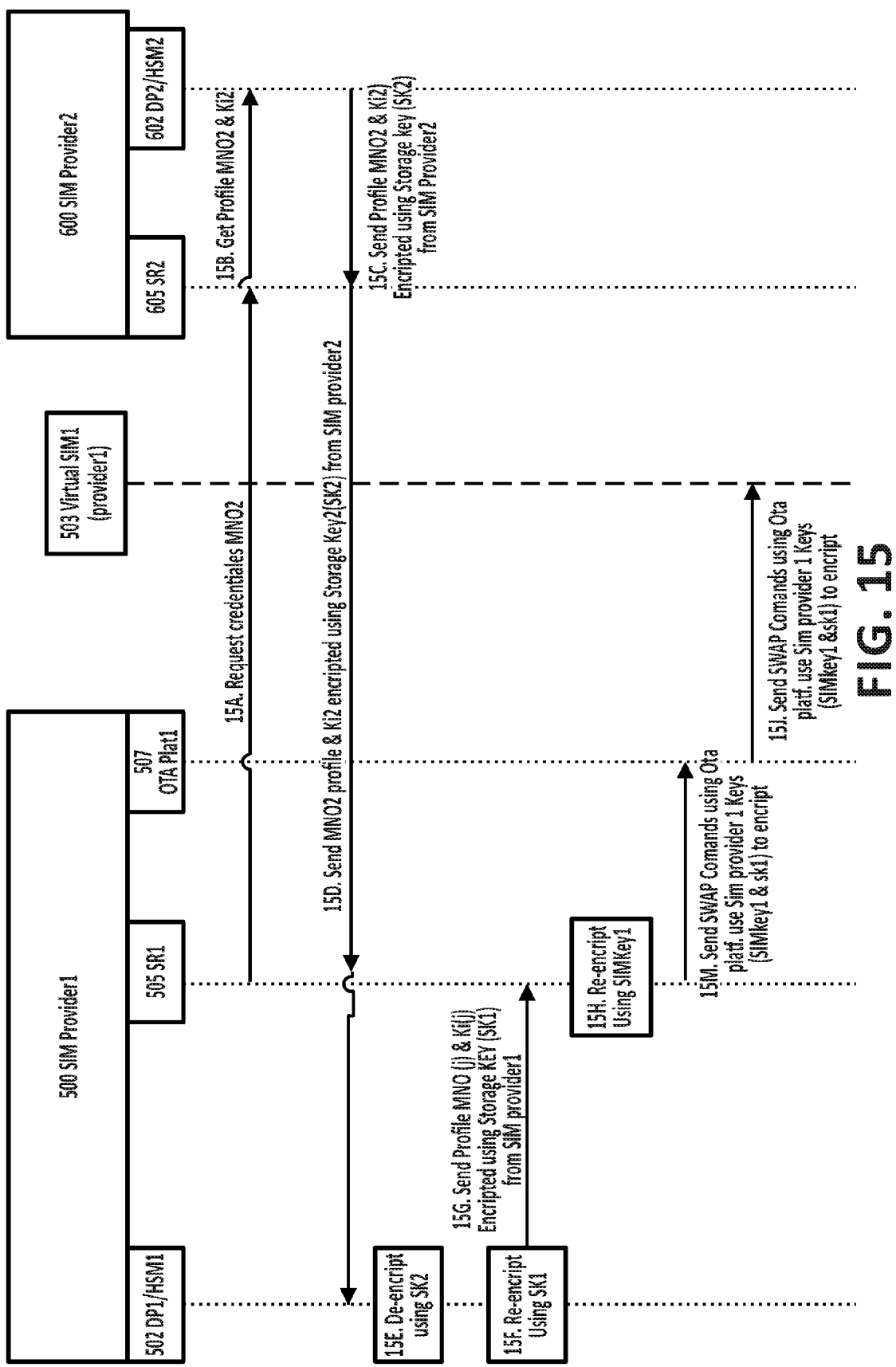
FIG. 15 shows a message diagram of communication flow for getting the mobile network operator's profile from the SIM provider of the mobile destination network of the system depicted in FIG. 14, via the interface between Secure Routers, according to a possible embodiment of the invention.

FIG. 15 presents an alternative of the process (1442) for getting the MNO2 credentials of previous FIG. 14 and depicts the steps of the process followed by the SIM provider1 platform (500) to obtain the data of MNO2 profile from the SIM provider2 platform (600) prior to sending them to the Virtual Sim1 (503) inside the OTA commands. In this alternative, the communication between the SIM providers platforms is mainly done through the Secure Routing (SR) modules from both platforms, and although the communication between Data Preparations (DP) or between the Data Preparation and the Secure Routing when they do not belong to the same platform providers SIM is unusual, at some times a DP can send data to another DP without involving the SRs. In more detail, the process starts (15A) when SR1 (505) launches a request to get the MNO2 credentials or profile to SR2 (605). Since SR2 does not have access to the data, SR2 re-sends (15B) the request to DP2 (602). DP2 reads the data from its repository, and encrypts them using the Storage key, SK2, of SIM provider2 and sends them (15C) to SR2. After that, SR2 sends the data in the same format that he received them to SR1 and SR1 re-sends (15D) the data to DP1, which is the only module how knows how des-encrypt them (15E), since DP1 is the only one that owns the SK2 interchanged during the SWAP preparation process shown in FIG. 6. An alternative of the flows 15C and 15D can be one in which the DP2 send the data directly to DP1 bypassing the SR1 and SR2. DP1 re-encrypts (15F) the information again but this time using the key of SIM provider1, Storage Key1 or SK1. During processes 15E and 15F, DP1 uses different keys to cipher and decipher the info, since the SIM can only decipher the info using the keys of the SIM provider who manufactured it. Then DP1 sends the ciphered information to the SR1 (15G). When SR1 receives the encrypted information, SR1 sets up an encrypted communication channel to transmit the information to the SIM from the DP1 safety. The information transmitted is encrypted (15M) using the SIMKey, which is a key generated using the Masterkey1 and a SIM unique identifier such as IMSI. SR1 sends the OTA commands (15J) to perform the SWAP through this channel using the OTA platform (507) to the Virtual SIM1 (503). The parameters of the OTA command contain the new subscription ciphered data that are to be loaded and enabled/active in the Virtual SIM (503). Part of the flow 15J corresponds with the beginning of the process explained in FIG. 9.

Figure 16:
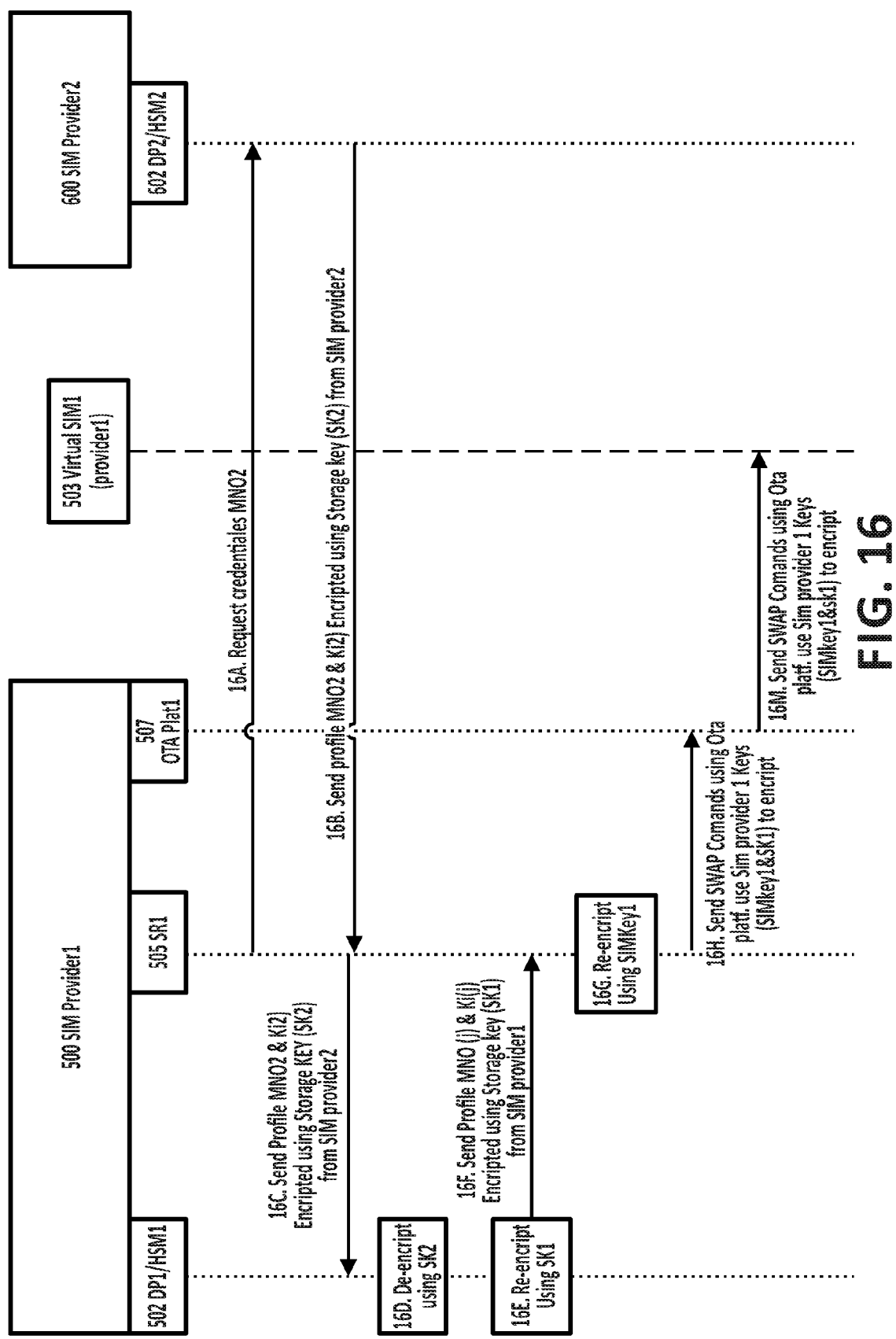
FIG. 16 shows a message diagram of communication flow for getting the mobile network operator's profile from the SIM provider of the mobile destination network of the system depicted in FIG. 14, via the interface between Secure Routing and Data Preparation modules, according to another possible embodiment of the invention.

FIG. 16 presents in more detail another alternative of the process alternative of the process (1442) for getting the MNO2 credentials of previous FIG. 14 and depicts the steps of the process followed by the SIM provider1 platform (500) to obtain the data of MNO2 profile from the SIM provider2 platform (600) prior to sending them to the Virtual Sim1

(503) inside the OTA commands. In this alternative the communication between the SIM providers platforms is mainly done through the Secure Routing (SR1) module of the first platform (505) and the Data Preparation module (DP2) of the second one (602). And although the communication between Data Preparations (DP), or between Secure Routings (SR), or between the DP1 (502) and the SR2 (605) is unusual, at some times a DP can send data to another DP without involving the SRs. The process starts (16A) when SR1 (505) launches a request to get the MNO2 credentials or profile to DP2 (602). DP2 reads the data from its repository, and encrypts them using the Storage key of SIM provider2 or SK2. After that, DP2 sends (16B) the data directly to SR1. The SR1 re-sends (16C) the data to DP1. An alternative of the flows 16B and 16C can be one in which the DP2 sends the data directly to DP1 bypassing the SR1. DP1 decrypts the data (16D) since it already knows which the key SK2 is to decipher the data. DP1 re-encrypts (16E) the information again but this time using the key of SIM provider1, Storage Key1 or SK1. It uses this key so that the SIM can decrypt the information using the keys of the SIM provider who manufactured it. Then DP1 sends the ciphered information to SR1 (16F). When SR1 receives the encrypted information, SR1 sets up an encrypted communication channel to transmit the information to the SIM from the DP1 safety. The information transmitted is encrypted (16G) using the SIMKey1, generated using the Masterkey1 and a SIM unique identifier (such as IMSI). SR1 sends the OTA commands (16H) to perform the SWAP (16M) through this channel using the OTA platform (507) to the Virtual SIM1 (503). Part of the flow 16M corresponds with the beginning of the process explained in FIG. 9.

Figure 17:
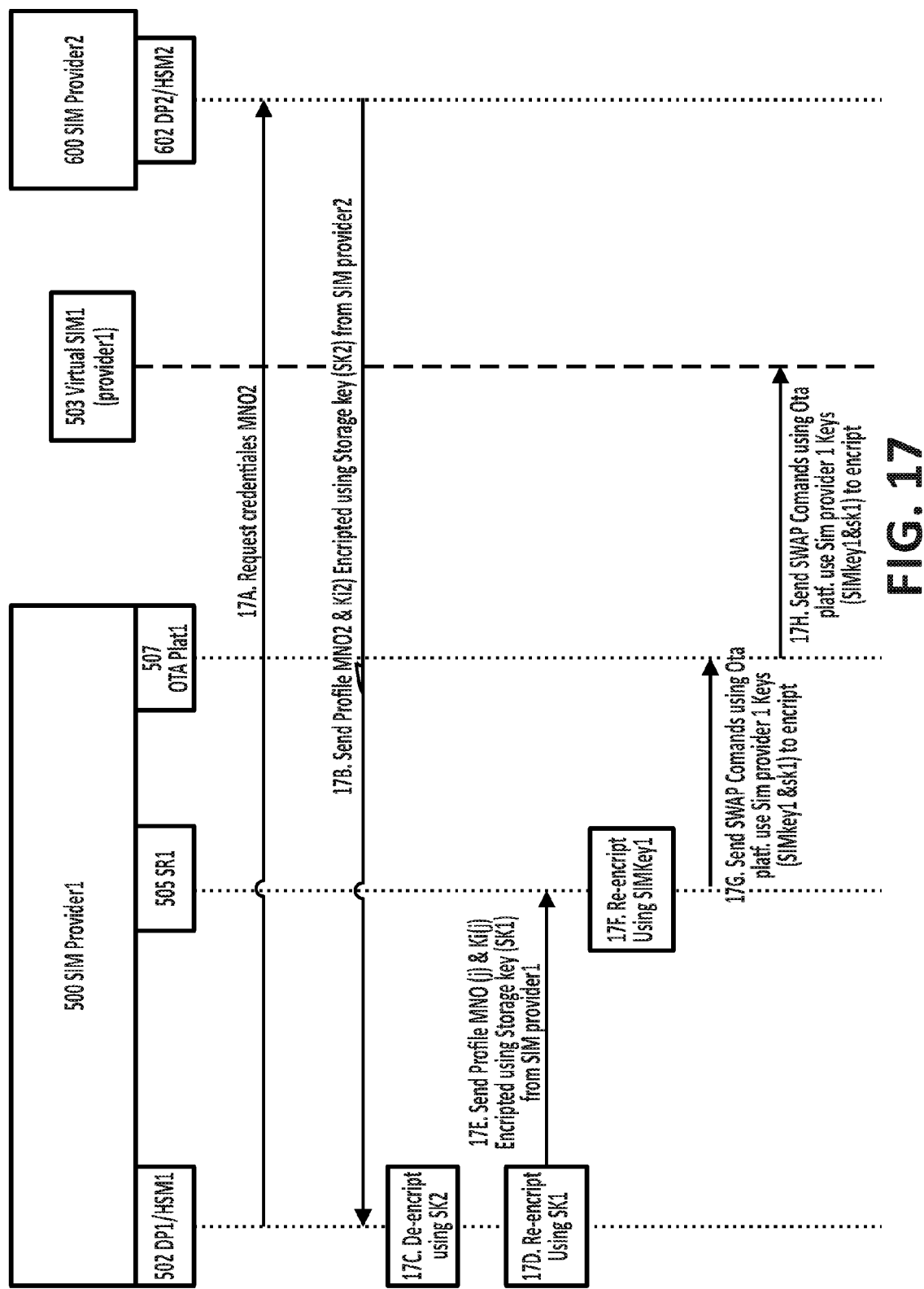
FIG. 17 shows a message diagram of communication flow for getting the mobile network operator's profile from the SIM provider of the mobile destination network of the system depicted in FIG. 14, via the interface between Data Preparation modules, according to another possible embodiment of the invention.

FIG. 17 presents a further alternative of the process (1442) for getting the MNO2 credentials of previous FIG. 14 and depicts the steps of the process followed by the SIM provider1 platform (500) to obtain the data of MNO2 profile from the SIM provider2 platform (600) prior to sending them to the Virtual Sim1 (503) inside the OTA commands. In this alternative the communication between the SIM provider platforms is mainly done through the Data Preparation (DP) modules from both platforms. The communication between Secure Routings (SR) or between the Data Preparation and the Secure Routing when they do not belong to the same platform providers SIM is not allowed. The process starts when DP1 (502) launches a request to get (17A) the MNO2 credentials or profile to DP2 (602). DP2 reads the data from its repository, and encrypts them using the Storage key SK2 of SIM provider2. After that, DP2 sends the data (17B) directly to DP1 bypassing the SR1 and SR2. DP1 decrypts the data (17C), since it already knows which the key SK2 (exchanged according to the process depicted in FIG. 6) to decipher the data. DP1 re-encrypts the information again (17D) but this time using the key of SIM provider1 SK1 (Storage Key1). Then DP1 sends the ciphered information (17E) to SR1. When SR1 receives the encrypted information, he sets up an encrypted communication channel to transmit the information to the SIM from the DP1 safety. The information transmitted is encrypted (17F) using the SIMKey1. SR1 sends the OTA commands (17H) to perform the SWAP (17G) through this channel using the OTA platform (507) to the Virtual SIM1 (503). Part of the flow 17H corresponds with the beginning of the process explained in FIG. 9.

Figure 18:
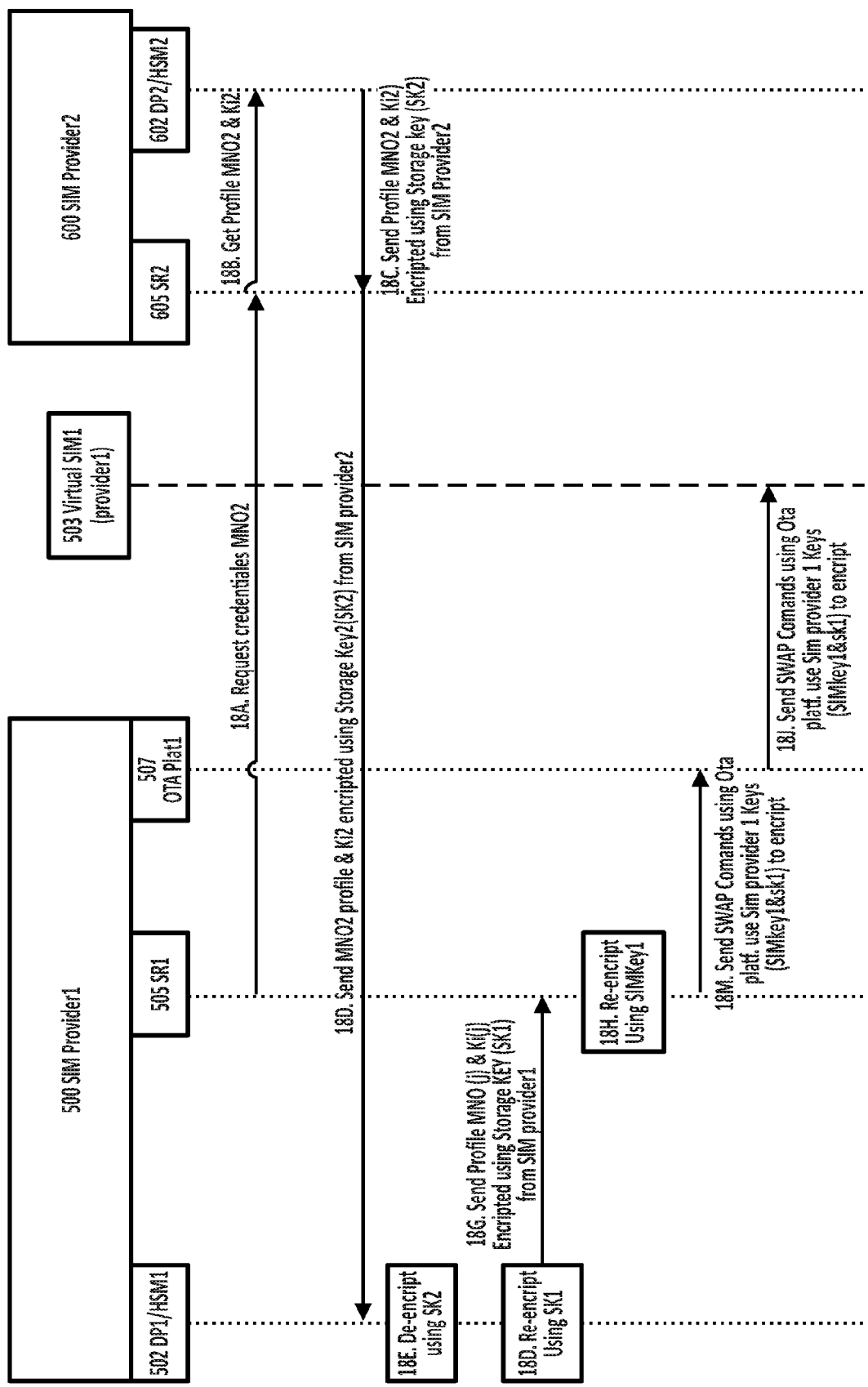
FIG. 18 shows a message diagram of communication flow for getting the mobile network operator's profile from the SIM provider of the mobile destination network of the system depicted in FIG. 14, via the interface between Data Preparation and Secure Routing modules, according to a further possible embodiment of the invention.

FIG. 18 presents a further alternative of the process (1442) for getting the MNO2 credentials of previous FIG. 14 and depicts the steps of the process followed by the SIM provider1 platform (500) to obtain the data of MNO2 profile from the SIM provider2 platform (600) prior to sending them to the Virtual SIM1 (503) inside the OTA commands. In this alternative the communication between the SIM providers platforms is mainly done through the Data Preparation module of the first platform (DP1) (502) and the Secure Routing (SR) module of the second one (SR2) (605). And although the communication between Data Preparations (DP), or between Secure Routings (SR), or between the DP2 (602) and the SR1 (505) is unusual, at some times a DP can send data to another DP without involving the SRs. The process starts (18A) when DP1 (502) launches a request to get the MNO2 credentials or profile to SR2 (605). SR2 re-sends the request (18B) directly to DP2 (602). DP2 reads the data from its repository, and encrypts them (18C) using the Storage key SK2 of SIM provider2. After that, it sends the data to SR2. The SR2 re-sends the data (18D) directly to DP1 bypassing SR1. An alternative of the flows 18C and 18D would be one in which the DP2 will send the data directly to DP1 bypassing the SR2. DP1 decrypts the data (18E) since it already knows which the key SK2 is to decipher the data, as shown in FIG. 6. DP1 re-encrypts the information (18F) again but this time using the key of SIM provider1, SK1 or Storage Key1. Then DP1 sends the ciphered information (18G) to the SR1. When SR1 receives the encrypted information, he sets up an encrypted communication channel to transmit the information to the SIM from the DP1 safety. The information transmitted is encrypted using the SIMKey1 (18H). SR1 sends the OTA commands (18M) to perform the SWAP (18J) through this channel using the OTA platform (507) to the Virtual SIM1 (503). Part of the flow 18J corresponds with the beginning of the process explained in FIG. 9.

Figure 19:
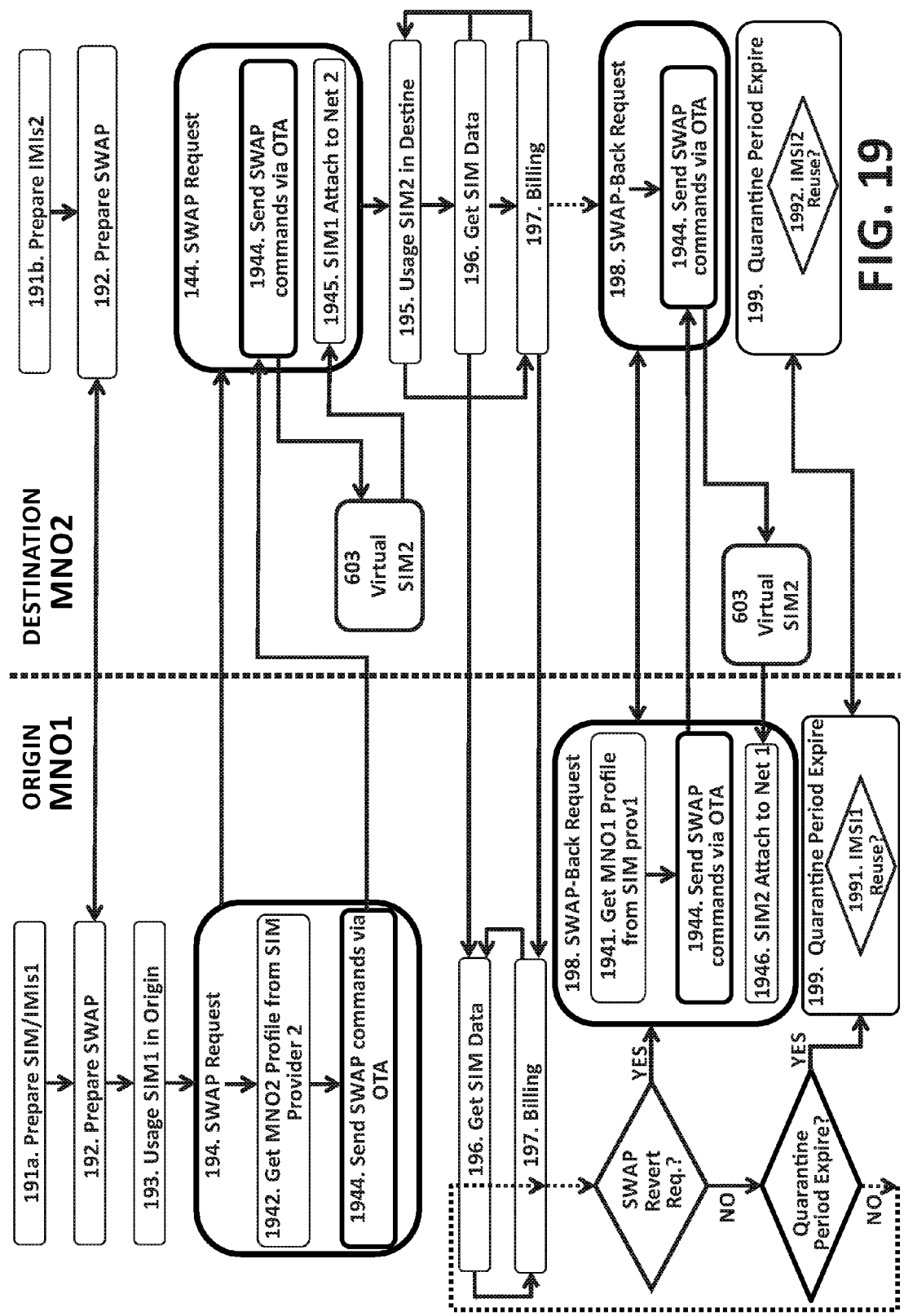
FIG. 19 shows a block diagram of system architecture for dynamic managing of subscriber devices between mobile networks in a possible network scenario of application, in which SWAP is requested on a SIM not manufactured by the SIM provider of the mobile origin network, according to a possible use case of the invention.

FIG. 19 details the main steps of another variant of the general case presented in FIG. 3. This variant refers to a case in which SWAP is requested on a SIM not manufactured by the SIM provider of the mobile origin network, e.g a SIM from the SIM provider of the mobile destination network and it is assumed that MNO1 network (400) performs the SWAP request through the IMSIs1 platform (100) and the SIM provider1 platform (500), but SWAP is done on the Virtual SIM2 (603), with the entire infrastructure needed for the SWAP belonging to the SIM provider1 and non-to the SIM provider2. In this case, the SWAP is done on a non usual SIM, SIM2, for example, due to the fact the MNO1 has decided to use SIM2s because they are cheaper, or due to other contract reasons, or due to the special features of the M2M or mobile device requiring the usage of special type of SIM supplied by the SIM provider 2. Another possibility is that the SIM was manufactured by the MNO2 request using the usual MNO2's SIM provider, SIM provider2 (600), but to test it, the MNO1 infrastructure is required. Therefore, the SIM is initially empowered with MNO1 credentials and, once tested, it is decided to send the SIM back to MNO2's country, but prior to returning it and be able to use the SIM in the final destination, the MNO2 subscriptions must be downloaded and enabled them on this SIM, SIM2. Although the SWAP is performed on the SIM manufactured by the SIM provider2 (600), the MNO1 credentials might have been given to both SIM provider1 (500) and SIM provider2 (600). MNO2 credentials might also have been given to both SIM provider1 (500) and SIM provider2 (600), or even to a third SIM provider and in this case the process to obtain the credentials from a third party would be similar to the process outlined in FIGS. 15-18. The steps of this use case variant are very similar to the ones showed in the general case of FIG. 3, section 1.2), but as follows:

Initial Steps (191a, 191b): The initial data, IMSI, MSISDN . . . , provisioned on the Virtual SIM1 (503) are loaded on the IMSIs1 platform (100) as shown in FIG. 4. In parallel, the data, IMSIs/MSISDNs, which the SIM uses to register to the MNO2 network (300), are loaded on the IMSIs2 platform (200), showed in FIG. 5. These data are used during the SWAP process.

SWAP preparing Step (192): The parameters needed to launch the SWAP are configured on the IMSIs1 platform (100). The platform IMSIs2 (200) is informed about it as shown in FIG. 6.

SIM2 usage in Origin Step (193): Before the SWAP, Virtual SIM2 (603) can be used normally in MNO1 network (400).

SWAP request Step (194): When the Virtual SIM2 (603) registers into the MNO2 network (300), a SWAP operation is launched by the IMSIs1 platform (100) as described in FIG. 20. IMSIs1 platform (100) starts a dialogue with the IMSIs2 platform (200) to obtain the IMSI2 and MSISDN2 that SIM is going to use in the MNO2 network (300) after the SWAP. IMSIs1 platform (100) also starts a dialogue (1942) with the SIM1 provider platform (500) so that the SIM provider1 platform gets the MNO2 credentials either from the SIM1 provider platform (500) or from the SIM provider2 platform (600), as in FIGS. 15-18, and to send all the information (1944) using OTA commands to the Virtual SIM2 (603) through the SIM provider2 platform (600), as in FIGS. 21-23. This differs from the case shown in FIG. 14, in which SIM1 provider platform (500) sends directly the data, IMSIs/MSISDNs, to the SIM1; in the present case of FIG. 19, SIM1 provider platform (500) is not allowed to access the SIM2 and so it needs to send the data through the SIM provider2 platform (600). After that, the Virtual SIM2 can be registered to the MNO2 network (300) successfully (1945).

SIM2 usage in Destine Step (195): After the SWAP, the Virtual SIM2 (603) can be used in the MNO2 network (300) without being charged by roaming.

Getting SIM data Step (196): During the time SIM is registered in the MNO2 network (300), it is possible to have access to their consumption data, as described in detail in FIG. 10.

Billing Step (197): During the time SIM is registered in the MNO2 network (300), it can also have access to their invoices as described in detail in FIG. 11.

SWAP-back request Step (198): When the Virtual SIM2 (603) goes back and registers into the MNO1 network (400), a SWAP reverse or SWAP-back operation is launched by the IMSIs1 platform (100), as shown in FIG. 24. IMSIs1 platform (100) starts a dialogue with the IMSIs2 platform (200) to obtain the IMSI1 and MSISDN1 that SIM is going to use in the MNO1 network (400). It also starts a dialogue (1941) with the SIM1 provider platform (500) so that the SIM provider1 platform gets the MNO1 credentials as described in FIG. 8. Then it sends all the information (1944) using OTA commands to the Virtual SIM2 (603) through the SIM provider2 platform (600), as in FIGS. 21-23. After that, the Virtual SIM2 can be registered to the MNO1 network (400) successfully (1946).

Checking quarantine period Step (199): When the quarantine period has elapsed, the IMSIs1 platform (100) lets the IMSIs2 platform (200) know about it, as described in FIG. 13. It is decided whether IMSI1/IMSI2 are going to be reused again or not (1991, 1992).

The difference between the general case of FIG. 3 and the use case described above is how the OTA commands are sent to Virtual SIM2 (603) in steps SWAP (194) and SWAP-back (198) requests. In this case, the SIM1 supplier has not manufactured the Virtual SIM2, and neither is registered in the SIM provider1 platform (500). This implies that if SIM provider1 platform (500) wants to exchange any type of information with the SIM, it should use the keys only known only by the SIM provider who manufactured it, the SIM provider2 (600), to cypher the info. Therefore, SIM provider1 platform (500) can only sends OTA commands to the Virtual SIM2 either through the SIM provider2 platform (600), or directly if it knows the keys used by the SIM provider2 or changing the behaviour of the Virtual SIM2 so that it waits information encrypted with the key of the SIM1 provider platform, instead of being encrypted with the keys of SIM2 provider platform. The method to exchange commands OTA is described according to different alternative implementations respectively presented in FIGS. 21, 22 and 23, existing different options for the relationship between the SR and DP modules of the SIM provider platforms. These alternatives have also been modelled according to the architecture standard proposed by the GSMA architecture of FIG. 1.

Figure 20:
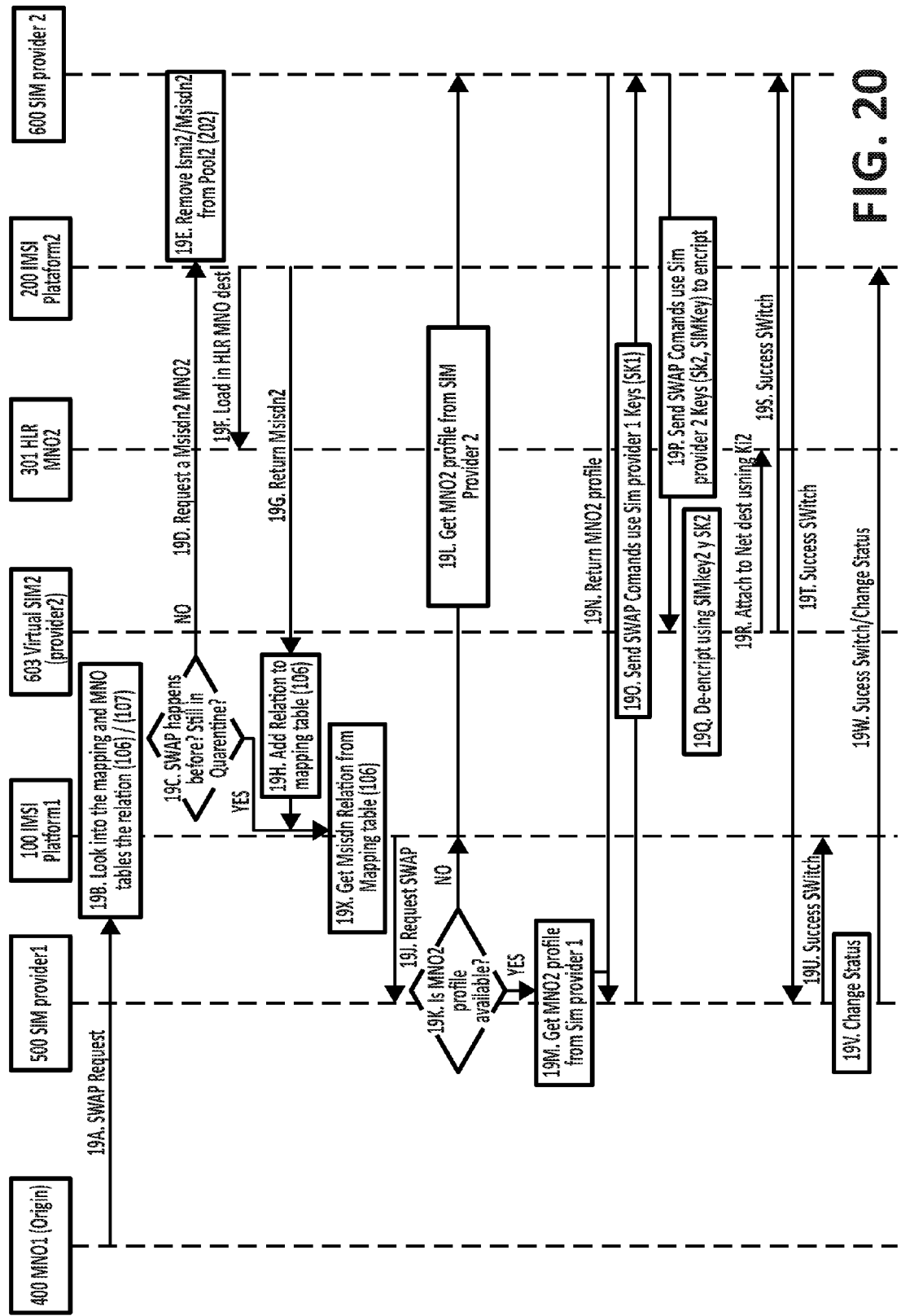
FIG. 20 shows a message diagram of communication flow for SWAP request to a different SIM not manufactured by the SIM provider of the mobile origin network of the system depicted in FIG. 219, according to a possible embodiment of the invention.

FIG. 20 depicts the steps when there is a request for SWAP on the Virtual SIM2 (603) card. The profile MNO where the SIM is located must be loaded on it at the time the petition, so that the SWAP can be performed. A SWAP process cannot be carried out if there has been a previous SWAP request and it has been not made a request to reverse the SWAP or SWAP-Back. A SWAP process can be launched manually or automatically from the IMSIs1 platform (100). SWAP is launched automatically, when one of the SWAP Rules (105) is satisfied and the SIM is registered, in a country or MNO configured in this SWAP Rules (105) table, or the time set to trigger the rule has come to an end. The SWAP begins (19A) when the MNO1 (400) launches the request for the SWAP to the IMSIs1 platform (100). The IMSIs1 platform (100) checks if there has been a previous SWAP request with the same parameters and if so it tries to retrieve the data (19B) of the IMSI2/MSISDN2 that it has previously been assigned to the SIM from the mapping table (106). It also uses this same table and MNO mapping table (107) to find out in which MNO's network the SIM is, and how to send requests to its IMSIs platform. In the event that there had not been a previous SWAP request with the same parameters (19C), or if there had been, but the data had been deleted because the quarantine period had expired, the data of IMSI2/MSISDN2 are not in the mapping table (106). In this case, the IMSIs1 platform (100) launches a request (19D) to the IMSI2 platform (200) to get them. IMSIs2 platform (200) searches a MSISDN2/IMSI2 available and not associated with any SIM yet into its pool2 (202). IMSIs2 platform (200) returns them (19G) to the IMSIs1 platform (100), but before of returning them, it removes them (19E) from the pool2 (202) so they can no longer be used. Then, IMSIs2 platform (200) loads them (19F) on its HLR2 (301) in order that MSISDN2/IMSI2 will be authorized to use the MNO2 network (300) when SWAP happens. When the IMSI1 platform (100) receives the IMSI2/MSISDN2, it stores this relationship (19H) in the mapping table (106) to be available for billing and to be able to be reused in the SWAP/SWAP-Back. All the communication between IMSI1 and IMSI2 platforms (100, 200) is properly encrypted according to the parameters exchanged for both platforms, as shown in FIG. 6, and retrieved from the of MNO mappings table (107). This information is encrypted so that both platforms (100, 200) can recognize and validate that requests come from authorized source for it. When IMSIs1 platform (100) has already gotten the data IMSI2/ MSISDN2, IMSIs1 platform (100) retrieves them (19X) from the mapping table (106), and launches the request to SIM provider1 platform (500) to send the commands to the Virtual SIM1 for the SWAP (19J). In the request, the IMSI1/MSISDN1 currently used by the SIM is passed as parameters, so that the SIM provider platform can locate the SIM. The new IMSI2/MSISND2 data to be loaded are also given as parameters. To be capable of performing the SWAP, SIM provider1 platform (500) also obtain other information about the MNO whose subscription wants to load. In this case, the MNO2 subscription wants to be activated. SIM provider1 platform (500) must check if it has this information or not (19K). If SIM provider1 platform (500) is the MNO2's SIMs provider, it can get the data from its own platform (19M), as explained in more detail in FIG. 8. If SIM1 provider platform (500) is not the MNO2's provider, the data is gotten (19L) from the SIM provider2 platform (600), which returns the data (19N). The process to get the MNO2 profile from the SIM provider2 (600) is a complex process that requires the exchange of information between both platforms of SIM providers and which is explained in more detail in FIGS. 15-18. After getting the data of MNO2 profile and MSISDN2/IMSIs2, SIM provider1 platform (500) sends the OTA commands to the Virtual SIM2 (603), but as the Virtual SIM2 doesn not belong to SIM provider1 and it has not been registered into the SIM provider1 platform (500), it cannot send the command directly, through the SIM provider2 platform (600). SIM provider1 platform (500) sends the data (19O) to load into the SIM to SIM provider2 platform (600) cyphered with the SIM provider1 key, SK1. SIM provider2 platform (600) deciphers the info and it cyphers it again using its own keys SK2 and SIMKey2. Then it sends it to the Virtual SIM2 using an encrypted channel (19P) through OTA2 platform (607). When the SIM2 (603) receives the data and the data are downloaded on the SIM2, they are deciphered, and loaded on it and the data of the new subscription is activated (19Q). Then the SIM is restarted and it register on the MNO2 network (300) using the new subscription. The HLR of MNO2 (301) successfully verifies the SIM registration (19R). Steps 19O to 19T are explained more fully in FIGS. 21 to 23, according to several alternatives. If the registration on the MNO2 network (300) is successful (19R), Virtual SIM2 (603) informs about the success of the operation to the SIMs provider platform, from which it received the SWAP request. In this case, the SIM informs (19S) to SIM provider2 platform (600) which, in turn, informs (19T) to the SIM provider1 platform (500), the platform that originated initially the request. The SIM provider1 platform (500) informs about the success of the operation (19U) to the IMSIs1 platform (100), from which it received the SWAP request. At that time, the IMSIs1 platform (100) changes the SIM status (19V) and deactivates it to not allow the SIM consumption and stops its billing. IMSIs1 platform (100) also reports the success of the operation (19W) to IMSIs2 platform (200), so that it can carry out the appropriate actions, such as changing the SIM status or activates it to allow the SIM consumption and to start its billing.

Figure 21:
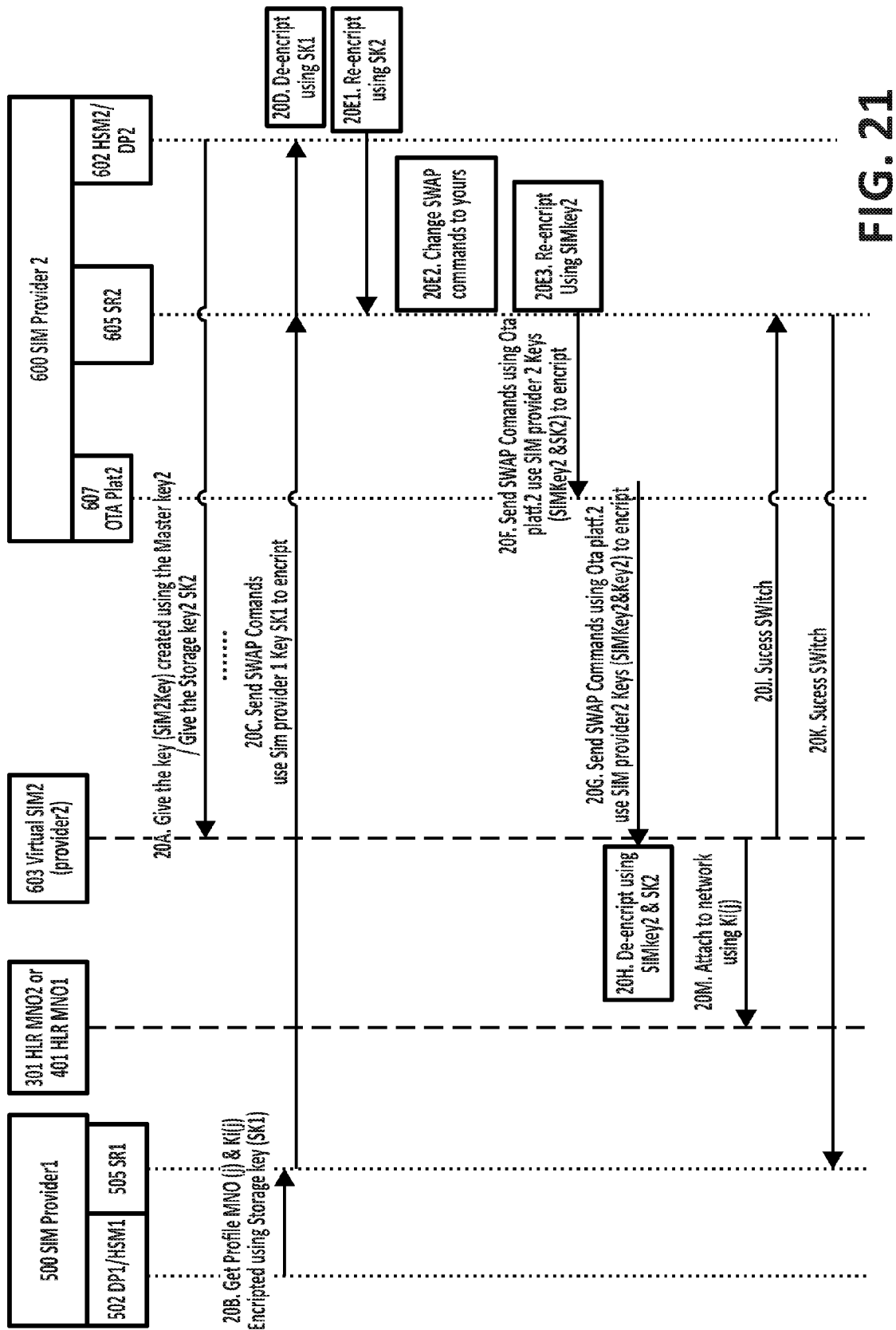
FIG. 21 shows a message diagram of communication flow for sending SWAP commands from the SIM provider of the mobile destination network of the system depicted in FIG. 19, according to a possible embodiment of the invention.

FIG. 21 shows a first alternative so that the SIM provider1 platform (500) can send the OTA commands to the Virtual SIM2 (603). In this case, the shipment is going to be through the SIM provider2 platform (600). This alternative is only valid if the commands sent by the SIM provider1 platform (100) do not follow the same format or/and are incompatible to those ones that Virtual SIM2 (603) is able to interpret, and usually sent by the SIM provider2 platform (600). To be able to set up communication channel between both SIM providers' platforms (500, 600), and between the Virtual SIM2 (603) and SIM provider1 platform (500), which is not its manufacturer, both platforms of SIM providers must have exchanged their encryption keys SK1, SK2, Masterkey1 and Masterkey2, as described in FIG. 6. During the SIM manufacturing process, any of the modules of the SIM2 provider platform (600), normally the DP2 (602), also empowers the SIM with the MNO credentials and with the keys SK2 and Masterkey2. SK2 is the Storage Key that encrypts any communication between DP2 and SR2 and Masterkey2 is used to generate the key SIMKey2 to cypher all the communication between the SIM and SR2. These two processes of providing the Virtual SIM2 (603) with SK2 and Masterkey2 (20A) are carried out earlier than the rest of the steps/flows of FIG. 21. The process to exchange the OTA commands begins when the module DP1 (502) of SIM provider1 platform (500) has gotten the MNO credentials to be loaded on the SIM from its own platform, as described in FIG. 8, or from other SIM provider platform as described in FIGS. 15 to 18. MNO credentials are those ones that belong to MNO2 in the case of a SWAP request and those ones that belong to MNO1, in the case of a request for SWAP-back. The DP1 encrypts the data with Storage key SK1 of SIM provider1 and sends it (20B) to SR1 (505). SR1 sends the information encrypted with the SK1 key along with the commands to be sent (20C) to the SIM to the SIM provider2 platform (600); it might be sent the SR2 (605) that would resend them to the DP2 (602), or be sent directly to DP2. In SIM provider2 platform (600), DP2 module (602) is in charge of decrypting the information encrypted (20D) using the key SK1 and encoding it using its own key SK2 and sending it back to SR2 (20E1). SR2 first understands what the SWAP commands imply and then encodes the orders (20E2) with its own commands so that it can be understood by the SIM. Then the SRs sets up an encrypted channel (20E3) to communicate with the Virtual SIM2 using the key SIMKey2, and it sends the SWAP commands (20G) to the SIM2 (603) encoded with the keys SIMkey2 and SK2, through the OTA2 platform (607) (20F). When the SIM receives the commands, it deciphers them using the SIMKey2 and SK2 key and it executes the appropriate commands to load the data of the new subscription and to activate it (20H), and then it restarts itself. When it is reset, it is registered (20M) in the HLR of the corresponding MNO using the data IMSI and Ki of the new subscription. The SIM usually register into the MNO2 network (300) in the case of SWAP, or into the MNO1 network (400) in the case of SWAP-Back. If the SIM registers in the HLR of the MNO successfully, the SIM informs (20J) to the SIM provider platform from which it receives the orders, in this case from SIM provider2 platform (600), and it usually sends the notification to SR2. The SIM provider2 platform (600) usually notifies (20K) the provider platform which originated the request about the successful operation, SIM provider1 platform (500) in this case.

Figure 22:
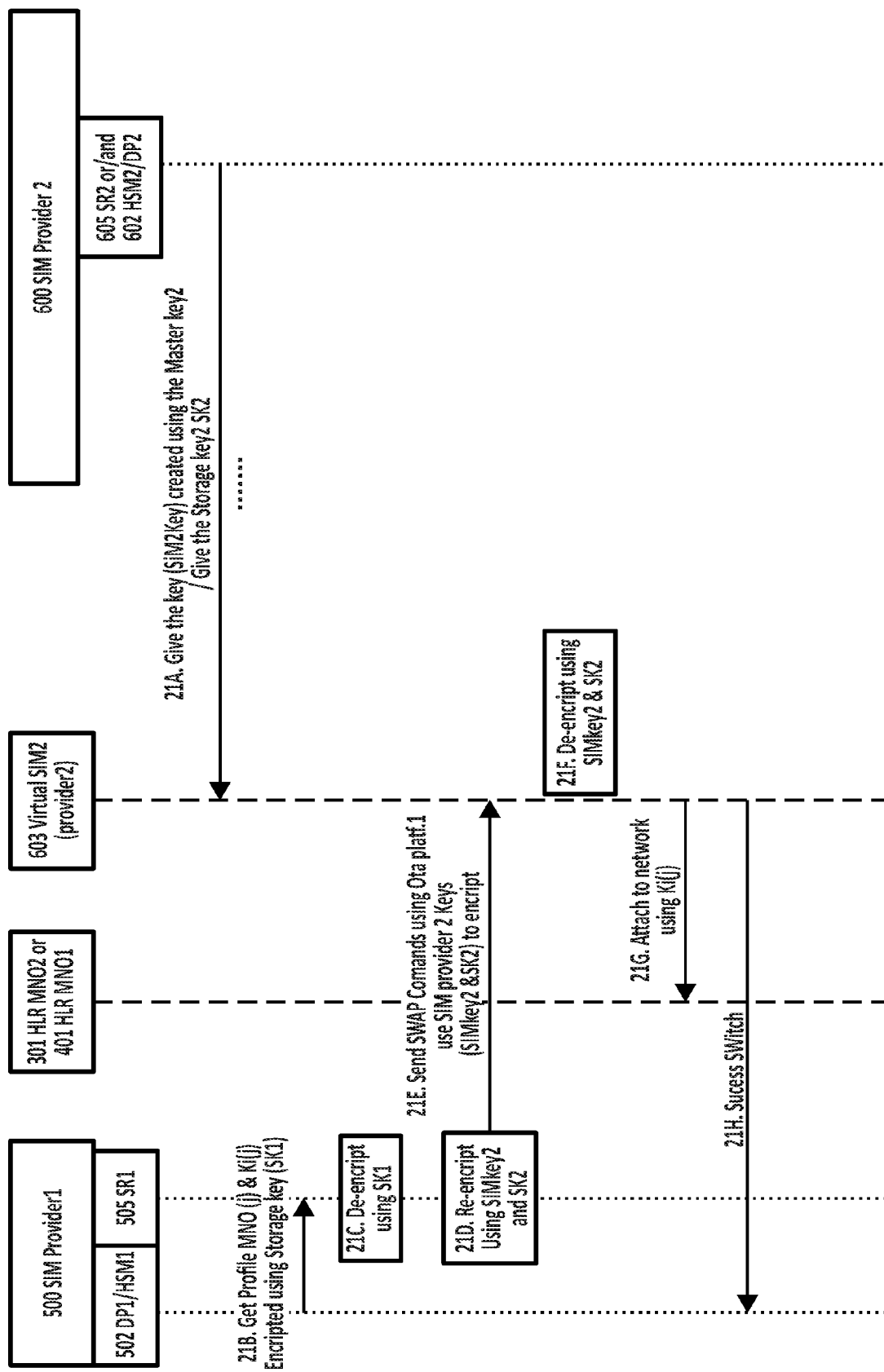
FIG. 22 shows a message diagram of communication flow for sending SWAP commands to a different SIM not manufactured by the SIM provider of the mobile origin network from the SIM provider of the mobile origin network of the system depicted in FIG. 19, according to another possible embodiment of the invention.

FIG. 22 shows another alternative so that the SIM provider1 platform (500) can send the OTA commands to the Virtual SIM2 (603). In this case, the shipment is going to be made directly by the SIM provider1 platform (500), because of the fact it already knows the keys used by the SIM provider2 to communicate with the SIM. This alternative is only valid if the commands sent by the SIM provider1 platform (500) follow the same format and are highly compatible to those ones that Virtual SIM2 (603) is able to interpret. This variant is only valid if the Virtual SIM2 has been registered on both SIM providers' platforms (500, 600). To be able to set up communication channel between both platforms of SIM providers, and between the Virtual card SIM2 (603) and SIM provider1 platform (500), which is not its manufacturer, both SIM providers' platforms (500, 600) must have exchanged their encryption keys SK1, SK2, Masterkey1 and Masterkey2, as described in FIG. 6. During the SIM manufacturing process, any of the modules of the SIM2 provider platform (600), normally the DP2 (602), also empowers the SIM (21A) with the MNO credentials and with the key SK2 and Masterkey2. These two processes were carried out earlier than the rest of the flows of the FIG. 22.

The process to exchange the OTA commands begins after that the module DP1 (502) of SIM provider1 platform (500) has gotten the MNO credentials to be loaded on the SIM from its own platform, described in FIG. 8, or from other SIM provider platform, described in FIGS. 15 to 18. MNO credentials are those ones that belong to MNO2 in the case of a SWAP request and those ones that belong to MNO1, in the case of a request for SWAP-back. The DP1 encrypts the data with Storage key SK1 of SIM provider1 (500) and sends it (21B) to SR1 (505). SR1 (505) deciphers the info codified with the SK1 key (21C) and it cyphers (21D) again with the keys of SIM provider2 platform (600), the keys SK2 and SIMKey2. Then the SR1 sets up an encrypted channel to communicate with the Virtual SIM2 using the key SIMKey2, and it sends the SWAP commands (21E) to the SIM2 (603) encoded with the keys SIMkey2 and SK2, through the OTA1 platform (507). When the SIM receives the commands, it deciphers them using the SIMKey2 and SK2 key and it executes the appropriate commands to load the data of m the new subscription and to activate it (21F), and then it restarts itself.

When it is reset, it is registered (21G) in the HLR of the corresponding MNO using the data of the new subscription: IMSI and Ki. The SIM usually register into the MNO2 network (300) in the case of SWAP, or into the MNO1 network (400), in the case of SWAP-Back. If the SIM registers in the HLR of the MNO successfully, the SIM informs (21H) to the SIM provider platform from which it receives the orders; in this case, it usually sends the notification to SR1 (505) from the platform of the SIM provider 1 (500).

Figure 23:
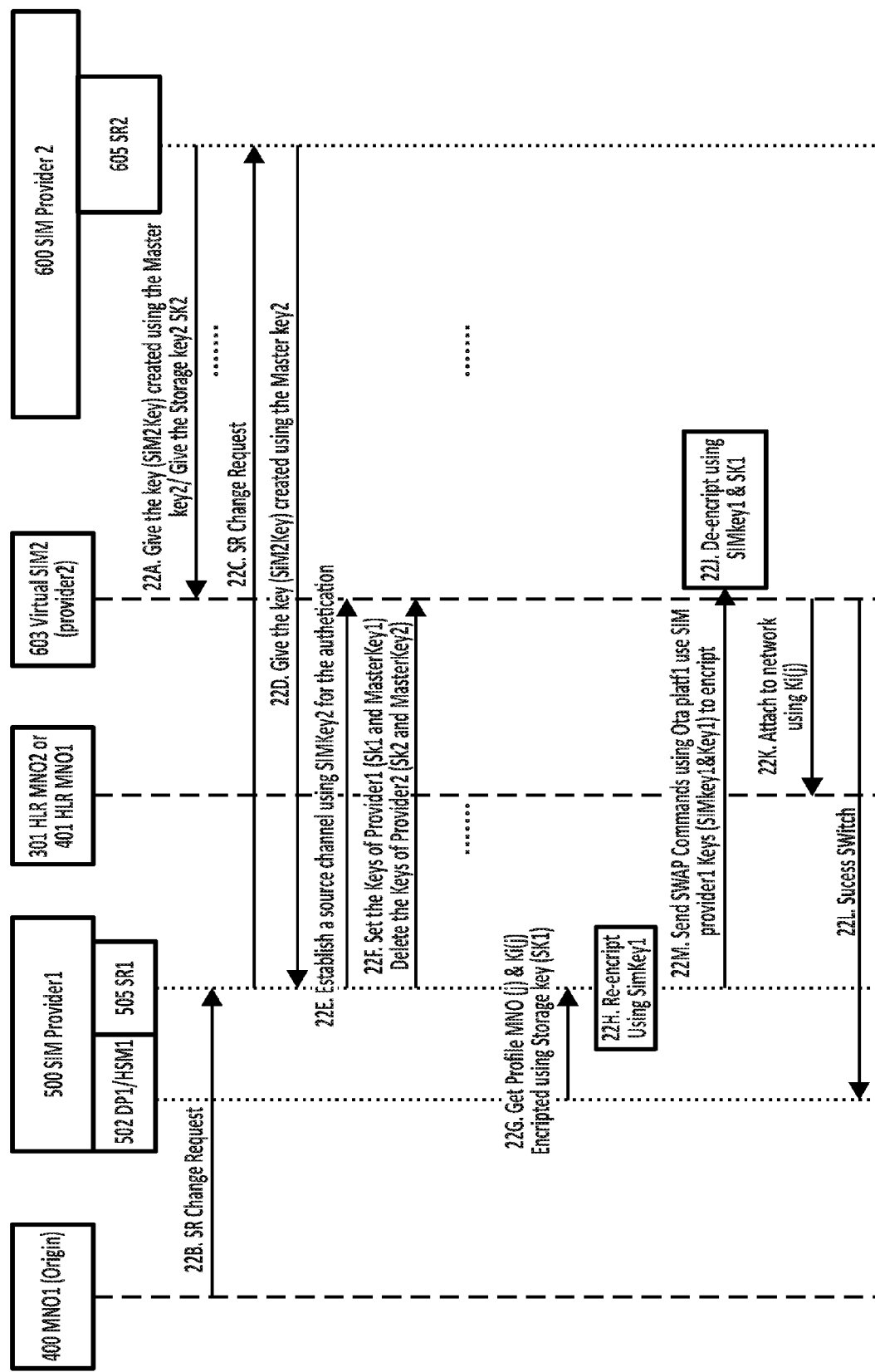
FIG. 23 shows a message diagram of communication flow for sending SWAP commands to a different SIM not manufactured by the SIM provider of the mobile origin network of the system depicted in FIG. 19, via the interface between Secure Routers, according to a further possible embodiment of the invention.
Figure 24:
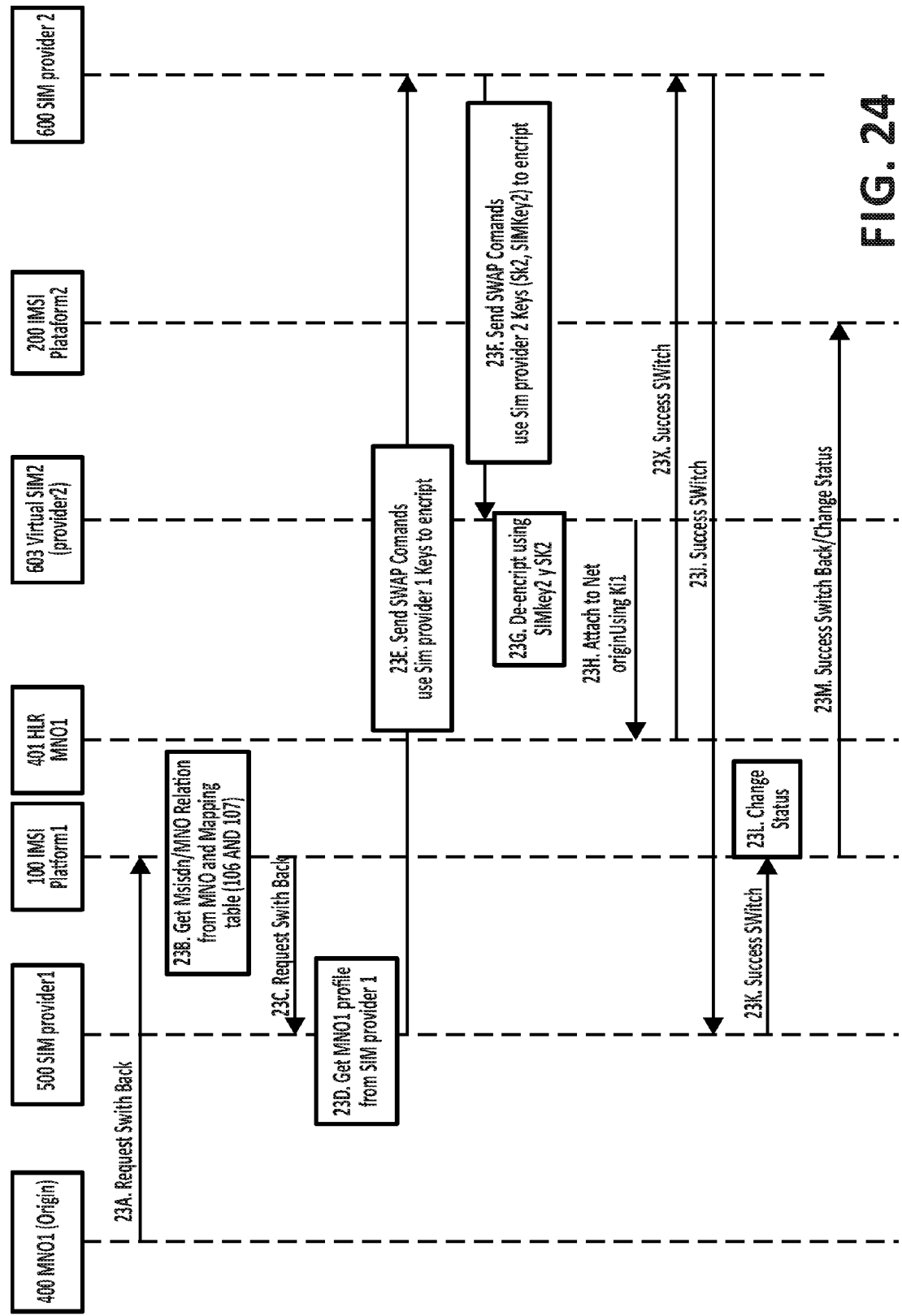
FIG. 24 shows a message diagram of communication flow for SWAP-Back request to a different SIM not manufactured by the SIM provider of the mobile origin network of the system depicted in FIG. 19, according to a possible embodiment of the invention.

FIG. 23 shows another alternative so that the SIM provider1 platform (500) can send the OTA commands to the Virtual SIM2 (603). In this case the shipment is going to be made directly by the SIM provider1 platform (500) using its own keys, instead of ciphering the info with the keys of SIM provider2. This alternative is only be valid if the commands sent by the SIM provider1 platform follow the same format and are highly compatible to those ones that Virtual SIM2 (603) is able to interpret. This variant is more usual than the previous one, described above and shown in FIG. 22, since SIM are usually registered in only one platform of SIM providers. In this variant, is not only changing the keys that the SIM understands but also the SIM's attachment to the SIM provider platform; more particularly, it is changing the SR which SIM is attached and OTA platform from what SIM can receive commands. Once this change has been done, the SIM will only accept commands received by the SIM provider1 platform (500), not from the SIM provider2 platform (600) unless a new change of SR assignment will be done again. To be able to set up communication channel between both SIM providers' platforms (500, 600), and between the Virtual card SIM2 (603) and SIM provider1 platform (500), which is not its manufacturer, both platforms of SIM providers must have exchanged their encryption keys SK1, SK2, Masterkey1 and Masterkey2, as shown in FIG. 6. During the SIM manufacturing process, any of the modules of the SIM2 provider platform (600), normally the DP2 (602), empowers the SIM (22A) with the MNO credentials and with the key SK2 and Masterkey2. Before starting the exchange of OTA commands, the process to change the SR to which is assigned SIM must have already happened, flows from 22B to 22F. This process begins when one of the MNO, usually MNO1, makes a request (22B) to SR1 (505) to change the SR to which the SIM2 (603) is assigned. SR1 redirects (22C) the request to SR2 (605). SR2 responds to SR1 by sending (22D) the key SIMKey2 that SR2 is currently using to exchange info with the SIM. At that time the SR1 sets a secure communication channel (22E) using SIMKey2 with the Virtual SIM2 (603). The SR1 changes the keys set used by the SIM card, and sets its own keys. It also deletes (22F) the keys set by the previous SIM provider2. The Virtual SIM2 (603) recognizes and validates who has sent the information to change the keys through the SIMKey2 key. The process to exchange the OTA commands begins after that the module DP1 (502) of SIM provider1 platform (500) has gotten the MNO credentials to be loaded on the SIM from its own platform as described in FIG. 8, or from other SIM provider platform as described in FIGS. 15 to 18. MNO credentials are those ones that belong to MNO2 in the case of a SWAP request and those ones that belong to MNO1, in the case of a request for SWAP-back. The DP1 encrypts the data (22H) with Storage key SK1 of SIM provider1 (500) and sends it to SR1 (505). The SR1 is in charge of setting up an encrypted channel to communicate with the Virtual SIM2 using the key SIMKey1, and it sends the SWAP commands (22M) to the SIM2 (603) encoded with the keys SIMkey1 and SK1, through the OTA1 platform (507). When the SIM receives the commands, it deciphers them using the SIMKey1 and SK1 key and it executes the appropriate commands to load the data (22J) of the new subscription and to activate it, and then it restarts itself. When it is reset, it is registered (22K) in the HLR of the corresponding MNO using the data of the new subscription, IMSI and Ki. The SIM usually register into the MNO2 network (300) in the case of SWAP, or into the MNO1 network (400) in the case of SWAP-Back. If the registration in the Network is successful and the use of network resources is authorized, the SIM informs (22L) to the SIM provider platform from which it received the orders; in this case, from SR1.

FIG. 24 depicts the steps or the process to reverse a SWAP or SWAP-Back on the Virtual SIM2 (603). To perform a SWAP-back, the original profile of the MNO that the SIM used to have must be loaded again on the SIM. A back SWAP process cannot be carried out if the quarantine period has expired or if there has not been a previous and successful SWAP request. SWAP-Back process can be triggered manually or automatically by the IMSIs1 platform (100). It is launched automatically, when one of the SWAP Rules (105) is satisfied and when, by example, the SIM is registered in a country or MNO that matches an entry in this table, or when the period time defined in one of the rule has come to an end. The SWAP-Back request begins when the MNO1 (400) launches a SWAP-back request (23A) to the IMSI1s platform (100). The IMSIs1 platform (100) checks whether a previous SWAP request was made or not. And if so, it tries to recover the data (23B) of the IMSI1/MSISDN1 that the SIM initially used from the mapping table (106). In order to recorver the data (23B), it also uses this mapping table (106) and MNO mapping table (107) to find out in which MNO's network the SIM is, and how to send requests to its IMSIs platform. It also sends a request to the SIM provider1 platform (500) to send OTA commands (23C) to the Virtual SIM2 (603) to make the SWAP. And It sends to it the IMSI2/MSISDN2 currently used by the SIM to be able to locate it, and the data of the new IMSI1/MSISND1 to be loaded on the SIM, as parameters. To be capable of performing the SWAP, SIM provider1 platform must also obtain other information about the MNO whose subscription wants to load. In this case, the MNO1 subscription wants to be activated, so it can be retrieved from its own platform (23D), which is explained in more detail in FIG. 8. After getting the data of MNO1 profile and MSISDN1/IMSIs1, SIM provider1 platform (500) sends the OTA commands to the Virtual SIM2 (603) using an encrypted channel through a platform OTA, but it cannot do it using its own keys throughout the SIM provider1 platform (500) since the Virtual SIM2 belongs to SIM provider2 and SIM will not recognize the data encrypted with other keys or other commands not send by SIM provider2 platform (600). For that reason, SIM provider1 platform (500) sends the OTA commands (23E) to SIM provider2 platform (600) ciphered using its storage Key SK1. By other hand, the SIM provider2 platform deciphers and encrypts the info (23F) again using its own keys, SK2 and SIMkey2, and it sends it to the Virtual SIM2 (603). When the data are downloaded on the SIM2 (603), they are deciphered, and loaded on it (23G) and the data of the new subscription is activated. Then the SIM is restarted and it register on the network MNO1 (400) using the new subscription. The HLR of MNO1 (401) successfully verifies the SIM registration (23H). If the registration on the MNO1 network was successful, Virtual SIM2 (603) informs about the success of the operation (23X) to the SIMs provider platform, from which it received the SWAP request. In this case, the SIM informs to SIM provider2 platform (600). The SIM provider2 platform (600) informs (23J) to the SIM provider1 platform (500), which was the one that initially launched the request. By other hand, the SIM provider1 platform (500) reports of the success of the operation (23K) to the IMSIs platform (100) from which it received the SWAP request. At that time, the IMSIs1 platform changes the SIM status (23L) and activates it to allow the SIM consumption and starts its billing. It also reports the success of the operation (23M) to IMSIs2 platform (200) so that it can carry out the appropriate actions, such as changing the SIM status or deactivates it again to not allow the SIM consumption and to stop its billing.

Figure 25:
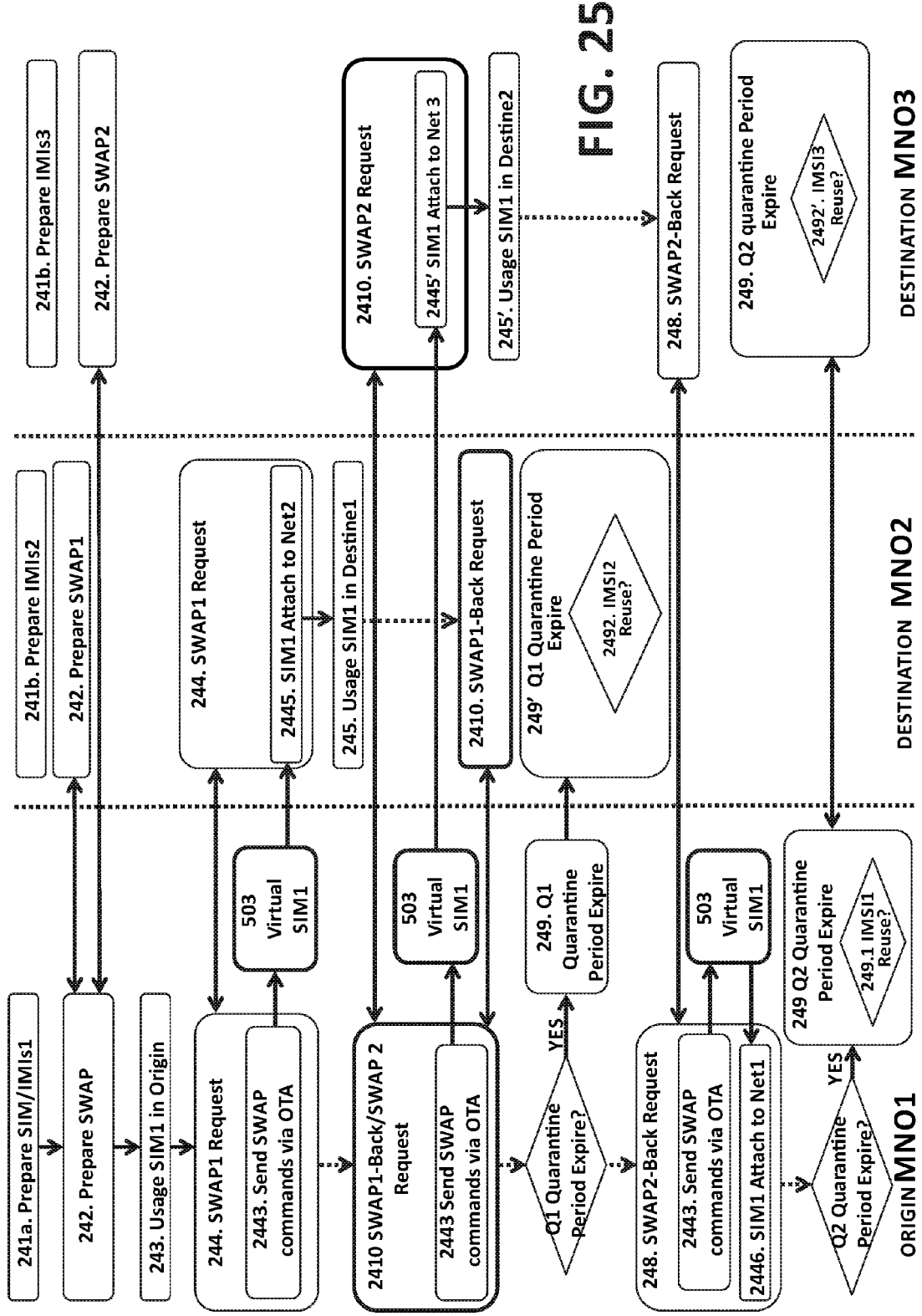
FIG. 25 shows a block diagram of system architecture for dynamic managing of subscriber devices between mobile networks in a possible network scenario with multiple mobile destination networks, according to another possible use case of the invention.

FIG. 25 depicts the main steps of another variant of the general case method presented in FIG. 3, assuming that a M2M device or a traveller empowered with a Virtual SIM1 goes from the net of MNO1 to the net of MNO2. A SWAP1 request is launched on the Virtual SIM1 (503). The SWAP request is performed through the IMSIs1 platform (100) and the SIM provider1 platform (500). The difference with the general case is that in this case the Virtual SIM1 (503) prior to returning to the origin network (400) of MNO1, moves from the MNO2 network (300) to a third party network (MNO3). At that moment a new SWAP2 request is launched on the Virtual SIM (503) through the IMSIs1 platform (100). But to perform the SWAP2 operation, the previous SWAP1 operation must be reversed. A request to reverse the SWAP1 operation, SWAP-Back1, is also launched by the IMSIs1 platform (100). Finally the Virtual SIM1 comes back to the MNO1 origin network (400) and a request to revert the SWAP2 operation, the SWAP2-back, is triggered. The steps of this use case showed in FIG. 25 are very similar to the ones showed in the general case of FIG. 3. The left side of FIG. 25 shows the steps performed during the SWAP1 and SWAP2 by the platforms of the MNO1 origin network (400). On the central side of FIG. 25, the steps performed by the platforms of the MNO2, the first destination, are showed. And finally on the right of FIG. 25, the steps performed by the platforms of the MNO3, the second destination, during the SWAP2 process. The process steps are:

Initialization Step (241): The initial data, IMSI, MSISDN . . . , provisioned on the Virtual SIM1 (503) are loaded (241*a*) on the IMSIs1 platform (100), as described in detail in FIG. 4. In parallel, the data that the SIM will use to be attached to the MNO2 network (300) and to the third party network, MNO3, are loaded on the IMSIs2 platform and on IMSIs3 platform (241*b*), as shown in FIG. 5. These data are used during the SWAP1 and SWAP2

SWAP preparing Step (242): The parameters needed to launch the SWAP are configured on the platform IMSIs1 (100), as shown in FIG. 6. The platform IMSIs2 (200) is informed about it.

Before the SWAP1, Virtual SIM1 can be used (243) normally in MNO1 network (400).

SWAP request Step (244): When the Virtual SIM1 (503) registers into the MNO2 network (300), a SWAP operation, the SWAP1, as in FIG. 7, is launched by the IMSIs1 platform (100). IMSIs1 platform (100) starts a dialogue (244) with the IMSIs2 platform (200) to obtain the IMSI2 and MSISDN2 that SIM is going to use in the MNO2 network (300) after the SWAP. It also starts a dialogue with the SIM1 provider platform (500) so that the SIM provider1 platform gets the MNO2 credentials respectively from the SIM1 provider platform (500) as described in FIG. 8 or from the SIM provider2 platform (600) as described in FIGS. 15-18, and to send all the information to the Virtual SIM1 using OTA commands (2443) as described in FIG. 9. After that, the Virtual SIM2 can be registered to the MNO2 network (300) successfully (2445).

After the SWAP1, the Virtual SIM1 (503) can be used (245) in the MNO2 network (300) without being charged by roaming. It can also have access to their consumption data (as described in FIG. 10) or their invoices (as described in FIG. 11).

When the Virtual SIM1 (503) registers (248) into the MNO3 network, prior to launching the SWAP2 operation, an operation to reverse the SWAP1, SWAP1-back must be performed. These two consecutives processes of SWAP-Back and SWAP have been merged into only one process, as described below in FIG. 26. IMSIs1 platform (100) starts a dialogue (2410) with the IMSIs3 platform to obtain the IMSI3 and MSISDN3 that SIM is going to use in the MNO3 network. It also starts a dialogue with the SIM1 provider platform (500) so that the SIM provider1 platform gets the MNO3 credentials either from the SIM1 provider platform (500), as described in FIG. 8, or from the SIM provider3 platform as describe in FIGS. 15-18, and to send all the information using OTA commands to the Virtual SIM1 (503), as described in the FIG. 9. After that, the Virtual SIM1 can be registered to the MNO3 network successfully (2445'). If the SWAP request is successful, IMSIs1 platform (100) reports the success of the operation to both platforms IMSIs2 and IMSI3s so that they can carry out the appropriate actions. For example IMSIs2 platform (200) is going to de-activate the SIM in the MNO2 network (300) and IMSIs3 platform is going to activate the SIM in the MNO3 network.

After the SWAP2 and SWAP-Back1 requests (2410), the Virtual SIM1 (503) can be used (245') in the MNO3 network (300) without being charged by roaming. It can also have access to their consumption data. The process to get the consumption data would be similar to the one described in FIG. 10. The main difference between them is that during the billing cycle when the process SWAP2 happens, the SIM consumption should be obtained not only from the platform IMSIs3, but also must be obtained the SIM consumption in the IMSIs2 platform (200) before SWAP-back1, since the SWAP-back1 process occurs before the SWAP2, and it happens in the same billing cycle.

After the SWAP2, the Virtual SIM1 (503) can be used in the MNO3 network (300). It can also have access to their invoices. The process to get the billing data would be similar to one described in FIG. 11. The main difference between them is that during some billing cycles, from the moment when the process SWAP2 happens to the Q1 quarantine expires (249'), the cost of the SIM should be obtained not only from the billing system of MNO3, but also must be obtained the cost of the SIM in the MNO2 net before SWAP-back1 from the billing system of MNO2.

When the Virtual SIM1 (503) goes back and registers into the MNO1 network (400), a SWAP2 reverse, SWAP2-back operation, is launched by the IMSIs1 platform (100) as described in FIG. 12. IMSIs1 platform (100) starts a dialogue with the IMSIs3 platform to obtain the IMSI1 and MSISDN1 that SIM is going to use in the MNO1 network (400). It also starts a dialogue with the SIM1 provider platform (500) so that the SIM provider1 platform (500) gets the MNO1 credentials as described in FIG. 8. Then it sends all the information using OTA commands to the Virtual SIM1 (503) as described in the FIG. 9. After that, the Virtual SIM1 can be registered to the MNO1 network (400) successfully (2446).

In this multidestination network scenario of the use case depicted in FIG. 25, there are two separate processes (249, 249') of checking quarantine periods, Q1 and Q2. Q1 is the time when the quarantine period related to the SWAP1 operation expires and Q2 when the quarantine period related to the SWAP2 expires. IMSIs1 platform (100) informs to IMSIs3 platform about the expiration (249) of the quarantine time Q2. This process of checking Q2 expiration (249) is exactly similar to the one described in FIG. 13, where it is decided whether IMSI1 can be reused or not (2491) and whether IMSI3 can be reused or not (2492'). IMSIs1 (100) platform informs to IMSIs2 platform (200) about to the expiration (249') of quarantine time Q1. The process of checking Q1 expiration (249') is quite similar to the one described in FIG. 13, but with the difference that the sub-processes 13E, 13F, and 13G of FIG. 13 are never going to happen, and the sub-processes 13M, 13L always going to happen as before has been made SWAP2 and SWAP-Back1, and therefore the IMSI2 is always the one to be returned (2492) to pool2 (202) and it can be reused again. The Q1 expiration process (249') might happen before or after the SWAP Back2 request.

Figure 26:
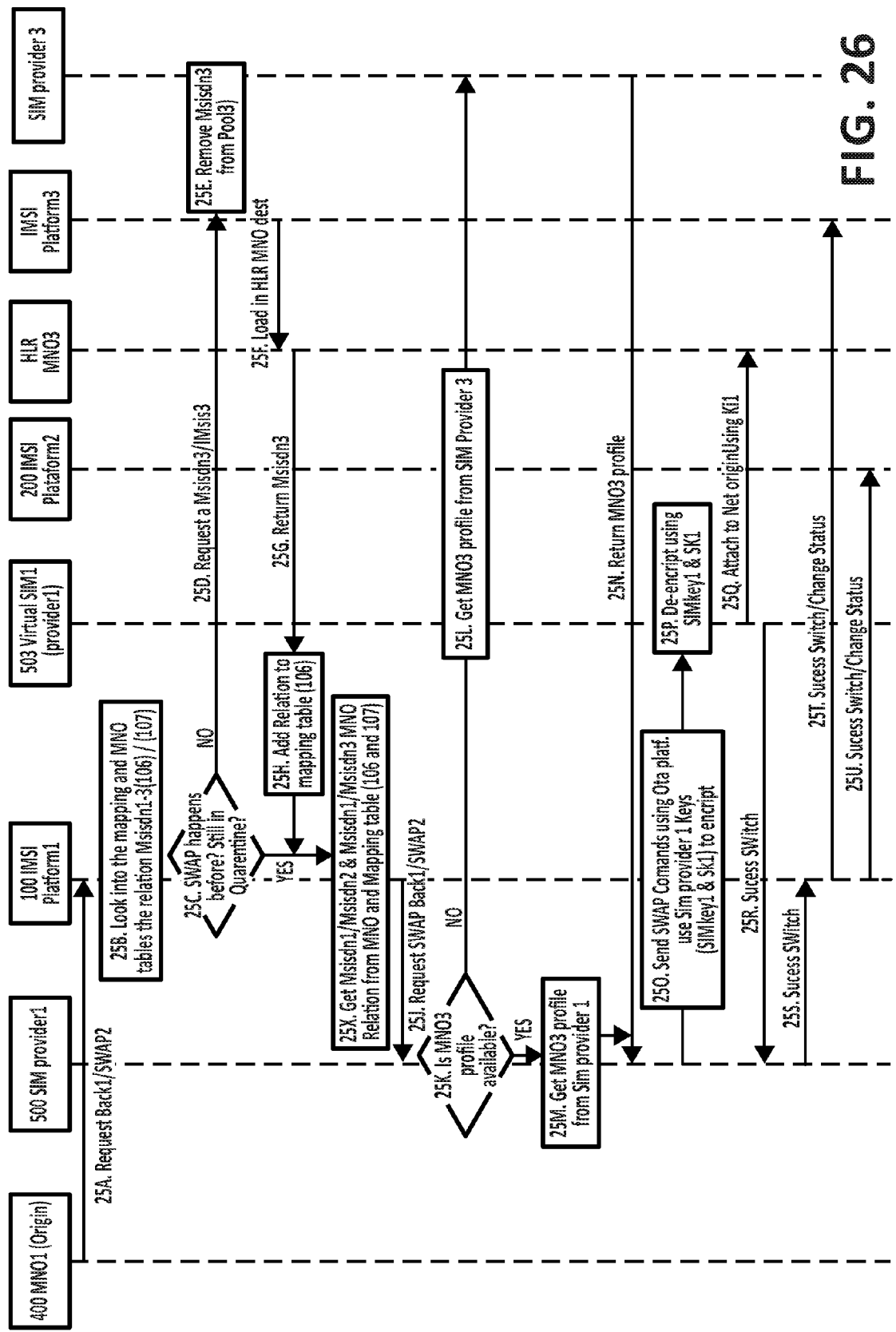
FIG. 26 shows a message diagram of communication flow for SWAP request to a second mobile destination network while a first of mobile destination network has a SWAP active in the system depicted in FIG. 25, according to a possible embodiment of the invention.

FIG. 26 depicts the steps to request a SWAP on the Virtual SIM1 (503), which already is in SWAP. The MNO profile loaded in the SIM must be changed from MNO2 to MNO3. To perform a SWAP, the previous SWAP must be reversed first. But since, after reversing the SWAP, a new SWAP is going to be made, instead of loading the MNO1 profile into the SIM, the MNO3 will be loaded directly. The MNO1 profile is not going to be loaded because the MNO1 credentials were loaded into SIM by the time of leaving factory, and the SIM is not going to be registered in that net for the time being. The SWAP request begins when the MNO1 (400) launches a SWAP request (25A) to the IMSI1s platform (100). The IMSIs1 platform (100) checks whether a previous SWAP request with the same parameters was made or not. If so, it tries to recover the data (25B) of the IMSI2/MSISDN2 and the data of the IMSI3/MSISDN3 that the SIM used before from the mapping table (106). IMSIs1 platform (100) also uses this mapping table (106) and MNO mapping table (107) to find out in which MNO's networks (25B) selected from a first destination (destine1) of MNO2 and a second destination (destine2) of MNO3, in which the SIM is/was, and how to send requests to its IMSIs platform. The data of IMSI2/MSISDN2 currently used by the SIM are always going to be retrieved from the mapping table (106), since the SWAP1 process is on-going. However a previous SWAP2 request may have happened. In this case, IMSIs1 platform (100) checks (25C) if there had been a previous SWAP2 request. In the event that there had not been a previous SWAP2 request with the same parameters, or if there had been but the data had been deleted because the quarantine period had expired, the data of IMSI3/MSISDN3 are not in the mapping table (106). In this case, the IMSIs1 platform (100) launches a request (25D) to the IMSIs3 platform to get them. IMSIs3 platform searches a MSISDN3/IMSI3 available and not associated with any SIM yet into its pool3. It returns them (25G) to the IMSIs1 platform (100), but before of returning them, it removes them from the pool3 (23E) so they can no longer be used. Then, IMSI3 platform loads them (25F) on its HLR3 in order that MSISDN3/IMSI3 will be authorized to use the MNO3 network when SWAP2 happens. When the IMSI1 platform (100) receives the IMSI3/MSISDN3, it stores this relationship (25H) in the mapping table (106) to be available for billing and to be able to be reused in the SWAP/SWAP-Back. All the communication between IMSI1 and IMSI3 platforms is properly encrypted according to the parameters retrieved from the MNO mappings table (107) and exchanged between IMSIs platforms in FIG. 6. Encryption of this information is needed so that both platforms can recognize and validate that requests come from authorized source for it. When the IMSIs1 platform (100) already has the IMSI3/MSISDN3 data, it looks for them (25X) in the mapping table (106). Then it sends a request to the SIM provider1 platform (500) to send OTA commands (25J) to the Virtual SIM1 to make the SWAP. And It sends to it the IMSI2/MSISDN2 currently used by the SIM to be able to locate it, and the data of the new IMSI3/MSISND3 to be loaded on the SIM, as parameters. To be capable of performing the SWAP, SIM provider1 platform (500) must also obtain other information about the MNO whose subscription wants to load. In this case, the MNO3 subscription wants to be activated. SIM provider1 platform (500) must check whether it has this information or not (25K). If SIM provider1 platform is the MNO3's SIMs provider, it can get the data from its own platform (25M) as explained in more detail in FIG. 8. If SIM1 provider platform (500) is not the MNO3's provider, the data must be requested to the SIM provider platform of MNO3 (25L). In this case the SIM provider3 platform is going to return the data (25N). The process to get the MNO3 profile from the SIM provider of MNO3 is a complex process, which is explained in more detail in FIGS. 15-18. After getting the data MNO3 profile and MSISDN3/IMSIs3, SIM provider1 platform (500) sends the OTA commands to the Virtual SIM1 (503) using an encrypted channel through platform OTA1 (250). When the SIM1 (503) receives the data and the data are downloaded on the SIM1 (503), they are deciphered, and loaded on it and the data of the new subscription is activated (25P). Then the SIM is restarted and it register on the network MNO3 using the new subscription. The HLR of MNO3 successfully verifies the SIM registration (25Q). Processes O, P, and Q are explained more fully in FIG. 9. If the registration on the MNO3 network was successful, Virtual SIM1 (503) informs about the success of the operation (25R) to the SIMs provider platform, from which it received the SWAP request. In this case, the SIM informs to SIM provider1 platform (500) which, in turn, informs about the success of the operation (25S) to the IMSI1 platform (100) from which it received the SWAP request. IMSI1 platform (100) also reports the success of the operation to both platforms involved in the SWAP. Firstly, IMSI1 platform (100) informs to IMSIs3 platform (25T) so that it can carry out the appropriate actions, such as changing the SIM status or activates it to allow the SIM consumption and to start its billing. IMSI1 platform (100) also informs to the IMSIs2 platform (200) about the success of the operation (25U) and IMSIs2 platform (200) changes the SIM status and deactivates it to not allow the SIM consumption and stops its billing.

Figure 27:
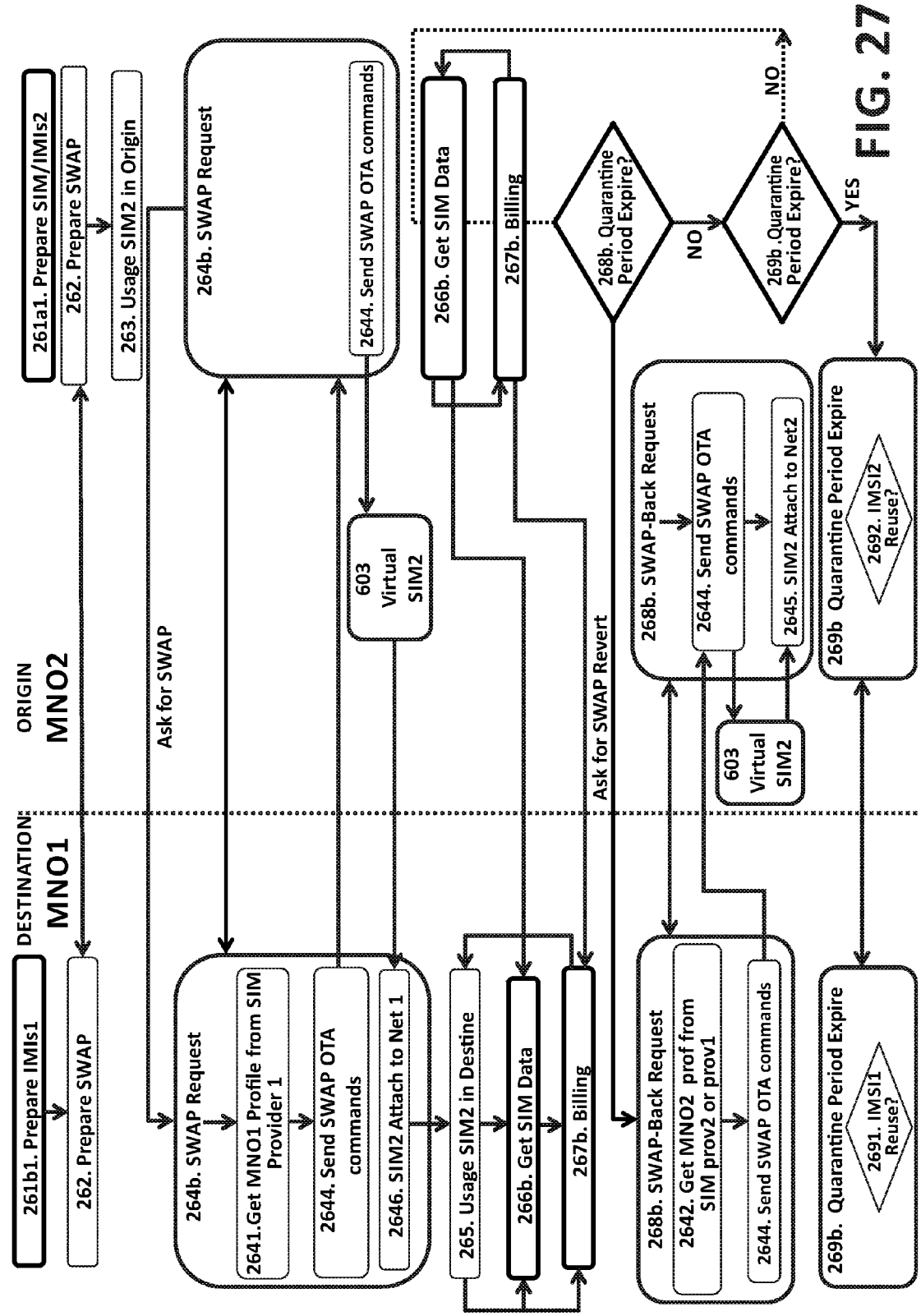
FIG. 27 shows a block diagram of system architecture for dynamic managing of subscriber devices between mobile networks in a possible network scenario with multiple mobile destination networks in which the IMSI platform of the first mobile destination network, requests SWAP, according to another possible use case of the invention.
Figure 28:
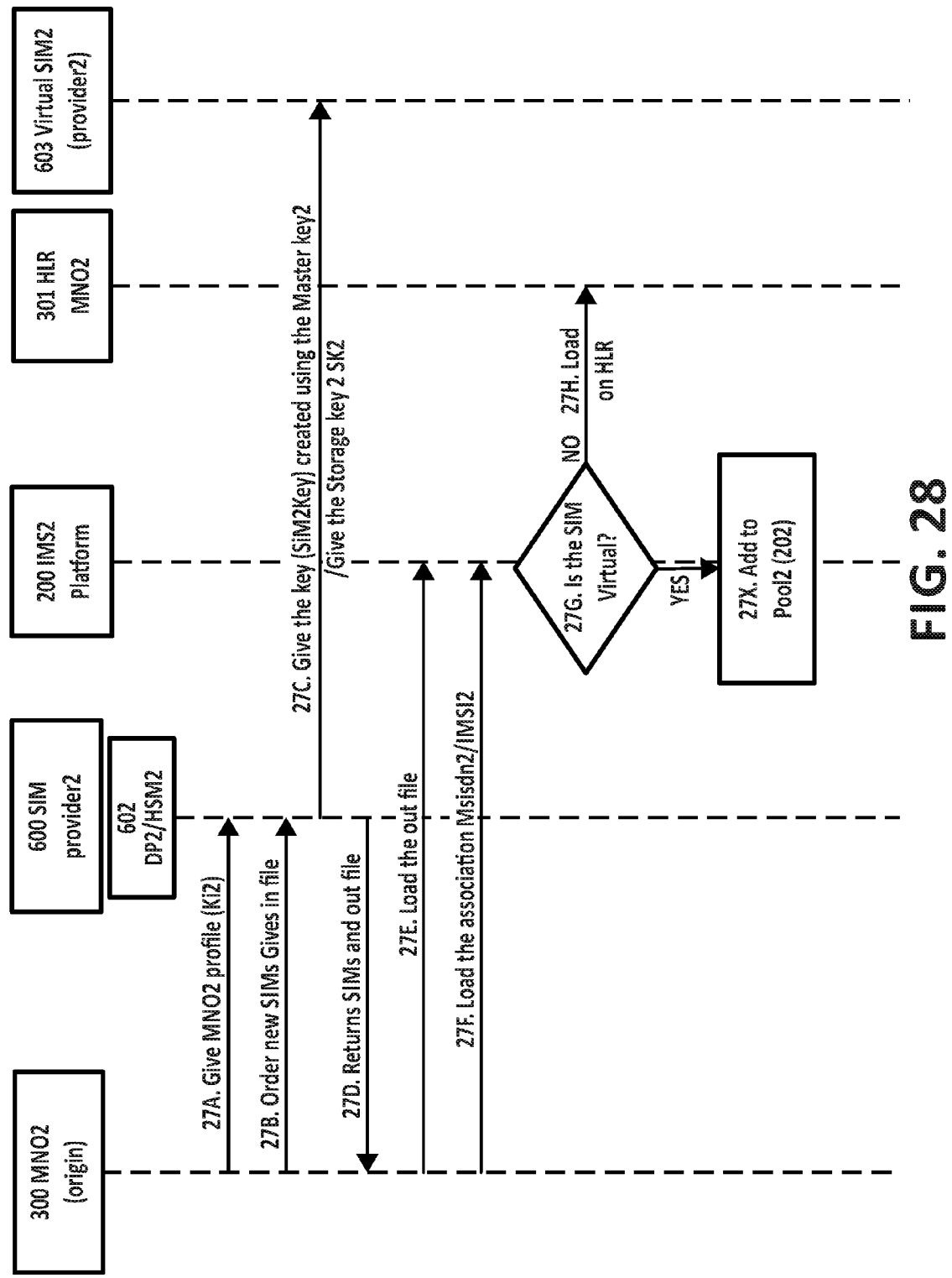
FIG. 28 shows a message diagram of communication flow for preparing a physical SIM in the mobile origin network when the IMSI platform of the first mobile destination network requests SWAP in the system of FIG. 27, according to a possible embodiment of the invention.
Figure 29:
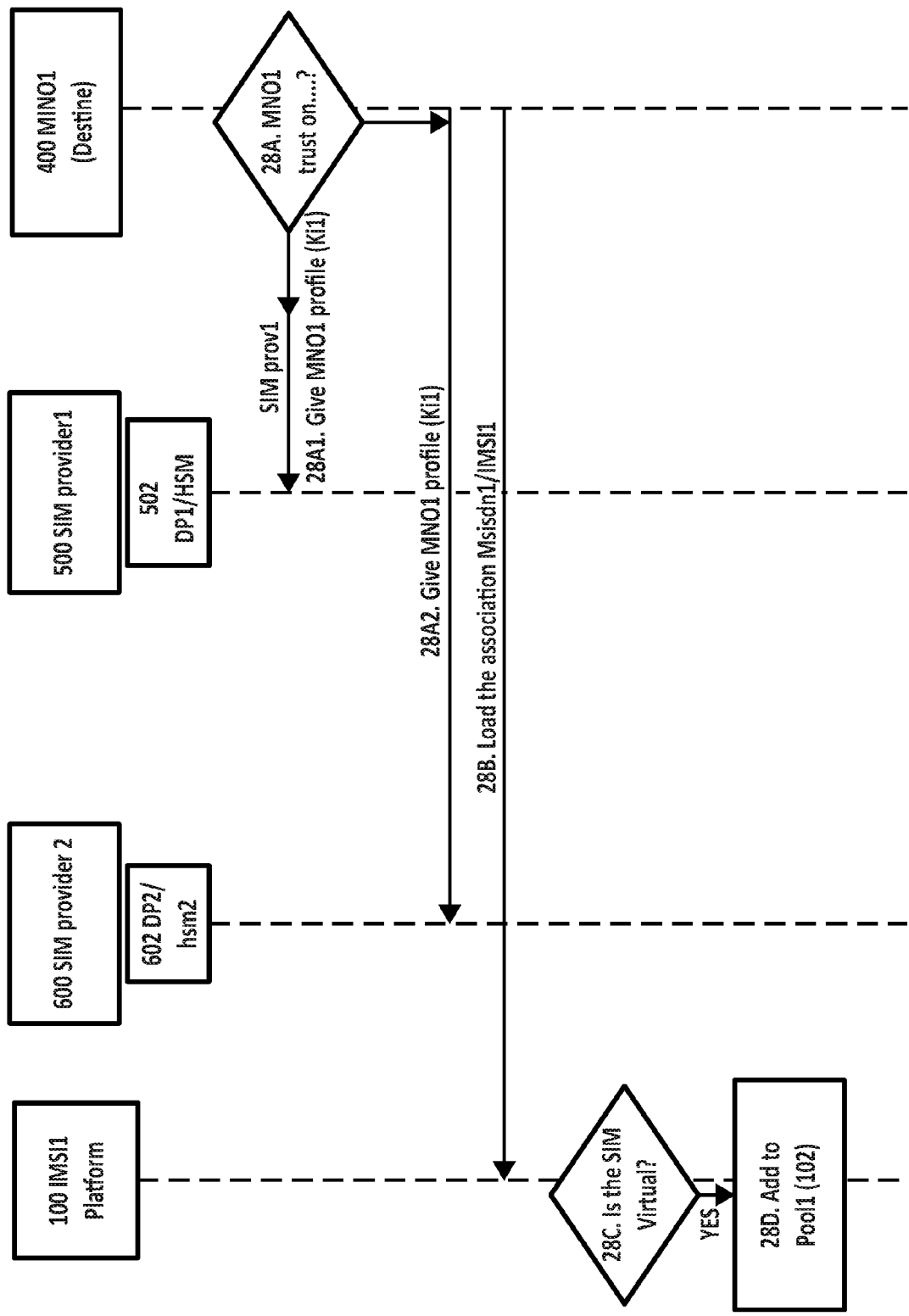
FIG. 29 shows a message diagram of communication flow for preparing a virtual SIM in the first mobile destination network when the IMSI platform of the first mobile destination network requests SWAP in the system of FIG. 27, according to another possible embodiment of the invention.

FIG. 27 depicts the main steps of another alternative of the general case method presented in FIG. 3, but in this case the MNO2 network (300) is the one which performs the SWAP request through the IMSIs2 platform (200). Since the IMSI2 platform (200) does not have the infrastructure needed, it must redirect the SWAP request to IMSI1 platform (100). The SWAP is done on the Virtual SIM2 (603), but it launched through the SIM provider1 platform (500), which it does not have the Virtual SIM2 (603) registered. Therefore, the SIM provider2 platform (600) is used as an intermediary. In this case to perform the SWAP, the credential to be loaded into the Virtual SIM2 (603) could belong to MNO1, or even belonging to a third party (MNO3), which has an agreement with MNO1. In this variant, the credentials of MNO3 could be stored in the platform of SIM provider of MNO1, MNO2, or even a third party. In case of being stored in SIM provider platform of a third party, the process to get credentials from a third party would be similar to the process presented in FIGS. 15-18. The steps of this use case, in which MNO2 network (300) acts as the origin and MNO1 network (400) plays as destination, are showed in FIG. 27, in a very similar way to the ones showed in the general case of FIG. 3: The left side of FIG. 27 shows the steps performed during the SWAP process by the platforms of the origin network, in this case the MNO2 network (300) and on the right, the steps performed by the platforms of the destination network, in this case the MNO1 network (400). The process steps are:

The initial data, IMSI, MSISDN . . . , provisioned on the Virtual SIM2 (603) are loaded (261*a*1) on the IMSIs2 platform (200), described in more detail in FIG. 28. In parallel, the data IMSIs/MSISDNs that the SIM will use to register to the MNO1 network (400) are loaded (261*b*1) on the IMSIs1 platform (100). These data are used during the SWAP as shown in FIG. 29.

The parameters needed to launch the SWAP (262) are configured on the platform IMSIs1 (100). The platform IMSIs2 (200) is informed about it, as described in FIG. 6.

Before the SWAP, Virtual SIM2 (603) can be used normally (263) in MNO2 network (300).

Figure 30:
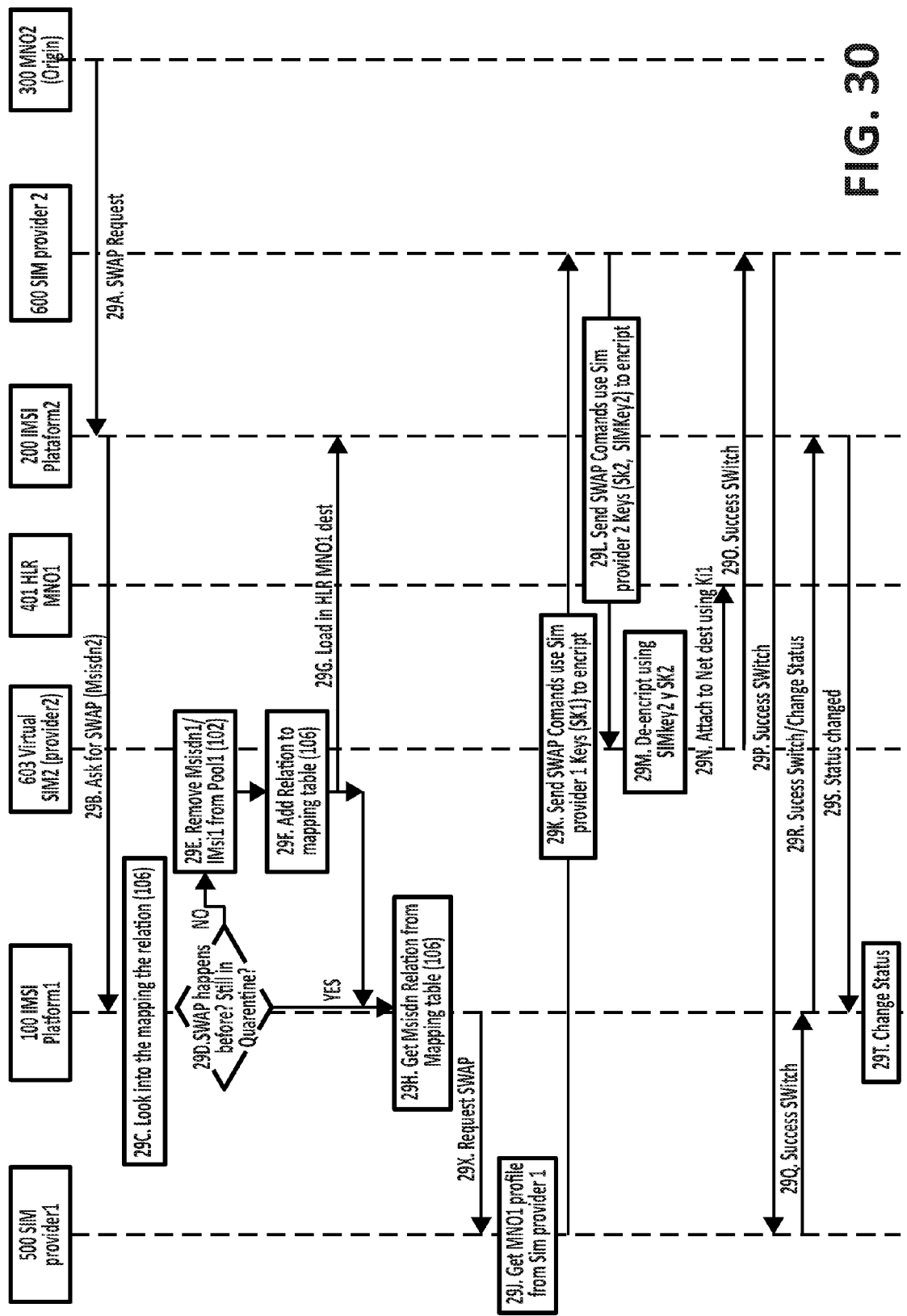
FIG. 30 shows a message diagram of communication flow for SWAP request from the IMSI platform of the first mobile destination network of the system depicted in FIG. 27, according to a further possible embodiment of the invention.

When the Virtual SIM2 (603) registers into the MNO1 network (400), a SWAP operation is launched by the IMSIs1 platform (100), described in FIG. 30, due to a request of the IMSIs2 platform (200) to IMSI1s platform (100). A dialogue between the two platforms (264*b*) starts to obtain the IMSI1 and MSISDN1 that SIM is going to use in the MNO1 network (400) after the SWAP. It also starts a dialogue (2641) with the SIM1 provider platform (500) to get the MNO1 credentials from the SIM provider1 platform (500), as described in FIG. 8, and to send this information using OTA commands (2644) to the Virtual SIM2 (603) using the SIM provider2 platform (600). After that, the Virtual SIM2 (603) can be registered to the MNO1 network (400) successfully (2646).

After the SWAP, the Virtual SIM2 (603) can be used (265) in the MNO1 network (400) without being charged by roaming.

Figure 31:
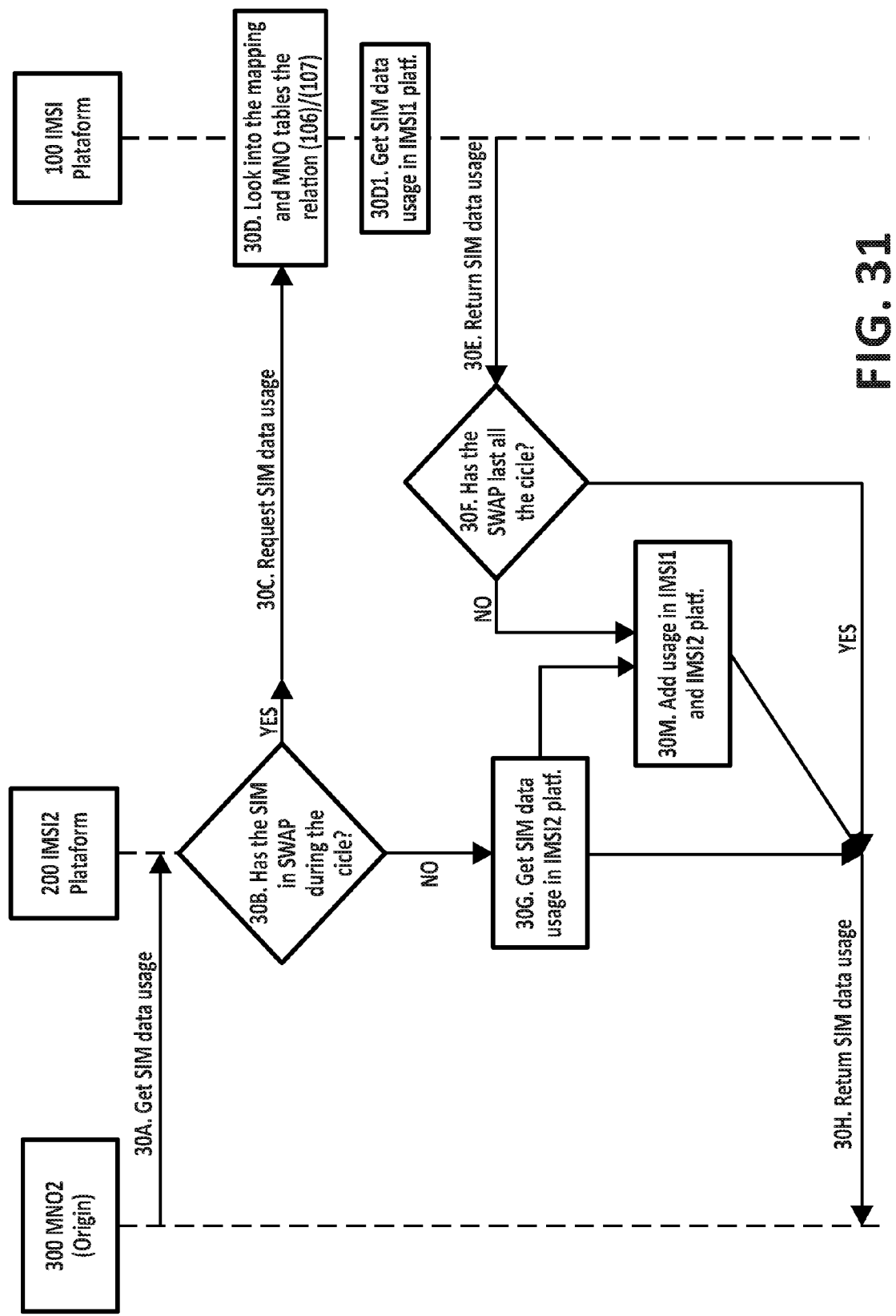
FIG. 31 shows a message diagram of communication flow for getiing SIM usage data during a billing cycle in the system depicted in FIG. 27, according to a preferred embodiment of the invention.

During the time SIM is registered in the MNO1 network (400), it is possible to have access to their consumption data (266*b*), further described in FIG. 31.

Figure 32:
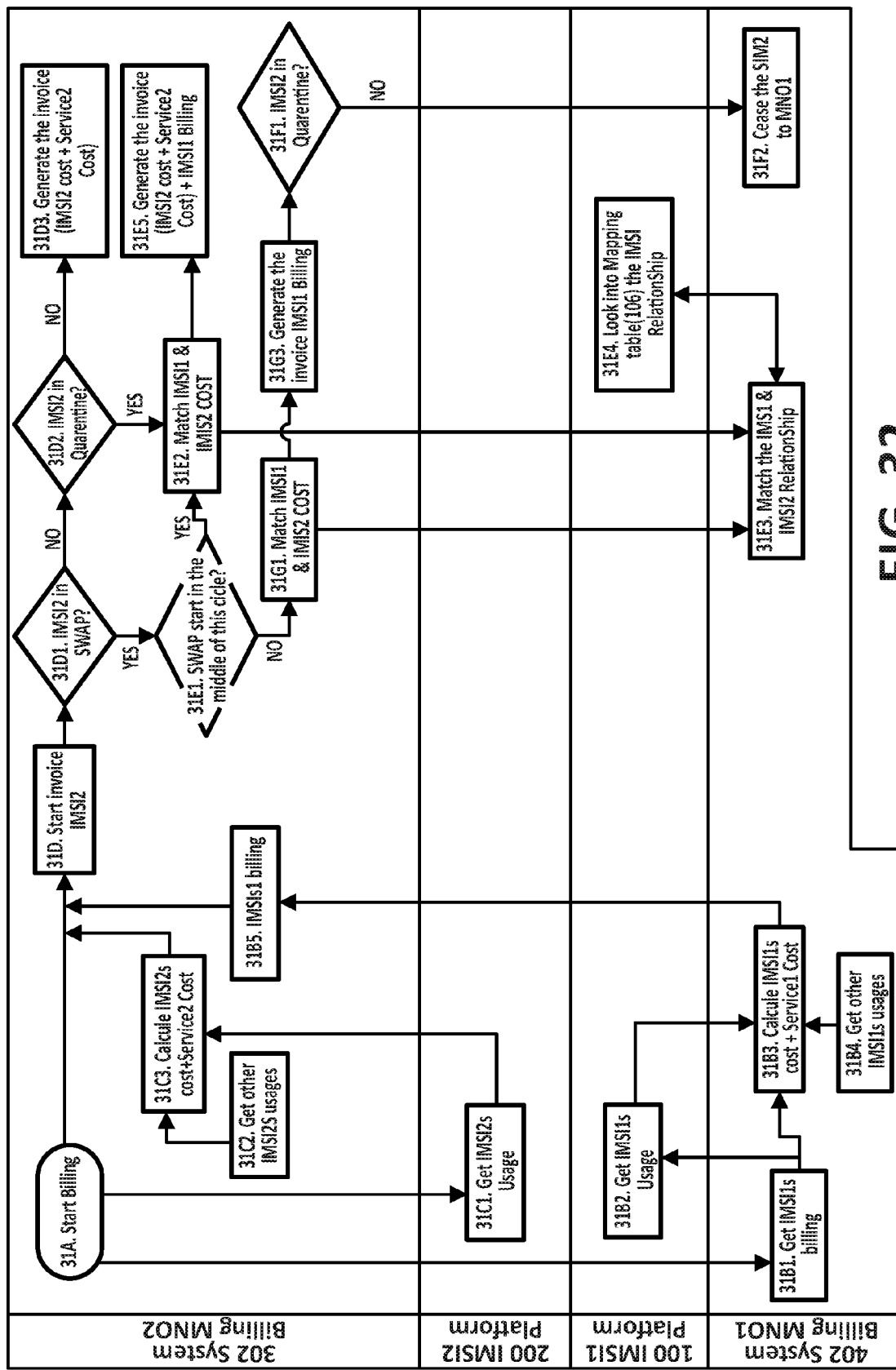
FIG. 32 shows a message diagram of communication flow for billing in the system depicted in FIG. 27, according to a preferred embodiment of the invention.

It can also have access to their invoices (267*b*) described in detail in FIG. 32.

Figure 33:
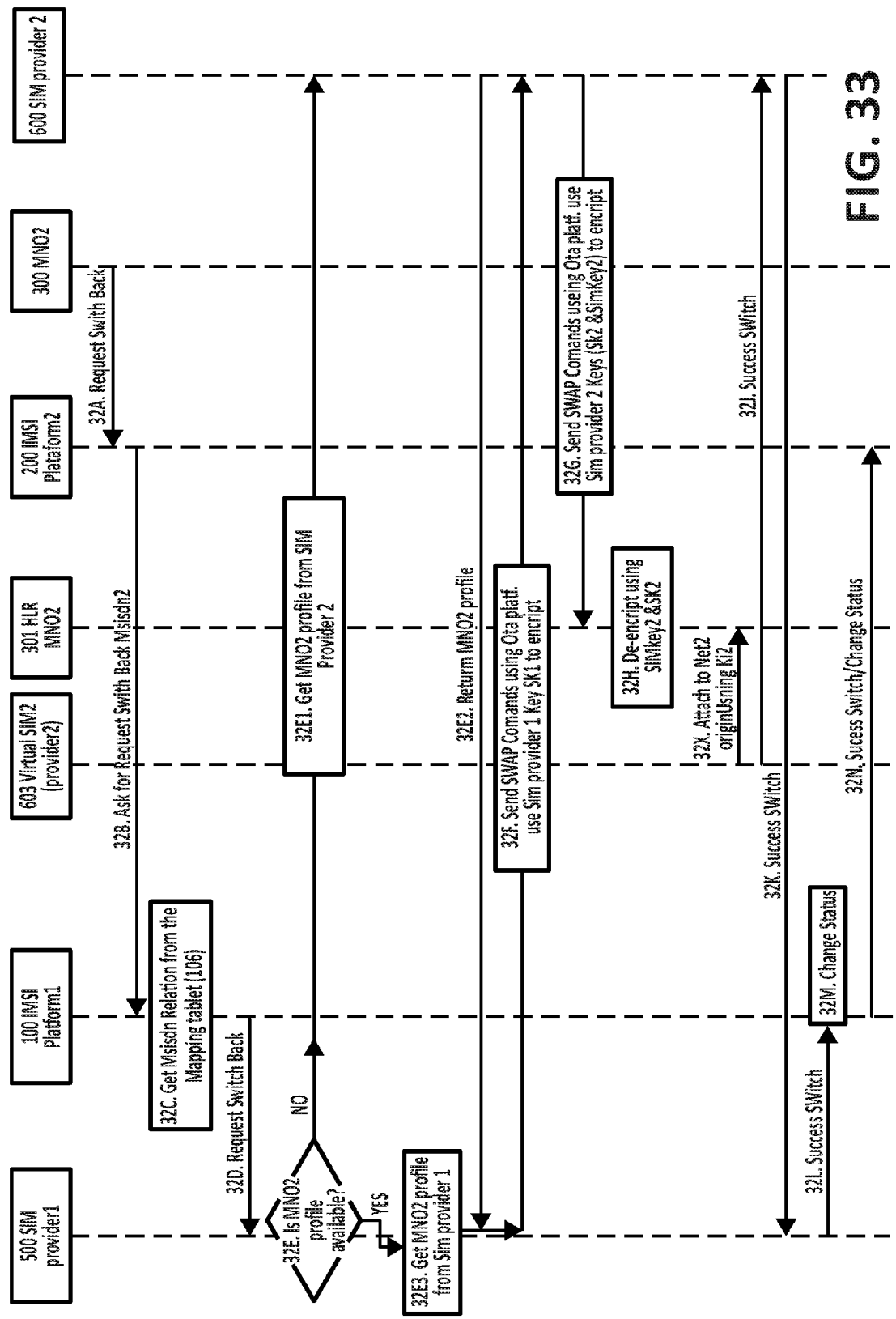
FIG. 33 shows a message diagram of communication flow for IMSI SWAP-back request between the mobile networks of the system depicted in FIG. 27, according to a preferred embodiment of the invention.

When the Virtual SIM2 (603) goes back and registers into the MNO2 network (300), a SWAP reverse or SWAP-back operation is launched (268*b*) by the IMSIs1 platform (100) by request of IMSIS2 platform (200) described in FIG. 33. IMSIs1 platform (100) starts a dialogue with the IMSIs2 platform (200) to obtain the IMSI2 and MSISDN2 that SIM is going to use in the MNO2 network (300). It also starts a dialogue (2642) with the SIM1 provider platform (500) so that the SIM provider1 platform (500) gets the MNO2 credentials. SIM provider1 platform (500) could get the MNO2 credentials either from its own platform, as described in FIG. 8, or from SIM provider2 platform (600) as described in FIGS. 15-18. Then SIM provider1 platform (500) sends all the information using OTA commands (2644) to the Virtual SIM2 (603) through the SIM provider2 platform (600). After that, the Virtual SIM2 can be registered to the MNO2 network (300) successfully (2645).

Figure 34:
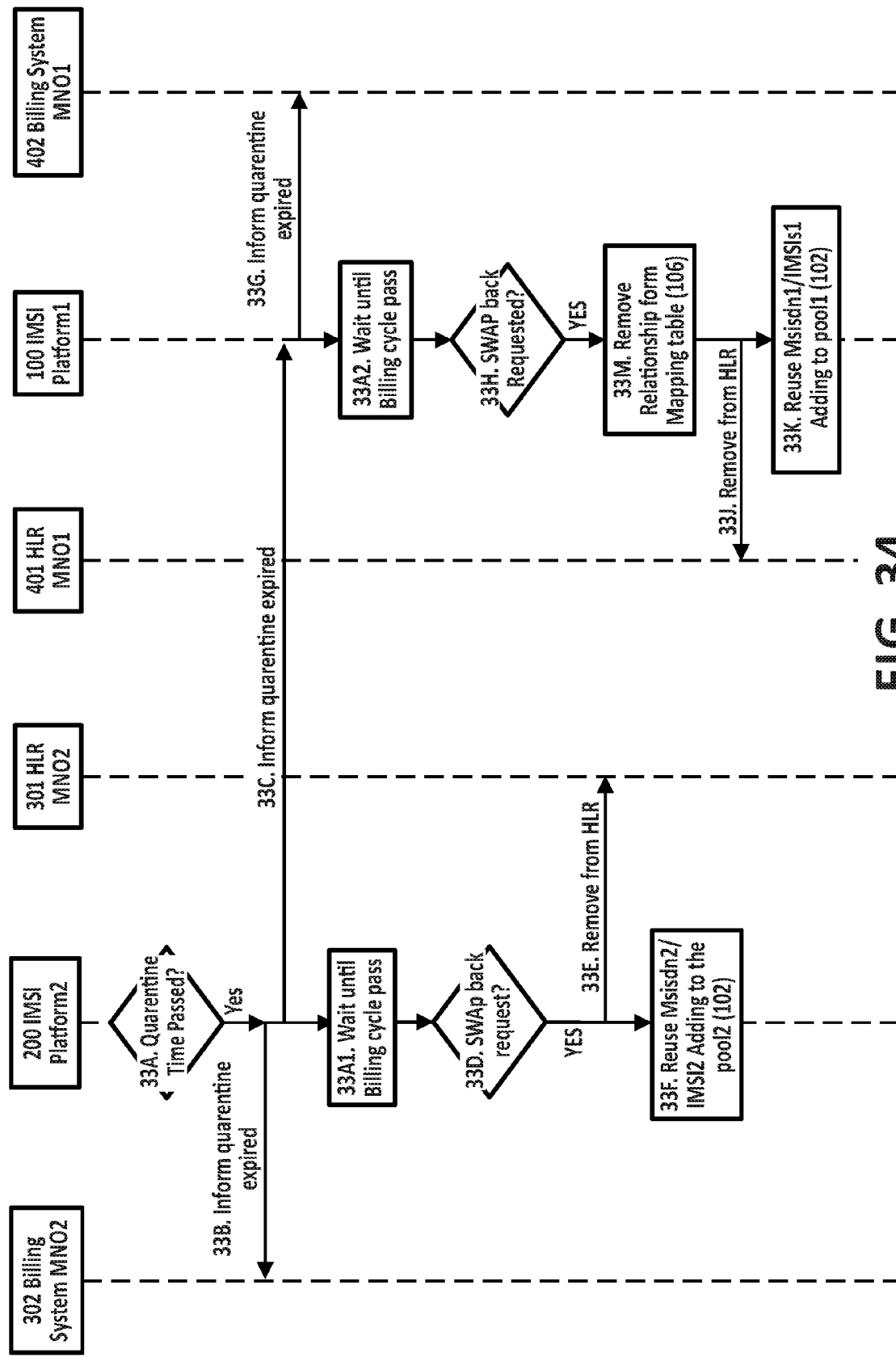
FIG. 34 shows a message diagram of communication flow between the mobile networks of the system depicted in FIG. 27 when a quarantine period expires, according to a preferred embodiment of the invention.

When the quarantine period has elapsed, the IMSIs2 platform (200) lets the IMSIs1 platform (200) know about it (269*b*), described in more detail in FIG. 34. It is decided whether IMSI1/IMSI2 are going to be reused again or not (2691, 2692).

Most processes of FIG. 27 are mirrors of processes included in the general case of FIG. 3. The difference is that the roles of the different components are changed although almost all flows are similar. Another difference is that the platform has neither IMSI2 mapping table, nor MNOs mapping table. Therefore, all processes that should get data from the mapping table (106), which contains the relationship between the IMSIs used in the platforms source and destination, are always delegate to IMSI1s platform to get the data, as this table is only in IMSIs1 platform (100). IMSIs1 platform (100) is then the platform that handles at any times which IMSI is currently using SIM, due to IMSIs2 platform (200) does not have a mapping table.

IMSIs2 platform (200) has always to send requests to the IMSIs1 platform (100) using their own IMSI2. IMSIs1 platform platform (100) is also responsible of deciding if it must to search the SIM by the IMSs1 or the IMSI2 depending on whether the SWAP or SWAP-back has been made. Moreover, IMSIs2 platform (200) does not need to know which network the SIM is after SWAP, since it will always be on the MNO1 network (400). Therefore it will always make the request directly to the IMSIs1 platform (100) since only the SWAP with IMSIs1 platform is allowed. Therefore, It does not need to have a table of MNO mappings either. If there were a possibility that the IMSIs2 platform (200) can perform the SWAP with multiple platforms, it would be necessary to the existence of these two tables, the MNO mapping and IMSIs mapping tables, and IMSIs2 platform (200) would look into these tables to find out what the true identity of the SIM is and how to locate it. This case would be the same case as presented previously but with the roles reversed.

The steps so that Virtual SIM2 (603) can be used in MNO2 network (300) are described in FIG. 28. This is a mirror process described in FIG. 4 used to prepare the Virtual SIM1 (503). Before the process can start a contract must be signed between MNO2 network (300) and SIM provider2 (600). At that time, MNO2 provides the necessary data (27A) for Ki keys generation and MNO2 profile to SIM provider2 (600). These data are usually stored on a module of the Data Preparation2 (602). After a while, MNO2 orders (27B) SIM provider2 to manufacture some SIMs with certain characteristics and a specific range of IMSIs. During the manufacturing process (27C), the subscription data, IMSI, KI, etc., whic allow SIM to attach to MNO2 network (300), are stored into the SIM. Two cipher keys, SK2 or the storage key1 and the SIMKey2, are stored in the SIM, as well. Keys are used to cipher all the data interchanged between SP2 and DP2 and between the Virtual SIM2 (603) and SR2. Once SIMs are manufactured, SIM provider2 (600) returns a file (27D) containing the relationship between IDICC and IMSI, among other things, to MNO2 network (300). This file is uploaded (27E) to the IMSIs2 platform (200) by MNO2 and data is stored on the SIM Inventory2 (203). Before SIMs can be used, they must be provisioned with a MSISDN. For this purpose, MNO2 uploads a file (27F) with the association between MSISDNs2 and IMSIs2 to the IMSIs2 platform (200). Associations between MSISDNs2 and IMSIs2 are also stored on the SIM inventory2. Then, IMSIs2 platform (200) checks whether the data corresponds to physical SIMs or not (27G). If data corresponds to physical SIMs, IMSIs2 platform (200) loads (27H) the SIM data, Ki Keys and IMSI/MSISDN on the MNO2's HLR (301). From that moment on, Virtual SIM2 (603) is authorized to use the MNO2's network. If IMSIs2/MSISDNs2 data does not correspond to any physical SIMs (27G), they are stored (27X) on the pool2 (202) and they may be used during the SWAP.

FIG. 29 describes the needed steps to upload the IMSI1/MSISDN1 in the IMSIs1 (100) platform. The IMSI1/MSISDN1 are going to be used by the Virtual SIM2 (603) to attach to MNO1 network (400), the destination network in this case, once the SWAP has been carried out. Before the process can start a contract must be signed between the MNO1 and a SIMs provider to manufacture SIMs. The process begins when MNO1 provides the necessary data (28A) that will allow SIMs to be authorized to use MNO1 network (400). If MNO1 network (400) has signed a contract with SIMs provider1 (500), MNO1 network (400) gives data (28A1) to SIMs provider1 (500); otherwise, If MNO1 has signed a contract with SIMs provider2 (600), MNO1 network (400) gives the data (28A2) to SIM provider2 (600). When some time has gone on, and the SWAP is highly likely, MNO1 uploads a file (28B) with the association between IMSIs1 and MSISDNs1 to IMSIs1 platform (100). IMSIs1 platform checks data does not correspond to physical SIMs (28C), since their data has not been stored on SIM Inventory1 (103) yet, and therefore it stores the data (28D) on pooh (102) so that they can be used during the SWAP.

FIG. 30 depicts the steps or the process to request a SWAP on the Virtual SIM2 (603). A SWAP process can only be triggered by the IMSIs1 platform (100) due to this is the platform that owns the infrastructure needed. If a SWAP wants to be launched from IMSIs2 platform (200), the IMSIS2 platform (200) must make a SWAP request to IMSI1s platform (100) to do it (29A, 29B). The next steps (29C-29T) are mirror of the steps presented in FIG. 7. The SWAP request begins when the MNO2 network (300) launches a SWAP request (29A) to the IMSI2s platform (200) which, in turn, re-sends (29B) the request to IMSIs1 platform (100). The IMSIs1 platform (100) checks whether a previous SWAP request with the same parameters was made or not, and if so, IMSIs1 platform (100) tries to recover the data (29C) of the IMSI1/MSISDN1 that the SIM used before from the mapping table (106). In the event (29D) that there had not been a previous SWAP request with the same parameters, or if there had been, but the data had been deleted because the quarantine period had expired, the data of IMSI1/MSISDN1 are not in the mapping table (106). In this case, the IMSIs1 platform (100) searches for a MSISDN1/IMSI1 available and not associated with any SIM yet into its pooh (102) and adds them (29F) to the mapping table (106), but before of it, it removes them (29E) from the pooh (102) so they can no longer be used. Then, it loads them (29G) on its HLR1 (401) in order that MSISDN1/IMSI1 will be authorized to use the MNO1 network (400) when SWAP happens. The IMSI1 platform (100) stores this relationship between IMSI1 and IMSI2 in the mapping table (106) to be available for billing and to be able to be reused in the SWAP/SWAP-Back. When the IMSIs1 platform (100) already has the IMSI1/MSISDN1 data, it looks for them (29H) in the mapping table (106). Then IMSIs1 platform (100) sends a request to the SIM provider1 platform (500) to send OTA commands (29X) to the Virtual SIM2 to make the SWAP. And It sends to it the IMSI2/MSISDN2 currently used by the SIM to be able to locate it, and the data of the new IMSI1/MSISND1 to be loaded on the SIM, as parameters. To be capable of performing the SWAP, SIM provider1 platform (500) must also obtain other information about the MNO whose subscription wants to load. In this case, the MNO1 subscription wants to be activated. SIM provider1 platform (500) can get the data from its own platform (29J), which is explained in more detail in FIG. 8. After getting the data of MNO1 profile and MSISDN1/IMSIs1, SIM provider1 platform (500) sends the OTA commands to the Virtual SIM2 (603), but as the Virtual SIM2 does not belong to SIM provider1 and it has not been registered into the SIM provider1 platform (500), it cannot send the command directly, but SIM provider1 platform (500) can do it through the SIM provider2 platform (600). SIM provider1 platform (500) sends (29K) the data to load into the SIM to SIM provider2 platform (600) cyphered with the SIM provider1 key SK1. SIM provider2 platform (600) deciphers the info and it cyphers it again using its own keys SK2 and SIM-Key2. Then it sends it to the Virtual SIM2 (603) using an encrypted channel through platform OTA2 (29L). When the SIM2 (603) receives the data, they are deciphered, using the SK2 and SIMKey2, loaded on it and the data of the new subscription is activated (29M). Then the SIM is restarted and it register on the MNO1 network (400) using the new subscription. The HLR of MNO1 (401) successfully verifies the SIM registration (29N). Flows 29K to 29P are explained more fully in FIGS. 21 to 23, by several implementation options. If the registration on the MNO2 network (300) is successful (29N), Virtual SIM2 (603) informs about the success of the operation (29O) to the SIMs provider platform, from which it received the SWAP request. In this case, the SIM informs to SIM provider2 platform (600), which also informs (29P) to the SIM provider1 platform (500), which was the one that really generated the request. The SIM provider1 platform (500) informs about the success of the operation (29Q) to the IMSI1 platform (100) from which it received the SWAP request. At that time, the IMSIs1 platform (100) reports the success of the operation (29R) to IMSIs2 platform (200) so that it can carry out the appropriate actions, such as changing the SIM status or de-activates it to not allow the SIM consumption and to stop its billing. When IMSIs1 platform (100) receives (29S) from IMSIs2 platform (200) the confirmation for the change status, IMSIS1 platform (100) changes the SIM status (29T) and activates it to allow the SIM consumption and starts its billing.

When MNO2 network (300) wants to get the usage of Virtual SIM2 (603) during a given billing cycle, which may be the current cycle or not, the process followed, shown in FIG. 31, is a mirror process of the one described in FIG. 10. MNO2 network (300) asks to IMSIs2 platform (200) the SIM consumption (30A). IMSIs2 platform (200) checks whether SIM has been in SWAP or not during the cycle (30B). If SIM has not been in SWAP, the SIM consumption during this cycle (30G) is only the one performed on the IMSIs2 platform (200), which is returned (30H) to MNO2 network (300). If the SIM was in SWAP or is currently in SWAP, IMSIs2 platform (200) makes a request (30C) directly to IMSIs1 platform (100). IMSIs1 platform (100) looks for the IMSIs relationship (30D) into the mapping table (106) to know which IMSI1 the SIM that initially has an IMSI2 is using in the MNO1 network (400). IMSIs1 platform (100) gets the SIM consumption during this SWAP cycle (30D1), and it returns it (30E) to the IMSIs2 platform (200). The IMSIs2 platform (200) also checks whether SWAP lasted or not the whole cycle (30F). If the SWAP lasted the whole cycle, the SIM consumption is only the one made in IMSIs1 platform (100), which is returned (30H) to MNO2 network (300). If SWAP did not last the whole cycle (30F), IMSIs2 platform (200) adds (30M) the SIM's consumption in the IMSIs1 platform (100) plus its consumption in IMSIs2 platform (200), and returns the result (30H) to the MNO2 network (300).

FIG. 32 shows the steps followed when the MNO2 billing system (302) wants to invoice (31A) a Virtual SIM2 (603) during a given billing cycle (which may be the current cycle or not). This is a mirror process of the one showed in the FIG. 11. In first place, the MNO2 billing system (302) asks for the consumption (31C1) of their SIMs, i.e., those ones that own an IMSI2, to the IMSIs2 platform (200). It also gets the unbilled consumption by the IMSIs2 platform (200) from external systems (31C2) such as the SMS consumption, or the voice calls consumption from the SMSC or/and the MSC. Then, it calculates the cost per usage of SIMs with IMSIs2 and the cost per service (31C3) using both info. On the second place, MNO2 billing system (302) asks for the cost (31B1) of some SIMs that IMSIs2 knows are/was or have been in SWAP to MNO1 billing system (403). MNO1 billing system (403) knows which the relationship between IMSIs is, by looking for it into the mapping table (106), and therefore he is easily able to know which IMSIs1 matches with a specific IMSIs2. MNO1 billing system (403) makes a request to the IMSIs1 platform (100) to get the IMSIs1 consumption (31B2). It also gets the unbilled consumption by IMSIs1 platform (100) from other external systems (31B4). Then it uses both data to calculate the cost per SIM, with IMSIs1 usage and cost per service (31B3) and returns it to the MO2 billing system (31B5). The MNO2 billing system (302) starts the billing (31D). If the SIM is no longer in SWAP (31D1), or it has been in SWAP and the quarantine period has expired (31D2), the SIM cost (31D3) is only the one made in the MNO2 network (300), since due to the quarantine period has expired, all the costs that SIM would have made in the MNO1 network have already been invoiced. If the SIM is no longer in SWAP (31D1), or it has been in SWAP and the quarantine period has expired (31D2), the SIM cost will be cost of the consumptions (31E5) that it have made in the MNO2 network (300) plus the consumption which were made in the MNO1 network (400) and it have not been billed yet. To know which consumption in the MNO1 network (400) has been made, the MNO2 billing system (302) makes the matching of IMSIs2 and IMSIs1 (31E2), by seeking (31E3) to the MNO1 billing system (402), which searches (31E4) into the mapping table (106) of the IMSIs1 platform (100). If the SIM is in SWAP (31D1), and SWAP has started in the middle of the billing cycle (31E1), the SIM cost will be cost of the consumptions (31E5) that it have made in the MNO2 network (300) plus the consumption which were made in the MNO1 network (400). To know which consumption in the MNO1 network (400) has been made, the MNO2 billing system (302) makes the matching of IMSIs2 and IMSIs1 (31E2), by seeking (31E3) to the MNO1 billing system (402), which searches (31E4) into the mapping table (106) of the IMSIs1 platform (100). If the SIM is in SWAP (31D1), and SWAP has not started in the middle of the billing cycle (31E1), it means that the SIM only has been used in the MNO1 network (400), so its costs will only be cost of the consumption (31G3) that it have made in the MNO1 network (400). To know which consumption in the MNO1 net has been made, the MNO2 billing system (302) makes the matching of IMSIs2 and IMSIs1 (31G1), by seeking (31E3) to the MNO1 billing system (402), which searches (31E4) into the mapping table (106) of the IMSIs1 platform (100). Finally it checks whether the quarantine period has expired or not (31F1). If it has expired, then the SWAP is permanent and SIM is transferred to MNO1 (31F2), from that time being, the MNO1 Billing system (402) starts to invoice it to the final client.

FIG. 33 depicts the steps or the process to reverse a SWAP, or SWAP-Back on the Virtual SIM2 (603). A SWAP-back request can only be launched from the IMSIs1 platform (100), since this platform is the one who owns the infrastructure needed. If the SWAP back request wants to be requested from the IMSIs2 platform (200), the IMSI2 platform (200) makes a request (32B) to the IMSI1 platform (100) to do it. From the flow 32B, the flows of the figure are a mirror of the ones showed in FIG. 12. The SWAP-Back request begins when the MNO2 network (300) launches (32A) a SWAP-back request to the IMSIS2 platform (200) which redirects the request (32B) to the IMSI1s platform (100). The IMSIs1 platform (100) checks whether a previous SWAP request was made or not; if so, it tries to recover the data (32C) of the IMSI2/MSISDN2 that the SIM initially used and the data of the IMSI1/MSISDN1 that the SIM is currently using from the mapping table (106). It also sends a request to the SIM provider1 platform (500) to send the OTA commands (32D) to the Virtual SIM2 (603) to make the SWAP. And It sends to it the IMSI1/MSISDN1 currently used by the SIM to be able to locate it, and the data of the new IMSI2/MSISND2 to be loaded on the SIM, as parameters. To be capable of performing the SWAP, SIM provider1 platform (500) also obtains other information about the MNO (32E) whose subscription wants to load. In this case, the MNO2 subscription wants to be activated, so it checks whether it can be retrieved from its own platform (32E3), as explained in more detail in FIG. 8, or it can be retrieved (32E1, 31 E2) from the SIM provider2 platform (600). After getting the data of MNO2 profile and MSISDN2/IMSIs2, SIM provider1 platform (500) sends the OTA commands to the Virtual SIM2 (603) using an encrypted channel through an OTA platform, but it cannot do it using its own keys throughout the SIM provider1 platform (500), since the Virtual SIM2 (603) belongs to SIM provider2 and SIM will not recognize the data encrypted with other keys or other commands not send by SIM provider2 platform (600). For that reason, SIM provider1 platform (500) sends the OTA commands (32F) to SIM provider2 platform (600) ciphered using its storage Key SK1. SIM provider2 platform deciphers and encrypts the info again using its own keys, SK2 and SIMkey2, and it sends (32G) it to the Virtual SIM2 (603). When the data are downloaded on the SIM2 (603), they are deciphered, and loaded on it and the data of the new subscription is activated (32H). Then the SIM is restarted and it register on the MNO2 network (300) using the new subscription. The HLR of MNO2 (301) successfully verifies the SIM registration (32X). If the registration on the MNO2 network (300) is successful (32K), Virtual SIM2 (603) informs about the success of the operation (32J) to the SIMs provider platform, from which it received the SWAP request. In this case, the SIM informs to SIM provider2 platform (600). The SIM provider2 platform (600) informs (32K) to the SIM provider1 platform (500), which was the one that initially launched the request. By other hand, the SIM provider1 platform (500) reports of the success of the operation (32L) to the IMSI1 platform (100) from which it received the SWAP request. At that time, the IMSIs1 platform (100) changes the SIM status (32M) and deactivates it to not allow the SIM consumption and stops its billing. It also reports the success of the operation (32N) to IMSIs2 platform (200) so that it can carry out the appropriate actions, such as changing the SIM status or activates it again to allow the SIM consumption and to start its billing.

FIG. 34 depicts the sequence of steps triggered when the quarantine period expires. This process is mirror process of the one described in FIG. 13. When IMSIs2 platform (200) realizes that the quarantine period has expired (33A) for a SIM, it informs about it to the platform corresponding to the network where the SIM is or it has been in SWAP, in this case the only platform with which it can perform the SWAP is the IMSIs1 the platform (100) so it always informs to it (33C). IMSIs2 platform (200) also reports (33B) to the MNO2 Billing system (302). The IMSIs2 platform (200) waits for the billing cycle after the quarantine finishes before starting any quarantine related process, to avoid that any consumption performed on the source network was not be invoiced properly (33A1). When the billing cycle after the quarantine time ends, the IMSIs2 platform (200) also checks whether there has been a request to reverse the SWAP or the SIM is still in SWAP (33D). If the SIM is still in SWAP and the SWAP has not been back, the SWAP is made permanent and the Virtual SIM2 (603) will remain indefinitely on the MNO1 network (400) and it is transferred to MNO1. As the SIM belongs to MNO1 from the time being, and since the MSIDN2/IMIS2 are not going to be used by the SIM in the home network anymore, MSIDN2/IMIS2 data are returned (33F) to the pool2 (202), and unloaded (33E) from the MNO2 HLR (301) and re-used. Moreover, when the IMSIs1 platform (100) receives the notification of quarantine time expiration (33C), it informs (33G) the MNO1 Billing system (402), so that it can take it into account when it invoices the SIM. IMSIs1 platform (100) waits for the billing cycle after the quarantine finishes before starting any quarantine related process, to avoid that any consumption performed on the destination network was not be invoiced properly (33A2). When the billing cycle after the quarantine time expiration ends, the IMSIs1 platform (100) also checks (33H) if there has been a request to reverse the SWAP or SWAP-back. If there has been a SWAP-back request, the IMSIs1 platform (100) knows that no more consumptions of the SIM2 in the MNO1 network (400) are going to arrive, and therefore it removes (33M) the relationship between IMSI2 and IMSI1 from the mapping table (106), and since the MSIDN1/IMIS1 are not going to be used by the SIM2 anymore, they are returned (33J) to the pooh (102), and unloaded (33K) from the MNO1 HLR (401) and re-used.

In all the cases described before, it has been assumed that the source MNO, or home network, and the target MNO, or destination network, use different platforms to manage efficiently the use of SIMs and network resources, e.g. the use of IMSIs/MSISDN and its assignment to SIM. Furthermore, it was assumed that the platforms of the first MNO, MNO1, have the infrastructure to SWAP SIMs, but the platforms of the second MNO, MNO2, do not have the infrastructure. Finally, it was assumes that, while the MNO1 relies on a SIM provider, the rest of the MNOs, the targets MNO2 and/or MNO3, may trust on a SIM provider different to the one on whom the MNO1 relies.

The present invention has application in different use cases which can be divided according to two criteria: 1) SWAP Length and destinations and 2) Architecture required for the SWAP.

1) Use cases divided by SWAP destination and duration
   1.1) Temporary SWAP: The case of a person or traveller with a mobile or a M2M device, such as a car or an e-book, purchased in Spain, for example, or in elsewhere. Both the M2M device and the mobile are provided with a SIM of MNO1, from Spain. The traveller goes to another country, e.g. Portugal, where he uses the device, after the SWAP, and where there is support from another MNO, MNO2. The SIM credentials are changed from MNO1 to MNO2. After that, the traveller returns to Spain and the same credentials from MNO1 of Spain initially used by the SIM before the SWAP will be re-allocated to the SIM, after a SWAP-back or reversing the SWAP. This case is described in the general case of FIG. 3.
   1.2) Permanent Swap: A M2M device, for example a car, is manufactured in Germany. Its SIM is provided with the credentials of a MNO1 from Germany, with whom the car manufacturer has a contract. The cars are tested at the factory and then sold in various countries where there are some agreements with other MNOs. The car will stay in the destination indefinitely, so it is needed to SWAP the SIM when the destination country is reached, and it is unlikely the car will return back to Germany. The SWAP becomes permanent after a fixed time without a swap back request, the recovering of the same credentials of MNO1 is disabled, and they can be re-allocated on to a new SIM. Another feature that makes this SWAP different is that the country where the car will be marketed may be unknown, but it's applicable if the region or the arrival time is well known. In this case all car marketed in the same region can be forced to use the same credentials of a MNO2, regardless of country. This case also applies to travellers or others M2M devices, such as e-books, meters . . . , although its application to traveller is less likely. This case is described in the general case of FIG. 3.

1.3) Travel to multiple locations. One traveller has a mobile device or a M2M device containing a SIM of a MNO1 from a country, e.g.: Spain. The traveller goes to another country, e.g. Norway, where he uses the device, after swapping the SIM credentials from MNO1 of Spain to MNO2 of Norway. Traveller goes to a third country, e.g. Russia, where he uses the device after swapping the SIM credentials from MNO2 to MNO3 of Russia. After that, the traveller returns to the origin country, Spain and he uses the device after reversing the swapping, and so SIM credentials are changed to the ones of the MNO1 that SIM used initially. This case is described in the multi-destination case of FIG. 25.

2) Use cases in function of the SWAP architecture for the integration 2.1) General Case: A person or traveller with a mobile phone or a M2M device provided with a SIM from MNO1, e.g. Spain. The traveller or M2M device moves to another country, e.g. Japan. The device wants to be used, after a SWAP, in the destine country with the credentials of MNO2 from Japan. Although the SIM provider is the same for MNO1 and MNO2, so it has both credentials from MNO1 of Spain and from MNO2 in Japan, the IMSI platform of MNO1 and MNO2 are not the same. This case is described in the general case of FIG. 3.

2.2) A person or traveller with a mobile or a M2M device provided with a SIM of MNO1 from Spain, but the traveller or the M2M moves to the United States. After a SWAP, the device wants to be used with the MNO2 credentials from U.S. The SIM Provider of MNO1 and MNO2 are not the same, unlike the previous case. So, only the SIM provider of MNO2 has the MNO2 credentials. A communication between both SIM providers to exchange the MNO2 credentials is needed. This case is described in FIG. 14.

2.3) A person or traveller with a mobile or with M2M device distributed by the MNO1 from a country, e.g. Spain, and the traveller or the M2M device moves to another country, e.g. China, but after a SWAP, the device wants to be used with the credentials of MNO2 in China. This case is described in FIG. 19 and there can be two possible sub-cases:

2.3.1) The SIM included in the mobile or M2M device belongs to MNO1, and it has been manufactured by the SIM provider2, which is not the usual SIM provider of MNO2 or of MNO1. The MNO1 decided to use it for contract issues, for example, the SIM is cheaper, or due to the M2M device or mobile has special characteristics, it must be equipped with a SIM from the SIM provider2.

2.3.2) The SIM included in the M2M or mobile device was manufactured by the MNO1 to answer a request from MNO2. The usual SIM of MNO2 is used to manufacture it. The SIM is manufactured by the SIM provider2. They are initially allocated with credentials of MNO1 to test them, but once they had been tested, they are sent to China to be marketed there. A change of the credentials to the MNO2 credentials from China has to happen in other they can be marketed.

In both sub-cases, although the SWAP is performed on the SIM of supplier 2, the whole needed infrastructure for the SWAP is in the hands of SIM provider1. The SIM provider that has the credentials of MNO1 might be both the SIM provider1 and provider2. However, MNO2 credentials may be given to the SIM provider1 or provider2 or even to a third party. In this case, the process to obtain the credentials from a third party would be same as the process so that SIM provider1 gets the credentials from SIM provider2.

2.4) A traveller with a mobile or a M2M device provided with a SIM of MNO2 from a country, e.g. Turkey, and the platform of MNO2 from Turkey has no the needed infrastructure for the SWAP on MNO2 SIM, and it does so through a request from the MNO2 platform to MNO1 platform. Different sub-cases can be considered:

2.4.1) The traveller or the device moves to a different country, e.g. Spain. After a SWAP, the device wants to be used with credentials of MNO1 from Spain. The SIM provider of MNO1 and of MNO2 may or may not be the same.

2.4.2) The traveller move to a country of a MNO3 that has agreement with the MNO1 from Spain. After a SWAP, the device wants to be used with the MNO3 credentials. The SWAP is launched by the MNO1 platform. The SIM provider that has the credentials of MNO3 might be the same that has the credentials of MNO1 or MNO2, or a third party. In the latter case, the process to get the credentials from a third party would be similar to the one followed by the SIM provider1 to get the MNO2 credentials from SIM provider2.

These two cases are included into the case of FIG. 27.

A variant of this fourth case 2.4 would be one in which a SIM of MNO2 from Turkey is manufactured in an external country different from Turkey and it is empowered with credentials that were not from MNO2. In this case, prior to being able to use the SIM, it would be necessary to trigger a SWAP request from MNO2's platform to set the MNO2 credentials. But MNO2's platform does not have the necessary infrastructure, so it must redirect the request directly to the platform MNO1. This case is similar to case 2.3.

Another variant of case 2.4 would be one in which the MNO2 from Turkey would want to SWAP a SIM that it did not belong to it, e.g. SWAP a SIM from MNO1 or from a third party. This SWAP would also be made by a request of MNO2's platform to MNO1's platform, since MNO2 has no infrastructure for SWAP. This case is similar to the general case 2.1, SWAP on SIM of MNO1, or is similar to case 2.3., SWAP on a SIM of a third party.

In the case 2.4, if the MNO2's platforms had the necessary infrastructure to SWAP SIM, SWAP could be done directly by them. There would no need to redirect the request to MNO1's platforms.

Note that in this text, the term "comprises" and its derivations (such as "comprising", etc.) should not be understood in an excluding sense, that is, these terms should not be interpreted as excluding the possibility that what is described and defined may include further elements, steps, etc.

The invention claimed is:

1. A method for managing subscriber devices in mobile networks, the method comprising:
   obtaining, in a home network (400) of a first mobile network operator (MNO1), data associated with at least one physical SIM of a device the at least one physical SIM comprising an embedded SIM card (eUICC) and subscription credentials of the first mobile network operator (MNO1),
   and being characterized by further comprising:
   obtaining, in a destination network (300) of a second mobile network operator (MNO2) which the device travels to, static data and dynamic data associated with at least one virtual SIM (503, 603) of the device, the at least one virtual SIM (503, 603) comprising the embedded SIM card (eUICC) and subscription credentials of the second mobile network operator (MNO2); and
   obtaining the dynamic data, which comprise a subscriber authentication key (Ki), being obtained through an OTA platform (507, 607) from a SIM provider platform (500, 600) on which the destination network (300) relies; and
   storing the static data, which comprise IMSI and MSISDN identities, of virtual SIM (503,603) being obtained from at least a pool (202) of the destination network (300);
   the method being characterized by further comprising:
   storing in a mapping table (106) of the first mobile network operator (MNO1) and during a quarantine time an association between the obtained static data and the dynamic data of the at least one virtual SIM (503, 603) with the data of the physical SIM obtained in the home network (400).

2. The method according to claim 1, further comprising, if a request for an IMSI swap is sent from the home network (400) to the destination network (300)
   removing the static data of the, at least one, virtual SIM (503, 603) from the pool (202) of the destination network (300);
   loading through the OTA platform (507, 607) the static data and dynamic data of the, at least one, virtual SIM (503, 603) in the embedded SIM card (eUICC);
   disabling the data of the physical SIM in the embedded SIM card (eUICC) and enabling the loaded static data and dynamic data of the, at least one, virtual SIM (503, 603) in the embedded SIM card (eUICC);
   using the data of the physical SIM and the enabled static data and dynamic data of the, at least one, virtual SIM to launch a first IMSI swap.

3. The method according to claim 2, wherein the data of the physical SIM is removed from the mapping table (106) when the quarantine time is exceeded and no SWAP back is requested.

4. The method according to claim 2, further comprising receiving a notification of success of the first launched IMSI swap and, if a SWAP reverse or SWAP-back is launched before the quarantine time is exceeded, enabling the data of the physical SIM in the embedded SIM card (eUICC).

5. The method according to claim 2, further comprising receiving a notification of success of the first launched IMSI swap and, if the quarantine time is exceeded and neither a SWAP reverse or SWAP-back is launched, storing the data of the physical SIM in a pool (102) of the home network (400) for being used in a virtual SIM (503, 603).

6. The method according to claim 1, wherein at least one additional IMSI swap is launched using the data of the physical SIM and dynamic data of the, at least one, virtual SIM, if a notification of success of the first launched IMSI swap is not received before the quarantine time is exceeded.

7. The method according to claim 1, wherein the quarantine time is a pre-set time during which IMSI and MSISDN identifiers are locked to be reused for both home and destination networks (400, 300).

8. The method according to claim 1, wherein the dynamic data of the virtual SIM (503) is provided by a first SIM provider platform (500) supported by the home network (400).

9. The method according to claim 1, wherein the dynamic data of the virtual SIM (603) is provided by a second SIM provider platform (600) supported by the destination network (300).

10. A system for managing of subscriber devices in mobile networks, the system comprising:
    a home network (400) of a first mobile network operator (MNO1) and at least a destination network (300) of a second mobile network operator (MNO2), the home network (400) obtaining data associated with at least one physical SIM of a subscriber device subscribed in the home network (400) and travelling to the destination network (300);
    and being characterized by further comprising:
    a SIM provider platform (500, 600), comprising an OTA platform (507, 607), on which the destination network (300) relies and from which the destination network (300) obtains dynamic data, which comprise a subscriber authentication key (Ki), through the OTA platform (507, 607);
    at least a pool (202) in which the destination network (300) stores static data, which comprise IMSI and MSISDN identities, the static data and dynamic data being associated with a virtual SIM (503, 603) of the subscriber device;
    mapping table (106) of the first mobile network operator (MNO1) for storing, during a quarantine time, an association between the static and dynamic data of the virtual SIM (503, 603) and the data of the physical SIM obtained in the home network (400).

11. The system according to claim 10, wherein the subscriber device is a M2M device.

12. The system according to claim 10, wherein the subscriber device is a mobile terminal.

13. The system according to claim 10, further comprising a third party network (MNO3) to which the device travels and from which the home network (400) requests an IMSI swap.

* * * * *